(12) United States Patent
Corp et al.

(10) Patent No.: US 12,077,874 B2
(45) Date of Patent: Sep. 3, 2024

(54) COX ELECTROLYZER CELL FLOW FIELDS AND GAS DIFFUSION LAYERS

(71) Applicant: Twelve Benefit Corporation, Berkeley, CA (US)

(72) Inventors: Kathryn L. Corp, Berkeley, CA (US); Timothy A. Bekkedahl, Fremont, CA (US); Kendra P. Kuhl, Oakland, CA (US); Sichao Ma, Dublin, CA (US); Gleb Smilyanski, Albany, CA (US); Will Gasperini, Berkeley, CA (US)

(73) Assignee: Twelve Benefit Corporation, Berkeley, CA (US)

( * ) Notice: Subject to any disclaimer, the term of this patent is extended or adjusted under 35 U.S.C. 154(b) by 0 days.

(21) Appl. No.: 18/300,908

(22) Filed: Apr. 14, 2023

(65) Prior Publication Data
US 2023/0332306 A1    Oct. 19, 2023

Related U.S. Application Data

(60) Provisional application No. 63/331,743, filed on Apr. 15, 2022.

(51) Int. Cl.
*C25B 9/77* (2021.01)
*B32B 5/02* (2006.01)
(Continued)

(52) U.S. Cl.
CPC .............. *C25B 9/77* (2021.01); *B32B 5/022* (2013.01); *B32B 5/024* (2013.01); *B32B 9/007* (2013.01);
(Continued)

(58) Field of Classification Search
CPC ........... C25B 9/77; C25B 11/032; C25B 9/75; C25B 13/02; C25B 3/26; B32B 5/022;
(Continued)

(56) References Cited

U.S. PATENT DOCUMENTS

| 10,975,480 B2 | 4/2021 | Masel |
| 10,975,481 B2 | 4/2021 | Guo et al. |

(Continued)

FOREIGN PATENT DOCUMENTS

| CN | 110453236 A | 11/2019 |
| EP | 3378968 A1 | 9/2018 |

(Continued)

OTHER PUBLICATIONS

Machine translation of WO 2021132137 A1; Publication date: Jul. 1, 2021.*

(Continued)

*Primary Examiner* — Vishal I Patel
(74) *Attorney, Agent, or Firm* — Weaver Austin Villeneuve & Sampson LLP

(57) ABSTRACT

A method of forming a gas diffusion layer includes causing, at least in part, a stack of layers to be arranged between compressing surfaces of a press, the stack of layers including a plurality of gas diffusion layers. The method also includes causing, at least in part, the press to apply one or more compression cycles to the stack of layers to reduce a combined, uncompressed thickness of the plurality of gas diffusion layers between about 2% and about 30%.

20 Claims, 41 Drawing Sheets

(51) Int. Cl.

| | |
|---|---|
| *B32B 9/00* | (2006.01) |
| *B32B 9/04* | (2006.01) |
| *B32B 15/14* | (2006.01) |
| *B32B 15/20* | (2006.01) |
| *B32B 27/12* | (2006.01) |
| *B32B 27/32* | (2006.01) |
| *B32B 37/06* | (2006.01) |
| *B32B 37/10* | (2006.01) |
| *B32B 38/00* | (2006.01) |
| *C25B 9/75* | (2021.01) |
| *C25B 11/032* | (2021.01) |
| *C25B 13/02* | (2006.01) |
| *C25B 3/26* | (2021.01) |

(52) U.S. Cl.
CPC .............. *B32B 9/041* (2013.01); *B32B 9/047* (2013.01); *B32B 15/14* (2013.01); *B32B 15/20* (2013.01); *B32B 27/12* (2013.01); *B32B 27/322* (2013.01); *B32B 37/06* (2013.01); *B32B 37/10* (2013.01); *B32B 38/0004* (2013.01); *C25B 9/75* (2021.01); *C25B 11/032* (2021.01); *C25B 13/02* (2013.01); *B32B 2262/106* (2013.01); *B32B 2305/18* (2013.01); *B32B 2305/188* (2013.01); *B32B 2307/30* (2013.01); *B32B 2307/724* (2013.01); *B32B 2307/7376* (2023.05); *B32B 2309/02* (2013.01); *B32B 2309/04* (2013.01); *B32B 2309/12* (2013.01); *B32B 2311/04* (2013.01); *B32B 2311/08* (2013.01); *B32B 2311/12* (2013.01); *B32B 2311/24* (2013.01); *B32B 2313/04* (2013.01); *B32B 2327/18* (2013.01); *C25B 3/26* (2021.01)

(58) Field of Classification Search
CPC ......... B32B 5/024; B32B 9/007; B32B 9/041; B32B 9/047; B32B 15/14; B32B 15/20; B32B 27/12; B32B 27/322; B32B 37/06; B32B 37/10; B32B 38/0004; B32B 2307/7376; B32B 2262/106; B32B 2305/18; B32B 2305/188; B32B 2307/30; B32B 2307/724; B32B 2309/02; B32B 2309/04; B32B 2309/12

See application file for complete search history.

(56) References Cited

U.S. PATENT DOCUMENTS

| | | |
|---|---|---|
| 2006/0016685 A1 | 1/2006 | Hawkins et al. |
| 2008/0318093 A1 | 12/2008 | Lee et al. |
| 2009/0155102 A1 | 6/2009 | Park et al. |
| 2012/0328942 A1 | 12/2012 | Thomas-Alyea et al. |
| 2016/0161869 A1 | 6/2016 | Avneri et al. |
| 2018/0265440 A1 | 9/2018 | Kudo et al. |
| 2020/0376479 A1 | 12/2020 | Masel |
| 2021/0002775 A1 | 1/2021 | Matsumoto et al. |
| 2022/0243348 A1 | 8/2022 | Bekkedahl et al. |

FOREIGN PATENT DOCUMENTS

| | | | | |
|---|---|---|---|---|
| EP | 3378969 A1 | * | 9/2018 | ............... C25B 1/00 |
| EP | 3460103 A1 | | 3/2019 | |
| KR | 100962903 B1 | | 6/2010 | |
| KR | 20110044051 A | | 4/2011 | |
| WO | WO-2021132137 A1 | * | 7/2021 | ............ H01M 4/881 |

OTHER PUBLICATIONS

Badami, M. "Leakage effects on the performance characteristics of a regenerative blower for the hydrogen recirculation of a PEM fuel cell," Energy Conversion and Management, vol. 55, Mar. 2012, pp. 20-25.

Badami, M., "Theoretical model with experimental validation of a regenerative blower for hydrogen recirculation in a PEM fuel cell system," Energy Conversion and Management, vol. 51, Issue 3, Mar. 2010, pp. 553-560.

Blaszczyk, J., "In-Situ Anode Recirculation Rate Measurement Method (Draft)," Ogura Industrial Corporation, Ballard Power Systems, Full Cell Seminar & Exposition 2011, Oct. 31-Nov. 3, 2011, 22 pages.

Endrodi, B., "Multilayer Electrolyzer Stack Converts Carbon Dioxide to Gas Products at High Pressure with Multilayer Electrolyzer Stack Converts Carbon," acs Energy Lett. 2019, 4, 1770-1777.

Hori, Y., "Chapter 48: Co2-reduction, catalyzed by metal electrodes," Handbook of Fuel Cells—Fundamentals, Technology and Applications, vol. 2, Electrocatalysis, 2003. pp. 720-733.

James, B.D., et al. 2017 DOE Hydrogen and Fuel Cells Program Review, Fuel Cell Systems Analysis, Strategic Analysis, Project IDI FC163, Jun. 8, 2017, 34 pages.

Li, et al., "Electrolysis of Co2 to Syngas in Bipolar Membrane-Based Electrochemical Cells," ACS Publications, ACS Energy Letters, 2016, 1, pp. 1149-1153.

Li, et al., "Electrolytic Conversion of Bicarbonate into CO in a Flow Cell," Cell Press, Joule 3, Jun. 19, 2019, pp. 1487-1497.

Sharma, et al., "Electrocatalytic conversion of carbon dioxide to fuels: a review on the interaction between CO2 and the liquid electrolyte," WIREs Energy Environ 2017, 6:e239. doi:10.1002/wene.239, pp. 1-21.

Verma, et al., "The effect of electrolyte composition on the electroreduction of CO2 to CO on Ag based gas diffusion electrodes," Phys. Chem. Chem. Phys., 2016, 18, pp. 7075-7084.

Xia, Chuan, et al., "Continuous production of pure liquid fuel solutions via electrocatalytic CO2 reduction using solid electrolyte devices," Nature Energy, http://www.nature.com/natureenergy; https://doi.org/10.1038/s41560-019-0451-x.

Eckl, R et al., "Current Distribution Mapping in Polymer Electrolyte Fuel Cells-A Finite Element Analysis of Measurement Uncertainty Imposed by Lateral Currents," Journal of Power Sources, 2006, vol. 154(1), pp. 171-179.

International Preliminary Report on Patentability dated Aug. 17, 2023, in Application No. PCT/US2022/070462.

International Search Report and Written Opinion dated Jun. 24, 2022, in PCT Application No. PCT/US2022/070462.

International Search Report and Written Opinion dated Oct. 17, 2023, in Application No. PCT/US2023/065800.

Yim S D., et al., "The Influence of Stack Clamping Pressure on the Performance of PEM Fuel Cell Stack," Current Applied Physics, 2010, vol. 10(2), pp. S59-S61.

* cited by examiner

FIG. 35 ⤴︎ 3516

COX ELECTROLYZER CELL FLOW FIELDS AND GAS DIFFUSION LAYERS

STATEMENT OF GOVERNMENT SUPPORT

The Government has rights in this invention pursuant to contracts DE-SC0018549 and DE-SC0017725 with the United States Department of Energy.

RELATED APPLICATIONS

An Application Data Sheet is filed concurrently with this specification as part of the present application. Each application that the present application claims benefit of or priority to as identified in the concurrently filed Application Data Sheet is incorporated by reference herein in its entirety and for all purposes.

BACKGROUND $CO_x$ electrolyzers offer a potential route for converting or reducing $CO_x$ gas, e.g., CO or $CO_2$, into one or more desired carbon-based byproducts, such as industrial chemicals or fuels, thereby allowing for waste $CO_x$ gas that would normally be released into the atmosphere to instead be converted into industrially useful products.

Background and contextual descriptions contained herein are provided solely for the purpose of generally presenting the context of the disclosure. Much of this disclosure presents work of the inventors, and simply because such work is described in the background section or presented as context elsewhere herein does not mean that such work is admitted prior art.

SUMMARY

Details of one or more implementations of the subject matter described in this specification are set forth in the accompanying drawings and the description below. Other features, aspects, and advantages will become apparent from the description, the drawings, and the claims.

According to some embodiments, a method includes causing, at least in part, a stack of layers to be arranged between compressing surfaces of a press. The stack of layers includes a plurality of gas diffusion layers. The method further includes causing, at least in part, the press to apply one or more compression cycles to the stack of layers to reduce a combined, uncompressed thickness of the plurality of gas diffusion layers by about 2% to about 30%.

In some embodiments, the combined, uncompressed thickness of the plurality of gas diffusion layers may be reduced by about 6% to about 17%.

In some embodiments, the method may further include positioning the plurality of gas diffusion layers within an alignment assembly.

In some embodiments, the press may be a hot press or a laminator, and a setpoint temperature of the compressing surfaces may be between about 20° C. and about 80° C. during the one or more compression cycles.

In some embodiments, the stack of layers may include the plurality of gas diffusion layers arranged between thermally reflective layers.

In some embodiments, each thermally reflective layer among the thermally reflective layers may be formed of aluminum, copper, gold, silver, or any combination thereof, and each thermally reflective layer among the thermally reflective layers may have a thickness between about 0.006 mm and about 0.2 mm.

In some embodiments, the thermally reflective layers may form a thermal envelop encasing the gas diffusion layers.

In some embodiments, the stack of layers may include the plurality of gas diffusion layers arranged between sacrificial cushion layers.

In some embodiments, the sacrificial cushion layers may be formed of polytetrafluoroethylene, chlorotrifluoroethylene (E-CTFE), MIPELON™, perfluoroalkoxy (PFA), ethylene tetrafluoroethylene (ETFE), or any combination thereof, and each sacrificial cushion layer among the sacrificial cushion layers may have a thickness of about 0.254 mm to about 0.508 mm.

In some embodiments, each compression cycle among the compression cycles may include pressure being progressively applied up to a maximum pressure between about 100 psi and about 400 psi.

In some embodiments, the maximum pressure may be between about 180 psi and about 220 psi.

In some embodiments, each compression cycle among the compression cycles may include the maximum pressure being applied for about 2 minutes to about 11 minutes.

In some embodiments, each compression cycle among the compression cycles may include the maximum pressure being applied for about 4 minutes to about 6 minutes.

In some embodiments, the one or more compression cycles may cause, at least in part, the plurality of gas diffusion layers to be connected to one another to form a combined gas diffusion layer.

In some embodiments, the one or more compression cycles may cause, at least in part, the plurality of gas diffusion layers to be adhered to one another to form a combined gas diffusion layer.

In some embodiments, the method may further include causing, at least in part, the combined gas diffusion layer to be cut or trimmed to a predetermined size.

In some embodiments, each gas diffusion layer among the gas diffusion layers may be a pre-manufactured gas diffusion layer having been previously compressed at least once prior to application of the one or more compression cycles.

In some embodiments, each gas diffusion layer among the gas diffusion layers may include a fibrous substrate and a microporous layer.

In some embodiments, the fibrous substrate may be formed of woven carbon cloth, non-woven carbon fiber layers, or carbon fiber papers.

In some embodiments, the fibrous substrate and/or the microporous layer may be treated or coated with a hydrophobic material.

DETAILED DESCRIPTION OF SOME EMBODIMENTS $CO_x$ electrolyzers, e.g., $CO_2$ electrolyzers, using membrane electrode assemblies may share some structural similarities with existing polymer electrolyte membrane (PEM) water electrolyzers, although there are several respects in which $CO_x$ electrolyzers may differ significantly from such PEM water electrolyzer systems.

In a typical $CO_x$ electrolyzer, a membrane electrode assembly (MEA) may be one of multiple elements that are stacked together in what may be referred to as a "cell"; in the discussion below, the term "cell" is used to refer to this multi-element assembly.

Figure 1:
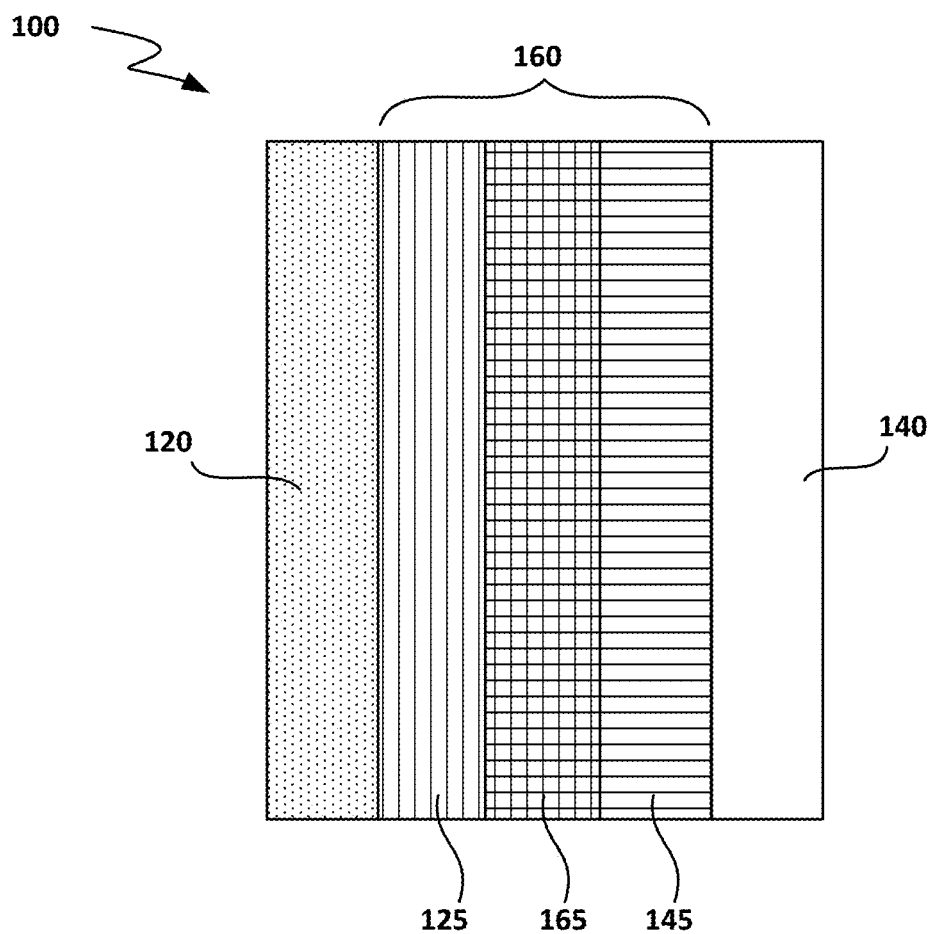
FIG. 1 depicts a diagram of an example MEA for use in $CO_x$ reduction.

An example MEA 100 for use in $CO_x$ reduction is shown in FIG. 1. The MEA 100 has a cathode layer 120 and an anode layer 140 separated by an ion-conducting polymer layer 160 that provides a path for ions to travel between the cathode layer 120 and the anode layer 140.

In certain embodiments, the cathode layer 120 includes an anion-conducting polymer and/or the anode layer 140 includes a cation-conducting polymer. In certain embodiments, the cathode layer and/or the anode layer of the MEA are porous. The pores may facilitate gas and/or fluid transport and may increase the amount of catalyst surface area that is available for reaction.

The ion-conducting layer 160 may, for example, include two or three sublayers: a polymer electrolyte membrane (PEM) 165, an optional cathode buffer layer 125, and/or an optional anode buffer layer 145. One or more layers in the ion-conducting layer may be porous. In certain embodiments, at least one layer is nonporous so that reactants and products of the cathode cannot pass via gas and/or liquid transport to the anode and vice versa. In certain embodiments, the PEM layer 165 is nonporous. Example characteristics of anode buffer layers and cathode buffer layers are provided elsewhere herein. In certain embodiments, the ion-conducting layer includes only a single layer or two sublayers.

Figure 2:
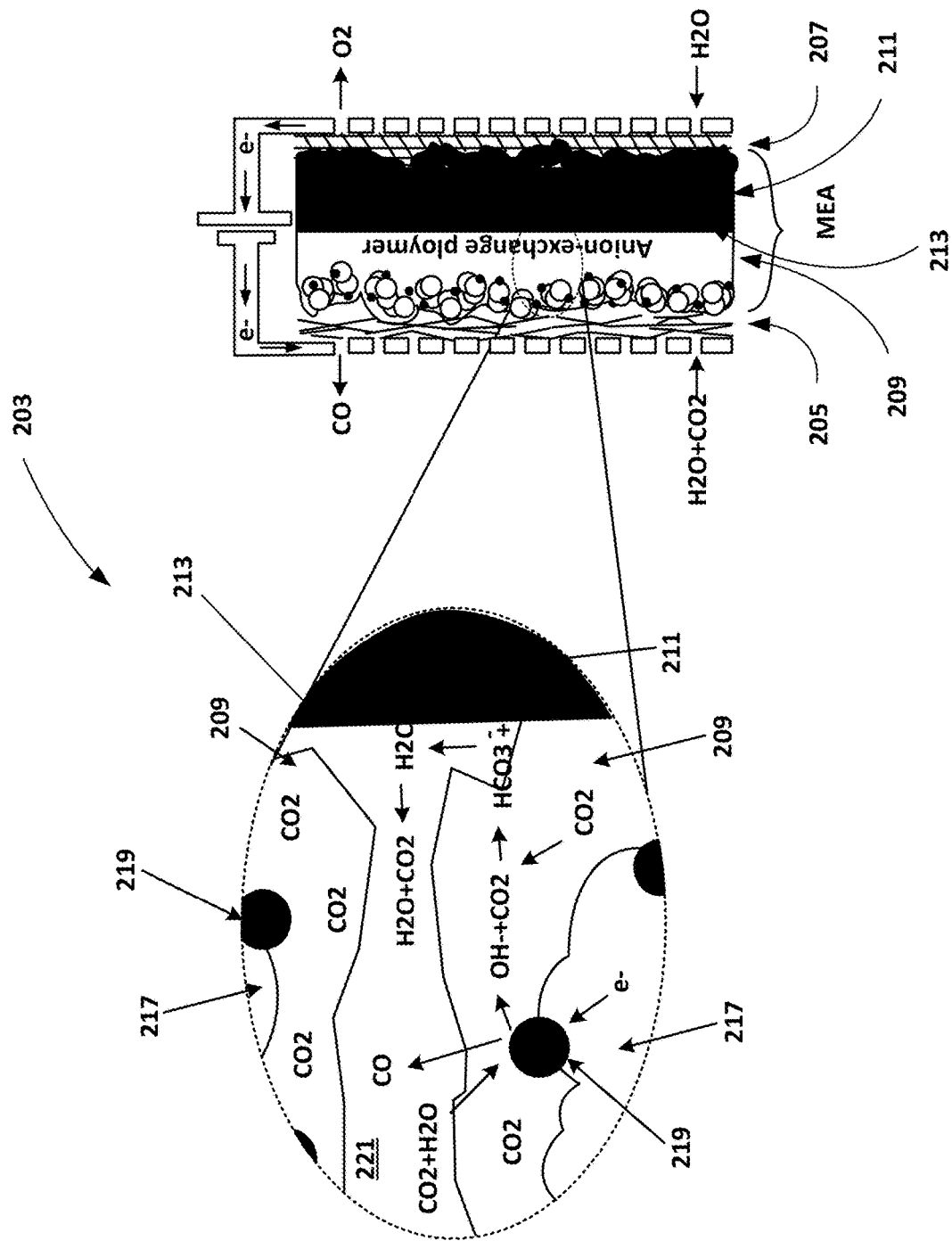
FIG. 2 depicts a $CO_2$ electrolyzer configured to receive water and $CO_2$ as a reactant at a cathode and expel CO as a product.

FIG. 2 shows $CO_2$ electrolyzer 203 configured to receive water and $CO_2$ (e.g., humidified or dry gaseous $CO_2$) as a reactant at a cathode 205 and expel CO as a product. Electrolyzer 203 is also configured to receive water as a reactant at an anode 207 and expel gaseous oxygen. Electrolyzer 203 includes bipolar layers having an anion-conducting polymer 209 adjacent to cathode 205 and a cation-conducting polymer 211 (illustrated as a proton-exchange membrane) adjacent to anode 207.

As illustrated in the magnification inset of a bipolar interface 213 in electrolyzer 203, the cathode 205 includes an anion exchange polymer (which in this example is the same anion-conducting polymer 209 that is in the bipolar layers) electronically conducting carbon support particles 217, and metal nanoparticles 219 supported on the support particles. $CO_2$ and water are transported via pores such as pore 221 and reach metal nanoparticles 219 where they react, in this case with hydroxide ions, to produce bicarbonate ions and reduction reaction products (not shown). $CO_2$ may also reach metal nanoparticles 219 by transport within anion exchange polymer 215.

Hydrogen ions are transported from anode 207, and through the cation-conducting polymer 211, until they reach bipolar interface 213, where they are hindered from further transport toward the cathode by anion exchange polymer 209. At interface 213, the hydrogen ions may react with bicarbonate or carbonate ions to produce carbonic acid ($H_2CO_3$), which may decompose to produce $CO_2$ and water. As explained herein, the resulting $CO_2$ may be provided in gas phase and should be provided with a route in the MEA back to the cathode 205 where it can be reduced. The cation-conducting polymer 211 hinders transport of anions such as bicarbonate ions to the anode where they could react with protons and release $CO_2$, which would be unavailable to participate in a reduction reaction at the cathode.

As illustrated, a cathode buffer layer having an anion-conducting polymer may work in concert with the cathode and its anion-conductive polymer to block transport of protons to the cathode. While MEAs employing ion conducting polymers of appropriate conductivity types in the cathode and cathode buffer layer may hinder transport of cations to the cathode and, if present, an anode buffer layer may similarly hinder transport of the anions to the anode, cations and anions may still come in contact in the MEA's interior regions, such as in the membrane layer.

As illustrated in FIG. 2, bicarbonate and/or carbonate ions combine with hydrogen ions between the cathode layer and the anode layer to form carbonic acid, which may decompose to form gaseous $CO_2$. It has been observed that MEAs sometimes delaminate, possibly due to this production of gaseous $CO_2$, which does not have an easy egress path.

The delamination problem can be addressed by employing a cathode buffer layer having inert filler and associated pores. One possible explanation of its effectiveness is that the pores create paths for the gaseous carbon dioxide to escape back to the cathode where it can be reduced. In some embodiments, the cathode buffer layer is porous but at least one layer between the cathode layer and the anode layer is nonporous. This can prevent the passage of gases and/or bulk liquid between the cathode and anode layers while still preventing delamination. For example, the nonporous layer can prevent the direct passage of water from the anode to the cathode. The porosity of various layers in an MEA is described further at other locations herein.

Examples of Bipolar MEAs

As an example, an MEA includes a cathode layer including a reduction catalyst and a first anion-conducting polymer (e.g., Sustainion, FumaSep FAA-3, or Tokuyama anion exchange polymer), an anode layer including an oxidation catalyst and a first cation-conducting polymer (e.g., PFSA polymer), a membrane layer including a second cation-conducting polymer and arranged between the cathode layer and the anode layer to electroconductively connect the cathode layer and the anode layer, and a cathode buffer layer including a second anion-conducting polymer (e.g., Sustainion, FumaSep FAA-3, or Tokuyama anion exchange polymer) and arranged between the cathode layer and the membrane layer to conductively connect the cathode layer and the membrane layer. In this example, the cathode buffer layer can have a porosity between about 1 and 90 percent by volume but can additionally or alternatively have any suitable porosity (including, e.g., no porosity). In other examples the cathode buffer layer can have any suitable porosity (e.g., between 0.01-95%, 0.1-95%, 0.01-75%, 1-95%, 1-90%, etc.).

Too much porosity can lower the ionic conductivity of the buffer layer. In some embodiments, the porosity is 20% or below, and in particular embodiments, between 0.1-20%, 1-10%, or 5-10%. Porosity in these ranges can be sufficient to allow movement of water and/or $CO_2$ without losing ionic conductivity. Porosity may be measured as described further below.

In a related example, the membrane electrode assembly can include an anode buffer layer that includes a third cation-conducting polymer, and is arranged between the membrane layer and the anode layer to conductively connect the membrane layer and the anode layer. The anode buffer layer preferably has a porosity between about 1 and 90 percent by volume, but can additionally or alternatively have any suitable porosity (including, e.g., no porosity). However, in other arrangements and examples, the anode buffer layer can have any suitable porosity (e.g., between 0.01-95%, 0.1-95%, 0.01-75%, 1-95%, 1-90%). As with the cathode buffer layer, in some embodiments, the porosity is 20% or below, e.g. 0.1-20%, 1-10%, or 5-10%

In an example, an anode buffer layer may be used in an MEA having a cathode catalyst layer with anion exchange polymer, a cathode buffer layer with anion-exchange polymer, a membrane with cation-exchange polymer, and an anode buffer layer with anion-exchange polymer. In such a structure, the anode buffer layer may be porous to facilitate water transport to the membrane/anode buffer layer interface. Water will be split at this interface to make protons that travel through the membrane and hydroxide that travels to the anode catalyst layer. One advantage of this structure is the potential use of low-cost water oxidation catalysts (e.g., $NiFeO_x$) that are only stable in basic conditions.

In another specific example, the membrane electrode assembly includes a cathode layer including a reduction catalyst and a first anion-conducting polymer (e.g., Sustainion, FumaSep FAA-3, Tokuyama anion exchange polymer), an anode layer including an oxidation catalyst and a first cation-conducting polymer, a membrane layer including a second anion-conducting polymer (e.g., Sustainion, FumaSep FAA-3, Tokuyama anion exchange polymer) and arranged between the cathode layer and the anode layer to conductively connect the cathode layer and the anode layer, and an anode buffer layer including a second cation-conducting polymer and arranged between the anode layer and the membrane layer to conductively connect the anode layer and the membrane layer.

An MEA containing an anion-exchange polymer membrane and an anode buffer layer containing cation-exchange polymer may be used for CO reduction. In this case, water would form at the membrane/anode buffer layer interface. Pores in the anode buffer layer could facilitate water removal. One advantage of this structure would be the use of an acid-stable (e.g., $IrO_x$) water oxidation catalyst.

In a related example, the membrane electrode assembly can include a cathode buffer layer that includes a third anion-conducting polymer and is arranged between the cathode layer and the membrane layer to conductively connect the cathode layer and the membrane layer. The third anion-conducting polymer can be the same or different from the first and/or second anion-conducting polymer. The cathode buffer layer preferably has a porosity between about 1 and 90 percent by volume but can additionally or alternatively have any suitable porosity (including, e.g., no porosity). However, in other arrangements and examples, the cathode buffer layer can have any suitable porosity (e.g., between 0.01-95%, 0.1-95%, 0.01-75%, 1-95%, 1-90%). In some embodiments, the porosity is 20% or below, and in particular embodiments, between 0.1-20%, 1-10%, or 5-10%.

In an example, a cathode catalyst layer composed of Au nanoparticles 4 nm in diameter supported on Vulcan XC72R carbon and mixed with TM1 (mTPN-1) anion exchange polymer electrolyte (from Orion) may be used. The layer may be ~15 um thick, have a gold to gold+carbon ratio by weight (Au/(Au+C)) of 20%, have a TM1 to catalyst mass ratio of 0.32, have mass loading of 1.4-1.6 mg/cm$^2$ (total Au+C), and have estimated porosity of 0.56. In another example, an anion-exchange polymer layer composed of TM1 and PTFE particles may be provided. The PTFE particles may be approximately 200 nm in diameter and the TM1 molecular weight approximately 30 k-45 k. The thickness of such a layer may be ~15 μm, and the PTFE particles may introduce a porosity of about 8%. A proton-exchange membrane layer composed of perfluorosulfonic acid polymer (e.g., Nafion 117) may also be provided, with a thickness of approximately 125 μm. The membrane may form a continuous layer that prevents significant movement of gas ($CO_2$, CO, $H_2$) through the layer. An anode catalyst layer composed of Ir or $IrO_x$ nanoparticles (100-200 nm aggregates) that is 10 μm thick may also be provided.

Anion Exchange Membrane-Only MEA for $CO_x$ Reduction

In some embodiments, an MEA does not contain a cation-conducting polymer layer. In such embodiments, the electrolyte is not a cation-conducting polymer and the anode, if it includes an ion-conducting polymer, does not contain a cation-conducting polymer. Various examples thereof are provided below.

An AEM-only MEA allows conduction of anions across the MEA. In embodiments in which none of the MEA layers has significant conductivity for cations, hydrogen ions have limited mobility in the MEA. In some implementations, an AEM-only membrane provides a high pH environment (e.g., at least about pH 7) and may facilitate $CO_2$ and/or CO reduction by suppressing the hydrogen evolution parasitic reaction at the cathode. As with other MEA designs, the AEM-only MEA allows ions, notably anions such as hydroxide ions, to move through polymer-electrolyte. The pH may be lower in some embodiments; a pH of 4 or greater may be high enough to suppress hydrogen evolution. The AEM-only MEA also permits electrons to move to and through metal and carbon in catalyst layers. In embodiments, having pores in the anode layer, the cathode layer, and/or the PEM, the AEM-only MEA permits liquids and gas to move through pores.

In certain embodiments, the AEM-only MEA comprises an anion-exchange polymer electrolyte membrane with an electrocatalyst layer on either side: a cathode and an anode. In some embodiments, one or both electrocatalyst layers also contain anion-exchange polymer-electrolyte.

In certain embodiments, an AEM-only MEA is formed by depositing cathode and anode electrocatalyst layers onto porous conductive supports such as gas diffusion layers to form gas diffusion electrodes (GDEs), and sandwiching an anion-exchange membrane between the gas diffusion electrodes.

In certain embodiments, an AEM-only MEA is used for $CO_2$ reduction. The use of an anion-exchange polymer electrolyte avoids low pH environment that disfavors $CO_2$ reduction. Further, water is transported away from the cathode catalyst layer when an AEM is used, thereby preventing water build up (flooding) which can block reactant gas transport in the cathode of the cell.

Water transport in the MEA occurs through a variety of mechanisms, including diffusion and electro-osmotic drag. In some embodiments, at current densities of the $CO_2$ electrolyzers described herein, electro-osmotic drag is the dominant mechanism. Water is dragged along with ions as they move through the polymer electrolyte. For a cation-exchange membrane such as Nafion membrane, the amount of water transport is well characterized and understood to rely on the pre-treatment/hydration of the membrane. Protons move from positive to negative potential (anode to cathode) with each carrying 2-4 water molecules with it, depending on pretreatment.

In certain embodiments, an AEM-only MEA may be employed in CO reduction reactions. Unlike the $CO_2$ reduction reaction, CO reduction does not produce carbonate or bicarbonate anions that could transport to the anode and release valuable reactant.

Figure 3:
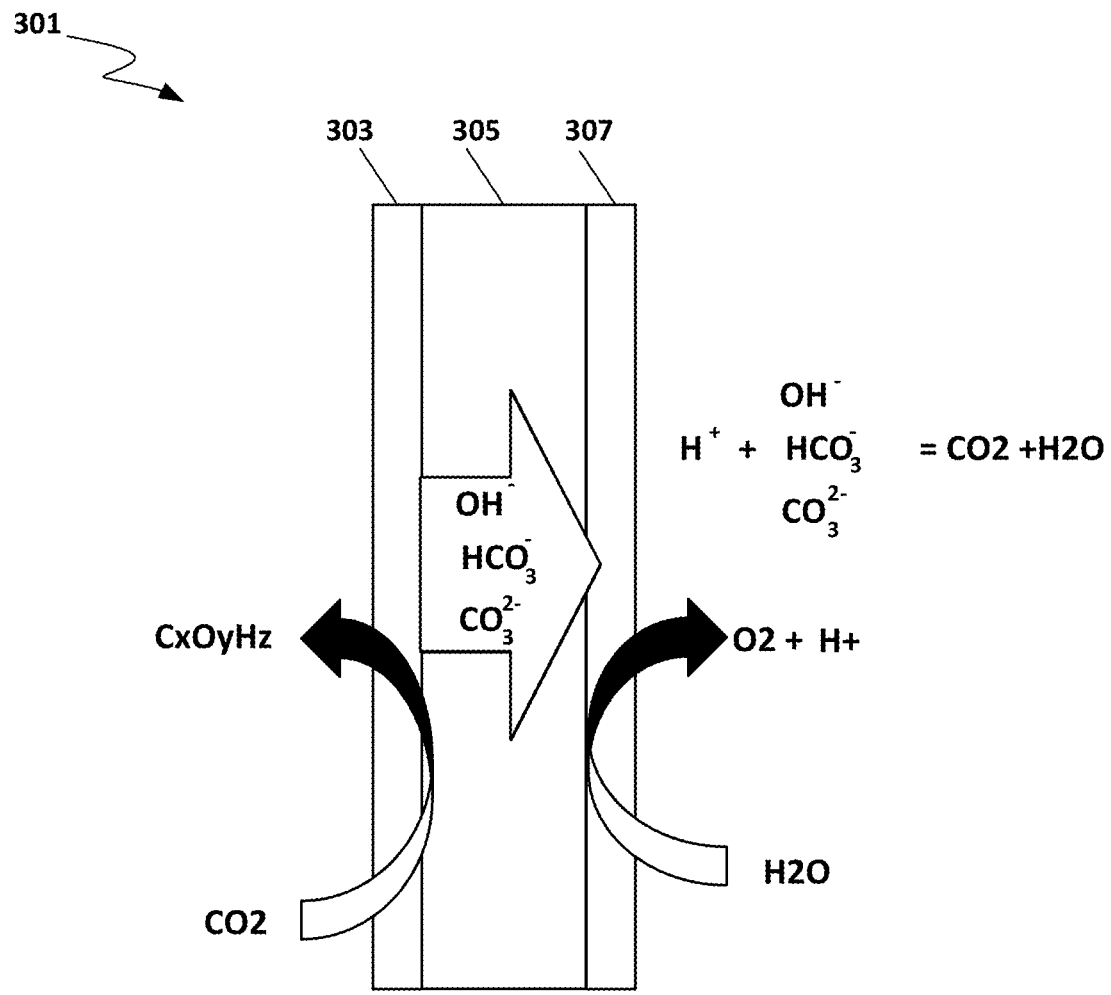
FIG. 3 depicts an example construction of a $CO_2$ reduction MEA having a cathode catalyst layer, an anode catalyst layer, and an anion-conducting PEM.

FIG. 3 illustrates an example construction of a $CO_2$ reduction MEA 301 having a cathode catalyst layer 303, an anode catalyst layer 305, and an anion-conducting PEM 307. In certain embodiments, cathode catalyst layer 303 may include metal catalyst particles (e.g., nanoparticles) that are unsupported or supported on a conductive substrate such as carbon particles. In some implementations, cathode catalyst layer 303 additionally includes an anion-conducting polymer. The metal catalyst particles may catalyze $CO_2$ reduction, particularly at pH greater than 7. In certain embodiments, anode catalyst layer 305 includes metal oxide catalyst particles (e.g., nanoparticles) that are unsupported or supported on a conductive substrate such as carbon particles. In some implementations, the anode catalyst layer 305 may additionally include an anion-conducting polymer. Examples of metal oxide catalyst particles for anode catalyst layer 305 may include iridium oxide, nickel oxide, nickel iron oxide, iridium ruthenium oxide, platinum oxide, and the like. The anion-conducting PEM 307 may include any of various anion-conducting polymers such as, for example, HNN5/HNN8 by Ionomr, FumaSep by Fumatech, TM1 by Orion, PAP-TP by W7energy, Sustainion by Dioxide Materials, and the like. These and other anion-conducting polymer that have an ion exchange capacity (IEC) ranging from 1.1 to 2.6, working pH ranges from 0-14, limited solubility in some organic solvents, reasonable thermal stability and mechanical stability, good ionic conductivity/ASR and acceptable water uptake/swelling ratio may be used. The polymers may be chemically exchanged to certain anions instead of halogen anions prior to use.

As illustrated in FIG. 3, $CO_2$, such as $CO_2$ gas, may be provided to cathode catalyst layer 303. In certain embodiments, the $CO_2$ may be provided via a gas diffusion electrode. At the cathode catalyst layer 303, the $CO_2$ reacts to produce reduction product indicated generically as $C_xO_yH_z$. Anions produced at the cathode catalyst layer 303 may include hydroxide, carbonate, and/or bicarbonate. These may diffuse, migrate, or otherwise move to the anode catalyst layer 305. At the anode catalyst layer 305, an oxidation reaction may occur such as oxidation of water to produce diatomic oxygen and hydrogen ions. In some applications, the hydrogen ions may react with hydroxide, carbonate, and/or bicarbonate to produce water, carbonic acid, and/or $CO_2$. Fewer interfaces give lower resistance. In some embodiments, a highly basic environment is maintained for C2 and C3 hydrocarbon synthesis.

Figure 4:
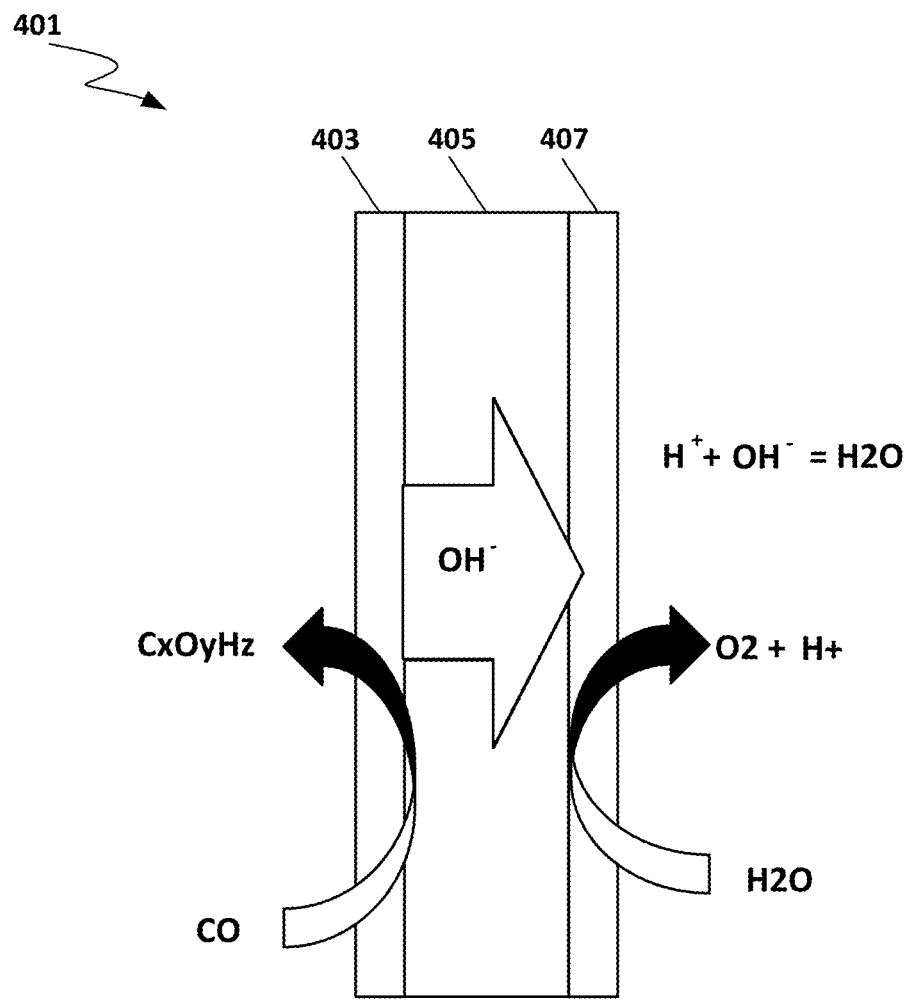
FIG. 4 depicts an example construction of a CO reduction MEA having a cathode catalyst layer, an anode catalyst layer, and an anion-conducting PEM.

FIG. 4 illustrates an example construction of a CO reduction MEA 401 having a cathode catalyst layer 403, an anode catalyst layer 405, and an anion-conducting PEM 407. Overall, the constructions of MEA 401 may be similar to that of MEA 301 in FIG. 3. However, the cathode catalyst may be chosen to promote a CO reduction reaction, which means that different reduction catalysts would be used in CO and $CO_2$ reduction embodiments.

In some embodiments, an AEM-only MEA may be advantageous for CO reduction. The water uptake number of the AEM material can be selected to help regulate moisture at the catalyst interface, thereby improving CO availability to the catalyst. AEM-only membranes can be favorable for CO reduction due to this reason. Bipolar membranes can be more favorable for $CO_2$ reduction due to better resistance to $CO_2$ dissolving and crossover in basic anolyte media.

In various embodiments, cathode catalyst layer 403 may include metal catalyst particles (e.g., nanoparticles) that are unsupported or supported on a conductive substrate such as carbon particles. In some implementations, cathode catalyst layer 403 may additionally include an anion-conducting polymer. In certain embodiments, anode catalyst layer 405 includes metal oxide catalyst particles (e.g., nanoparticles) that are unsupported or supported on a conductive substrate such as carbon particles. In some implementations, the anode catalyst layer 405 may additionally include an anion-conducting polymer. Examples of metal oxide catalyst particles for anode catalyst layer 405 may include those identified for the anode catalyst layer 305 of FIG. 3. Anion-conducting PEM 407 may include any of various anion-conducting polymers such as, for example, those identified for the PEM 307 of FIG. 3.

As illustrated in FIG. 4, CO gas may be provided to cathode catalyst layer 403. In certain embodiments, the CO may be provided via a gas diffusion electrode. At the cathode catalyst layer 403, the CO may react to produce reduction product indicated generically as $C_xO_yH_z$.

Anions produced at the cathode catalyst layer 403 may include hydroxide ions. These may diffuse, migrate, or otherwise move to the anode catalyst layer 405. At the anode catalyst layer 405, an oxidation reaction may occur such as oxidation of water to produce diatomic oxygen and hydrogen ions. In some applications, the hydrogen ions may react with hydroxide ions to produce water.

While the general configuration of the MEA 401 is similar to that of MEA 301, there are certain differences in the MEAs. First, MEAs may be wetter for CO reduction, helping the catalyst surface to have more —H. Also, for $CO_2$ reduction, a significant amount of $CO_2$ may be dissolved and then transferred to the anode for an AEM-only MEA such as shown in FIG. 3. For CO reduction, there is less likely to be significant CO gas crossover. In this case, the reaction environment could be very basic. MEA materials, including the catalyst, may be selected to have good stability in high pH environment. In some embodiments, a thinner membrane may be used for CO reduction than for $CO_2$ reduction.

Example of AEM-only MEA

1. Copper metal (USRN 40 nm thick Cu, ~0.05 mg/cm$^2$) was deposited onto a porous carbon sheet (Sigracet 39BC gas diffusion layer) via electron beam deposition. Ir metal nanoparticles were deposited onto a porous titanium sheet at a loading of 3 mg/cm$^2$ via drop casting. An anion-exchange membrane from Ionomr (25-50 μm, 80 mS/cm$^2$ OH— conductivity, 2-3 mS/cm$^2$ $HCO_3^-$ conductivity, 33-37% water uptake) was sandwiched between the porous carbon and titanium sheets with the electrocatalyst layers facing the membrane.
2. Sigma Aldrich 80 nm spherical Cu nanoparticles, mixed with FAA-3 anion exchange solid polymer electrolyte from Fumatech, FAA-3 to catalyst mass ratio of 0.10, setup as described above.

US Patent Application Publication No. US 2017/0321334, published Nov. 9, 2017 and US Patent Application Publication No. 20190226103, published Jul. 25, 2019, which describe various features and examples of MEAs, are incorporated herein by reference in their entireties. All publications referred to herein are incorporated by reference in their entireties as if fully set forth herein.

While the above discussion has provided a general overview of various aspects of $CO_x$ MEA construction and characteristics, the following discussion is intended to more directly address other aspects of a $CO_x$ electrolyzer cell.

Figure 5:
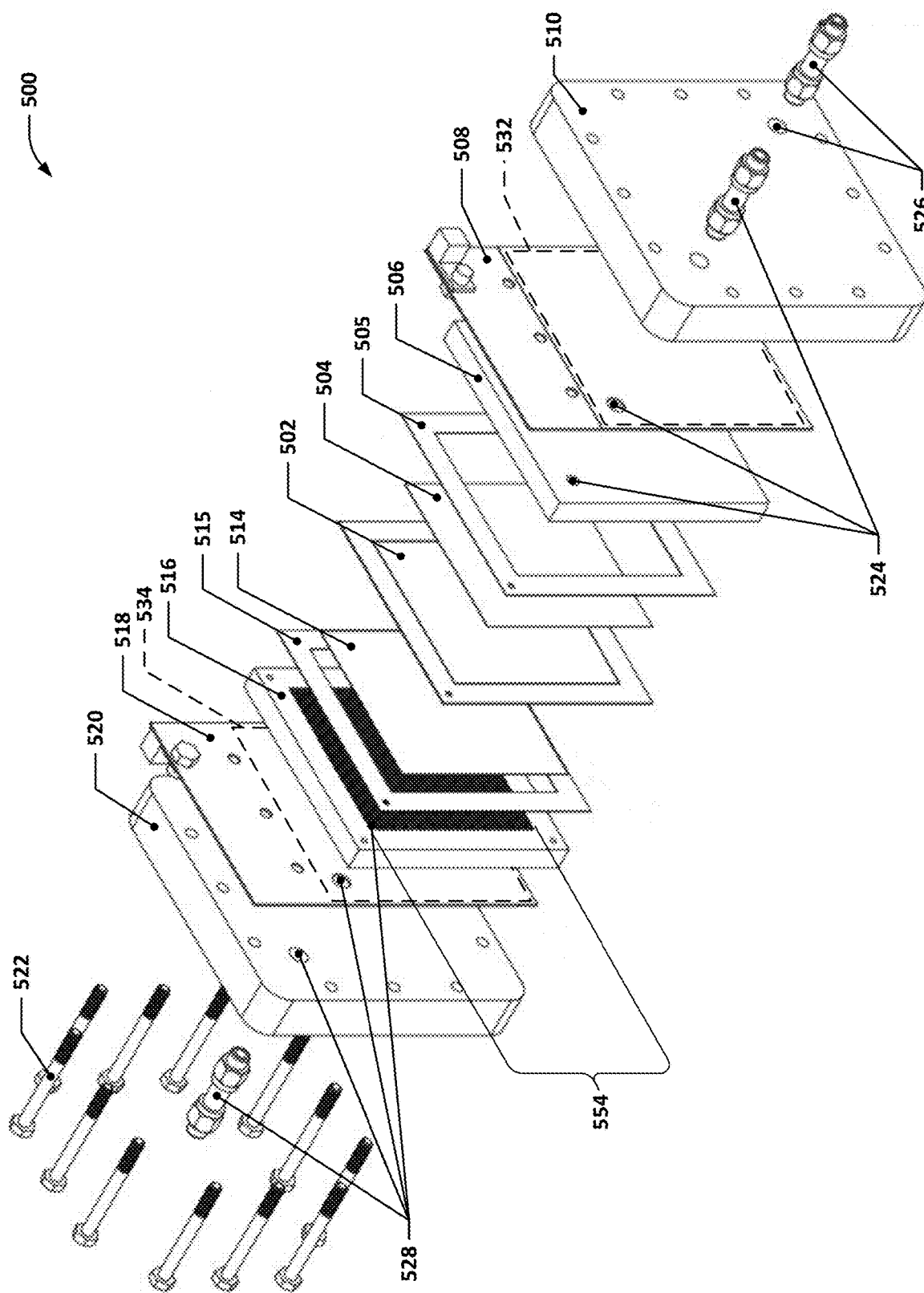
FIG. 5 depicts an exploded view of an example $CO_x$ electrolyzer cell.

FIG. 5 depicts an exploded view of a typical $CO_x$ electrolyzer cell 500. The cell 500 may include an MEA 502 that is interposed between an anode gas diffusion layer (GDL) 504 and a cathode GDL 514. The anode GDL 504 may, in turn, be interposed between the MEA 502 and an anode flow field 506, and the cathode GDL 514 may similarly be interposed between the MEA 502 and a cathode flow field 516. The anode GDL 504 may, for example, be surrounded by an anode gasket 505, and the cathode GDL 514 may be surrounded by a cathode gasket 515; the gaskets 505 and 515 may provide a fluidic seal between the MEA 502 and the corresponding flow fields 506 and 516 while also providing structural support that prevents over-compression of the GDLs 504 and 514 yet being thin enough that the GDLs are not under-compressed (for example, the gaskets 505 and 515 may be sized such that the GDLs are compressed such that the GDLs seal against the flow fields 506 and 516 so as to maintain constant electrical contact while preventing or discouraging fluids from pooling). Similarly, the anode flow field 506 may be interposed between the anode GDL 504 and an anode conductor plate 508 and the cathode flow field 516 may be interposed between the cathode GDL 514 and a cathode conductor plate 518. This entire stack of elements may then be compressed between an anode end plate 510 and a cathode end plate 520, which may, for example, be clamped together using threaded fasteners 522 or other similar clamping mechanism. The anode end plate 510 and the cathode end plate 520 may act as load spreaders, evenly distributing the clamping load across the intervening layers of the electrolyzer cell 500.

Each element within the cell may provide particular functionality within the cell 500. As indicated, the anode end plate 510 and the cathode end plate 520 may generally serve to act as load-spreading members that act to distribute a clamping load relatively evenly over the other stacked elements of the cell 500. The anode end plate 510 may include, for example, at least a portion of one or more fluidic inlet ports 524 and at least a portion of one or more fluidic outlet ports 526 that may be used to convey fluid to and from the anode side of the cell 500. In some implementations, the fluidic inlet port(s) 524 and/or fluidic outlet port(s) 526 may instead be located, at least partially, on a surface of the anode flow field 506 and/or reversed in position.

Correspondingly, the cathode end plate 520 may include, for example, at least a portion of one or more fluidic inlet ports 528 and at least a portion of one or more fluidic outlet ports 530 (not shown, but in a similar location on the cathode side relative to the one or more fluidic inlet ports 528 as the one or more fluidic outlet ports 526 are with respect to the one or more fluidic inlet ports 524 on the anode side) that may be used to convey fluid to and from the cathode side of the cell 500. In the case of a $CO_x$ electrolyzer, the fluid that is typically flowed through the fluidic inlet port(s) 528 is gaseous $CO_x$, e.g., CO and/or $CO_2$. In some implementations, at least a portion of the fluidic inlet port(s) 528 and/or fluidic outlet port(s) 530 may be located on a surface of the cathode flow field 516. It will be further recognized that the locations of the inlet port(s) 524/outlet port(s) 526 and/or the inlet port(s) 528 and the outlet ports 530 may, in some cases, be flipped from what is shown in FIG. 5.

The anode conductor plate 508 and the cathode conductor plate 518 may be used to allow the cell 500 to be electrically connected with a voltage or current source to generate an electrical potential or current across the cell 500 that may drive the reduction and oxidation reactions within the cell 500. The anode conductor plate 508 and the cathode conductor plate 518 may each include one or more holes or feedthroughs to allow fluid from the fluidic inlet port(s) 524 and 528 to pass through the respective anode conductor plate 508 or cathode conductor plate 518 and into the corresponding anode flow field 506 or cathode flow field 516. Similarly, the anode conductor plate 508 and the cathode conductor plate 518 may also each include one or more holes or feedthroughs to allow fluid from the corresponding anode flow field 506 or cathode flow field 516 to pass through the respective anode conductor plate 508 or cathode conductor plate 518 and out of the respective fluidic outlet port(s) 526 or 530.

The anode conductor plate 508 may, for example, be electrically connected with a positive terminal of a voltage or current source and the cathode conductor plate 518 may be electrically connected with a negative terminal of a voltage or current source. The anode conductor plate 508 and the cathode conductor plate 518 may, for example, have lugs, terminal blocks, or other electrical connection mechanisms to facilitate electrical connections between each conductor plate and an appropriate positive or negative voltage or current source. When an electrical potential difference is imposed on the cell 500 through application of a voltage or current across the anode conductor plate 508 and the cathode conductor plate 518, the resulting electrical potential difference causes an oxidation reaction at the anode (e.g., oxidation of water to molecular oxygen) and a reduction reaction at the cathode, e.g., that converts the $CO_x$ into carbon monoxide, a hydrocarbon, and/or other catalyst-specific byproducts.

The anode conductor plate 508 may, for example, be electrically insulated from the anode end plate 510 by a layer of electrically insulating material 532 that may be interposed between the electrically conductive portion of the anode conductor plate 508 and the anode end plate 510. Such a layer of electrically insulating material 532 may be separate from the anode conductor plate 508, bonded to it, or bonded instead to the side of the anode end plate 510-regardless of how it is provided, the layer of electrically insulating material 532 may provide electrical isolation between the anode conductor plate 508 and the anode end plate 510. In cells 500 where the anode end plate 510 is made of an electrically non-conductive material, or in which the anode end plate 510 is otherwise electrically isolated from, for example, the cathode conductor plate 518 and/or the cathode end plate 520, the layer of electrically insulating material 532 may be omitted. Similarly, the cathode conductor plate 518 may be electrically insulated from the cathode end plate 520 by a layer of electrically insulating material 534, which may act in a similar manner as the layer of electrically insulating material 532 does with respect to the anode conductor plate 508 and the anode end plate 510, but with respect to the cathode end plate 520 and the cathode conductor plate 518. The layer of electrically insulating material 534 may similarly be separate from the cathode conductor plate 518 and/or the cathode end plate 520 or be bonded to one or the other thereof. In some implementations, the layer of electrically insulating material 534 may be omitted entirely if the cathode conductor plate 518 is otherwise electrically isolated from the cathode end plate 520. In some implementations, the cathode conductor plate 518 may even be allowed to come into electrically conductive contact with the cathode end plate 520 if the components of the cell 500 are otherwise configured to maintain electrical isolation between the cathode conductor plate 518 and the anode conductor plate 508 other than through the conductive path through the MEA 502.

The anode conductor plate 508 may be in electrically conductive contact with the anode flow field 506; similarly, the cathode conductor plate 518 may be in electrically conductive contact with the cathode flow field 516. The flow fields 506 and 516 may be made from any of a variety of materials that are electrically conductive and otherwise capable of withstanding long-term exposure to the fluids flowed within them during normal operating conditions. For example, the flow fields 506 and 516 may be made, in some implementations, from titanium or titanium alloy, stainless steel (although stainless steel may have a higher susceptibility to corrosion than other materials), porous graphite, carbon-fiber reinforced thermoset polymer, etc.

The anode conductor plate 508 and the cathode conductor plate 518 may, in some implementations, be provided with a highly electrically conductive coating, e.g., gold plating, copper plating, or other material with high electrical conductivity, to provide a higher level of electrical conductivity between the conductor plates and the flow fields that they respectively electrically connect with. In some implementations in which a flow field or both flow fields are made from a mechanically stable, conductive material, e.g., a metal, and/or have sufficient strength to support it, separate conductor plates 508 and 518 may be omitted, with the terminals or other connectors that facilitate the electrical connections to the electrolyzer cell 500 being either part of the flow field(s) or installed directly onto the flow field(s).

The flow fields 506 and 516 may have inlets and outlets that correspond in location to the fluidic inlet ports 524 and 528, respectively, and the fluidic outlet ports 526 and 530, respectively. The flow fields 506 and 516 may each have one or more channels that are formed in faces of the flow fields 506 and 516 that contact the anode GDL 504 and the cathode GDL 514, respectively, that are routed so as to allow the fluid that is conducted through the channels to come into contact with the adjacent GDL in a generally distributed manner.

For example, the anode flow field 506 may feature one or more inlet openings and one or more outlet openings that may, respectively, fluidically connect with the fluidic inlet port 524 and the fluidic outlet port 526 (in FIG. 5, these are holes in the flow fields that align with the holes for the fluidic inlet ports 524 and 528 and fluidic outlet ports 526 and 530, as appropriate, when assembled). One or more anode channels, e.g., serpentine channels, may be provided in a surface of the anode flow field 506 that is in contact with the anode GDL 504. The anode channels may serve to distribute the fluid introduced into the anode side of the cell 500 across the anode GDL 504 such that the anode fluid is able to come into contact with the anode GDL 504 in a spatially distributed manner such that the anode fluid may be allowed to flow through the anode GDL 504 in a relatively uniform manner across the entire area, or most of the entire area, of the anode GDL 504.

Similarly, the cathode flow field 516 may feature one or more inlet openings and one or more outlet openings that may, respectively, fluidically connect with the fluidic inlet port 528 and the fluidic outlet port 530 (as discussed above). One or more cathode channels 554 may be provided in a surface of the cathode flow field 516 that is in contact with the cathode GDL 514. The cathode channels 554 may serve to distribute the fluid introduced into the cathode side of the cell 500 across the cathode GDL 514 such that the cathode fluid is able to come into contact with the cathode GDL 514 in a spatially distributed manner such that the cathode fluid may be allowed to flow through the cathode GDL 514 in a relatively uniform manner across the entire area, or most of the entire area, of the cathode GDL 514.

The anode GDL 504 and the cathode GDL 514 may both serve to help gases that are generated within or provided via the anode flow field 506 and the cathode flow field 516, respectively, to diffuse across the active area of the MEA 502. A typical GDL suitable for use in a $CO_x$ electrolyzer may include, for example, a fibrous substrate that provides structural support, e.g., to the catalyst layer in the MEA 502, and may allow gas to flow from the adjacent flow field towards the MEA (including in directions parallel to the plane of the MEA 502, thereby allowing the gas to flow laterally underneath portions of the adjacent flow field that may be in contact with the GDL). Such a GDL may also permit water that is present in the MEA 502 or that is trapped within the GDL and/or trapped between that GDL and the MEA 502 to escape into the channel(s) of a flow field that is adjacent to the GDL, thereby potentially allowing that water to be expelled from that flow field as a result of fluid flow through that flow field. The GDLs also serve as electrical conductors that serve to conduct electrical charge through the MEA 502.

The MEA 502 for a $CO_x$ electrolyzer may feature a metal nanoparticle catalyst layer that is pressed into contact with the cathode GDL 514; in some implementations, the metal nanoparticle catalyst layer may alternatively be formed on the cathode GDL 514 and pressed into contact with the MEA 502, and in yet further implementations, there may be metal nanoparticle catalyst layers that may be formed on both the MEA 502 and the cathode GDL 514 and then pressed into contact with each other. One example of such a catalyst layer is a layer of carbon material supporting a layer of, or incorporating, gold nanoparticles. Various types of MEAs and appropriate catalysts for use in a $CO_x$ electrolyzer are discussed in U.S. patent application Ser. Nos. 15/586,173 and 15/586,182, both filed May 3, 2017, and both titled "REACTOR WITH ADVANCED ARCHITECTURE FOR THE ELECTROCHEMICAL REACTION OF $CO_2$, CO, AND OTHER CHEMICAL COMPOUNDS," and U.S. Patent Application No. 62/939,960, filed Nov. 25, 2019, and titled "MEMBRANE ELECTRODE ASSEMBLY FOR $CO_x$ REDUCTION," all of which are hereby incorporated herein by reference in their entireties.

Figure 6:
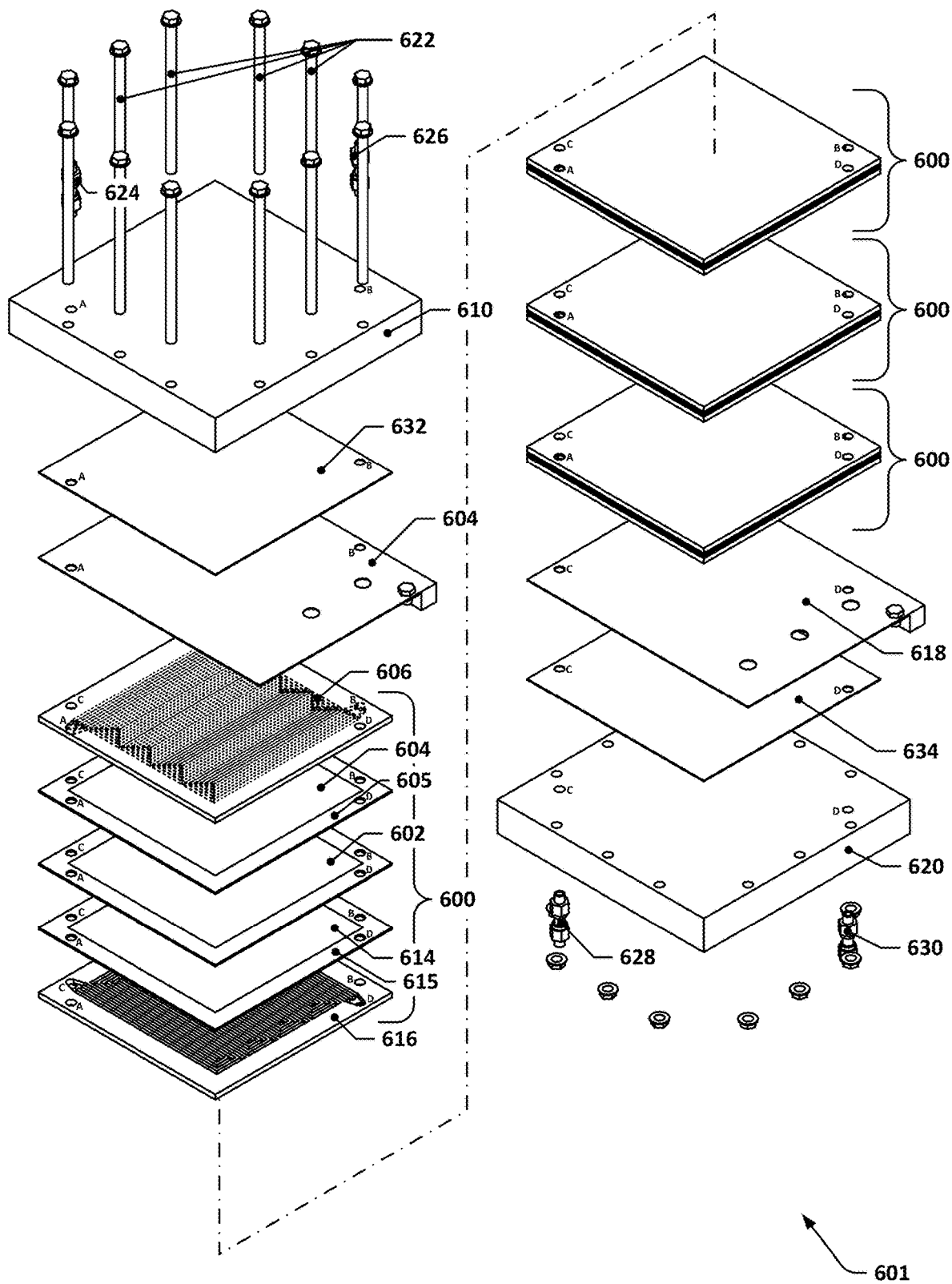
FIG. 6 depicts an exploded view of an example multi-cell $CO_x$ electrolyzer stack.
Figure 7:
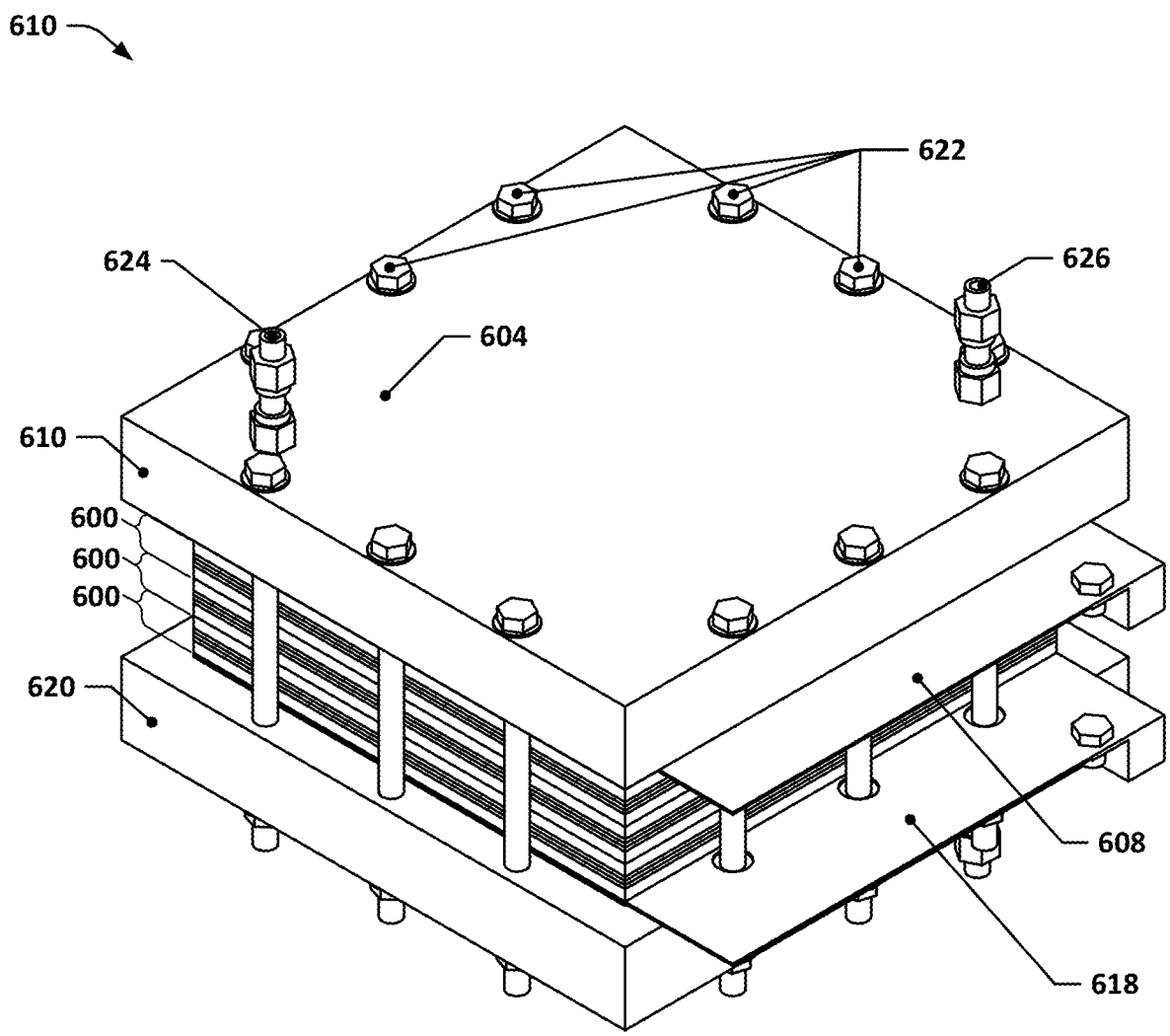
FIG. 7 depicts a non-exploded view of the example multi-cell $CO_x$ electrolyzer of FIG. 6.

The cell architecture discussed above with respect to FIG. 5 may also be implemented in a similar configuration but using multiple cells. FIG. 6, for example, shows an example multi-cell stack that may be used to, in effect, allow multiple cells to be served by common fluidic inlet ports/outlet ports and/or a common electrical potential source. FIG. 7 depicts the example multi-cell stack of FIG. 6 but with a non-exploded view. It is important to note here that the overall multi-cell stack performance is partially defined by the uniformity of electrical efficiency and product selectivity across the multiple cells, and this uniformity is very often driven by the uniformity of gas flow delivery to/across each of the cells. To this point, the selection of flow field geometry, in that it relates to flow field pressure drop (as discussed below), may have a large effect on overall stack flow uniformity. This is because the flow uniformity is improved when the pressure drop across/through the cells is about an order of magnitude more than any pressure difference between discrete locations along a plenum where collective flow is distributed into individual cells within the stack. Thus, optimizing the flow field dimensions may be significant when working with a fixed plenum geometry toward the overall stack performance.

In FIG. 6, a stack 601 is provided that includes an array of four cells 600 that are stacked one on top of another. Each cell 600 is generally similar in overall construction to the cell 500 of FIG. 5, and includes an MEA 602, an anode GDL 604 (and anode gasket 605), a cathode GDL 614 (and cathode gasket 615), an anode flow field 606 (the anode channels are shown in dotted outlines, but would not actually be visible in this view since they are located on the side of the anode flow field 606 facing downward in the Figure), and a cathode flow field 616. The cells 600 differ somewhat from the cells 500 in that the cells 600 share a common anode conductor plate 608, cathode conductor plate 618, anode end plate 610, cathode end plate 620, and layers of electrically insulating material 632 and 634. The cells 600 also share common fluidic inlet ports 624 and 628 as well as common fluidic outlet ports 626 and 630. In view of the above, it will be understood that a "cell," as the term is used herein, may refer to both cells that have one or both of the conductor plates (or other mechanism for providing electrical potential across the cells 600, e.g., flow fields on opposing ends of the stack 601 with electrical terminals that allow the flow fields to be electrically connected with an electrical potential source).

When assembled, the cells 600 that are stacked one on top of another may be sandwiched between the anode conductor plate 608 and the cathode conductor plate 618, thereby allowing an electrical potential to be developed across the entire stack of cells 600 when the anode conductor plate 608 and the cathode conductor plate 618 are connected with an appropriate voltage or current source. In effect, the cells 600 form an electrical circuit in which the cells 600 are arranged in series. At the same time, the anode end plate 610 and the cathode end plate 620 may, through compression provided by tightening threaded fasteners 622, compress the cells 600, and anode conductor plate 608 and the cathode conductor plate 618 (and the layers of electrically insulating material 632 and 634) to cause the entire stack to be clamped together, thereby causing the various layers to be sealed against one another and providing for a leak-tight assembly.

Fluids that are provided through the fluidic inlet ports 624 and 628 may travel through the stack 601 via plenum holes A and C, respectively, before entering the anode flow fields 606 and cathode flow fields 616, respectively, whereas fluids that exit the anode flow fields 606 and cathode flow fields 616 may travel through the stack 601 via plenum holes B and D, respectively, before exiting the stack 601 via fluidic outlet ports 626 and 630, respectively. It will be appreciated that other implementations may feature alternative arrangements for providing parallel fluid flow through the flow fields, e.g., fluids may be introduced into the flow fields via ports located on the sides of the flow fields via a plenum structure or structures that are attached to the side(s) of the stack 601.

In some stack implementations, the anode flow field 606 and the cathode flow field 616 may be combined into one component. For example, in locations in the stack where one of the anode flow fields 606 and one of the cathode flow fields 616 are in contact with each other, such discrete components may be replaced by a single-component flow field that, for example, includes a plate that has the channel(s) from the anode flow field 606 on one side and the channel(s) from the cathode flow field 616 on the other.

It will be appreciated that such arrangements allow multiple cells 600 to be run in parallel but using common fluidic inlet ports and fluidic outlet ports, as well as common electrical connections. Additionally, it will be recognized and understood that while the implementation of FIG. 6 shows a 4-cell stack 601, other implementations may feature greater or fewer numbers of cells, e.g., 2-cell or 3-cell stacks 601, or stacks with as many as 5 cells, 10 cells, 20 cells, 50 cells, 100 cells, 200 cells, etc. It will also be appreciated that while the cells in the depicted example $CO_x$ electrolyzers of FIGS. 5-7 are relatively small in terms of the size of the MEA area compared to the channel width, other $CO_x$ electrolyzers may be sized to have considerably larger MEAs compared to channel width. For example, MEAs may range from 5×5 cm to 10×10 cm all the way up to 80×80 cm or higher. MEAs also do not necessarily need to be square in aspect ratio, as shown in FIGS. 5 through 7.

As mentioned earlier, in a $CO_x$ electrolyzer, liquid water may be provided to the anode side of the cell 500 during operation, while gaseous $CO_x$ may be provided to the cathode side of the cell 500. In some implementations, an aqueous solution may be provided in place of water, and references to water herein may be understood to also be inclusive of the use of an aqueous solution as well. The liquid water may, through an electrolysis reaction on the anode side of the cell 500, undergo oxidation to create oxygen ($O_2$) gas, H+ protons, and electrons. The H+ protons may be drawn through the MEA 502 due to the electromagnetic field that is present within the cell 500 due to the electrical potential that is applied across the cell 500 and may react with the bicarbonate and/or hydroxide and/or formate that is produced at the cathode.

For a variety of other reasons, water may enter the cathode of the MEA. In some implementations, liquid water is transported by one or more phenomena to the cathode. Thus, water molecules from the anode side of the cell 500 may be transported to the cathode side of the cell 500, e.g., through electroosmotic drag caused by the movement of the H+ protons from the anode side of the cell 500 to the cathode side of the cell 500. The rate of water delivery to and/or generation within the cathode side of the cell 500 may be quite high, e.g., for every molecule of CO gas that is produced through reduction of $CO_x$ gas, there may be, for example, between 5 and 9 molecules of water may be generated in and/or drawn to the cathode side of the cell 500. This imbalance presents a significant challenge—for every molecule of $CO_x$ gas that is reduced on the cathode side of the cell 500, between 5 and 9 molecules of water may need to be removed from the cathode side of the cell 500. In some $CO_x$ gas electrolyzers, such as those that may use a copper catalyst and may be used to generate $CH_4$, for every molecule of $CO_x$ gas that is reduced on the cathode side of the cell 500, between 5 and 36 molecules of water may need to be removed from the cathode side of the cell 500, presenting an even greater water management challenge.

This imbalance between the rate of $CO_x$ gas reduction and rate of water accumulation on the cathode side of the cell 500 is further complicated by the relatively low gas flow rate of $CO_x$ gas as compared with the typical gas flow rate on the cathode side in fuel cells, as well as the relatively lower temperatures and higher pressures used in $CO_x$ electrolyzers as compared with fuel cells. For example, fuel cells may dilute the flow of $O_2$ in the cathode of a fuel cell using nitrogen ($N_2$), thereby allowing a higher volumetric flow rate to be used in a fuel cell than may be used in a $CO_x$ electrolyzer. Such higher volumetric flow rates may allow for a faster rate of water molecule evacuation to be provided for in a fuel cell as compared with a $CO_x$ electrolyzer. In contrast, the $CO_x$ gas that is provided to a $CO_x$ electrolyzer may generally be high-purity $CO_x$ gas, which, in combination with the higher working pressures that may be common in $CO_x$ electrolyzers, may allow for much lower volumetric flow rates to be used to provide a similar level of desired reactant gas flow within a $CO_x$ electrolyzer as compared to a comparably sized fuel cell. The generally slower flow rate that is present in a $CO_x$ electrolyzer as opposed to in a fuel cell may, in combination with the higher rate of water creation in and/or migration to the cathode side of the cell 500 cause significant issues in a $CO_x$ electrolyzer if not adequately handled that are not as significant a concern in fuel cells.

For example, approximately 90% of the water that is generated in/delivered to the cathode side of the cell during operation of a fuel cell may be in vapor phase, and thus easily flowed out of the cathode flow field 516 as compared with the water that is generated in/delivered to the cathode side of the cell 500 during operation of a $CO_x$ electrolyzer. In a typical $CO_x$ electrolyzer, less than 2% of the water that is generated in/delivered to the cathode side of the cell 500 may be in vapor phase; the rest is in liquid phase. As a result of this significant liquid/vapor phase imbalance, as well as the significantly higher rate of water condensation in $CO_x$ electrolyzers, $CO_x$ electrolyzers are confronted with unique problems with liquid water management that are not encountered in fuel cells. Such issues are, of course, also not present in water electrolyzers since the reactant that is delivered to the cathode side of water electrolyzers in the first place is liquid water, and the presence of liquid water in the cathode is thus not only expected but desired and by design.

In $CO_x$ electrolyzers, the presence of high concentrations of liquid water on the cathode side of the cell 500 presents particular challenges that must be overcome in order for $CO_x$ electrolyzers to be able to operate efficiently. In particular, the presence of liquid water in the cathode side of $CO_x$ electrolyzers may interfere with the flow of gaseous $CO_x$ through the cathode GDL 514 to the MEA 502. For example, excess liquid water that collects in the cathode channels 554 and/or the cathode GDL 514 may form a physical barrier that occludes portions of the cathode channels 554 and/or the cathode GDL 514 and prevents the gaseous $CO_x$ from coming into contact with some or all of the MEA 502. This limits the reduction efficiency of the cell 500 and may even, in some cases, cause permanent damage to the cell 500 that may decrease the reduction efficiency of the cell 500 going forward even if the liquid water is later removed. An additional issue that may occur if there is excess liquid water present in a $CO_x$ electrolyzer is that the water may be reduced instead of the $CO_x$ gas, resulting in the production of hydrogen instead of the desired reaction product.

$CO_x$ electrolyzers may not only experience significantly higher rates of liquid water generation as compared with similarly sized fuel cell reactors, but may also tend to operate under conditions that tend to inhibit, at least in comparison to fuel cells, the ability of $CO_x$ electrolyzers to compensate for such increased liquid water generation in some respects. For example, the input gas, e.g., air, that is provided to the cathode side of fuel cells tends to be provided at a higher flow rate as compared with the input gas that is provided to the cathode side of $CO_x$ electrolyzers. As air is abundantly available, there is little concern with respect to a fuel cell with providing more air than can be utilized in the reduction reaction of a fuel cell. As a result, air may be provided to the cathode flow field in fuel cell at a much higher flow rate than may be needed in order to support the reduction reaction taking place within the fuel cell, thereby allowing more kinetic energy to be available in fuel cell cathode input gas flows that may be used to assist with forcibly expelling water that has accumulated within the fuel cell cathode flow field. Further, in fuel cells, the oxidant gas may commonly be diluted with other gases, e.g., nitrogen in air, and higher flow rates may thus be used to ensure a sufficient rate of delivery of the oxidant gas to the cathode side of the fuel cell. The increased flow velocity in fuel cells may serve to forcibly push any potential droplets of liquid water that are present in the cathode flow field channel(s) through the flow field and to the fluidic outlet port of the cathode flow field, thereby rapidly evacuating what little liquid water is present in the flow field channels from the flow field.

In contrast, the input gas in a $CO_x$ electrolyzer is the $CO_x$ gas, and one of the main reasons for using $CO_x$ electrolyzers is to reduce $CO_x$ emissions that may be harmful to the environment by converting $CO_x$ gas to other, more desirable gases or liquids (such as commercially valuable gases or liquids or gases or liquids that are less harmful to the environment, e.g., water and/or oxygen). It may thus be desirable to reduce the flow rate of the $CO_x$ gas to a level that still achieves high, and preferably maximal, $CO_x$ reduction for a given electrical current density used with a $CO_x$ electrolyzer but also reduces or minimizes the amount of extra $CO_x$ gas that is flowed through the $CO_x$ electrolyzer and is not reduced.

Due to such factors, $CO_x$ electrolyzers may operate using a high-purity, undiluted input gas stream or streams, e.g., pure $CO_x$ gas or relatively pure $CO_x$ gas, that is flowed into the cathode side of the cell at relatively low speeds, at least as compared with equivalently sized fuel cells having similar construction. For example, some $CO_x$ electrolyzers may be capable of operating at flow speeds comparable to or lower than those found in a typical fuel cell. In some implementations, $CO_x$ electrolyzers are configured to operate at an average $CO_x$ gas flow velocity in the flow field channels of between about 0.02 m/s and about 30 m/s, between about 0.02 m/s and about 15 m/s, between about 15 m/s and about 30 m/s, between about 0.02 m/s and about 7.5 m/s, between about 7.5 m/s and about 15 m/s, between about 15 m/s and about 23 m/s, between about 23 m/s and about 30 m/s, between about 0.02 m/s and about 3.8 m/s, between about 3.8 m/s and about 7.5 m/s, between about 7.5 m/s and about 11 m/s, between about 11 m/s and about 15 m/s, between about 15 m/s and about 19 m/s, between about 19 m/s and about 23 m/s, between about 23 m/s and about 26 m/s, or between about 26 m/s and about 30 m/s. In some implementations, $CO_x$ electrolyzers are configured to operate at a $CO_x$ gas flow velocity of about 2 m/s to 10 m/s, or about 5 m/s to 10 m/s, or about 7.5 m/s to about 10 m/s.

As indicated, in some implementations, relatively low flow rates provide advantages in $CO_x$ electrolyzers such as relatively high $CO_x$ utilizations (not to be confused with conversion efficiency) due to low molar flow rates, which are often associated with low volumetric or linear flow rates. Another benefit is in maintaining the MEA at an acceptable hydration level. High gas flow rates tend to dry out the MEA, which leads to degradation. Further, for a fixed utilization, lower gas speeds allow flow field designs having shorter channels, and hence more channels per cell. In some embodiments, $CO_x$ electrolyzers are configured to operate at a $CO_x$ flow speed in flow channels of between about 0.02 m/s and about 5 m/s, between about 0.02 m/s and about 2.5 m/s, between about 2.5 m/s and about 5 m/s, between about 0.02 m/s and about 1.3 m/s, between about 1.3 m/s and about 2.5 m/s, between about 2.5 m/s and about 3.8 m/s, between about 3.8 m/s and about 5 m/s, between about 0.02 m/s and about 0.64 m/s, between about 0.64 m/s and about 1.3 m/s, between about 1.3 m/s and about 1.9 m/s, between about 1.9 m/s and about 2.5 m/s, between about 2.5 m/s and about 3.1 m/s, between about 3.1 m/s and about 3.8 m/s, between about 3.8 m/s and about 4.4 m/s, or between about 4.4 m/s and about 5 m/s.

In contrast, the typically lower flow rates seen in $CO_x$ electrolyzers, coupled with the significantly higher rates of liquid water introduction into the cathode side of the cell 500, make water evacuation in $CO_x$ electrolyzers much more challenging as compared with other electrochemical devices, e.g., fuel cells or water electrolyzers.

Flow Field Design

Various features and technologies may be used to help mitigate the detrimental effects of liquid water accumulation in $CO_x$ electrolyzer cathodes. For example, the cathode flow field 516 may be constructed so as to have one or more structural features that may allow for more effective liquid water management within the cell 500.

For example, both the anode flow field 506 and the cathode flow field 516 may have a corresponding anode channel or channels 544 and cathode channel or channels 554, respectively. The cathode channel(s) 554 may, for example, be designed to have certain characteristics that may contribute to more effective water evacuation in the context of a $CO_x$ electrolyzer and/or that may mitigate the potential performance degradation that may occur in such a $CO_x$ electrolyzer in the event that liquid water collects within the cathode side of the cell 500.

Serpentine Channel Flow Fields

While various geometries of flow field channels may be used in $CO_x$ electrolyzers, multiple serpentine channels generally offer superior performance in terms of providing for reliable, even distribution of $CO_x$ gas to the cathode GDL 514, and thus the MEA 502, while also facilitating reliable removal of liquid water that may otherwise accumulate within the cathode flow field 516 and the cathode GDL 514. A serpentine channel typically has repeated longer segments that extend in generally parallel directions and are fluidically connected together by shorter segments that are fluidically interposed between them in alternating fashion, much like a switchback.

For the purposes of this disclosure, the term "fluidically connected" is used with respect to volumes, plenums, holes, etc., that may be structurally connected with one another in some way in order to form a fluidic connection, similar to how the term "electrically connected" is used with respect to components that are connected together to form an electric connection. The term "fluidically interposed," if used, may be used to refer to a component, volume, plenum, or hole that is fluidically connected with at least two other components, volumes, plenums, or holes such that fluid flowing from one of those other components, volumes, plenums, or holes to the other or another of those components, volumes, plenums, or holes would first flow through the "fluidically interposed" component before reaching that other or another of those components, volumes, plenums, or holes. For example, if a pump is fluidically interposed between a reservoir and an outlet, fluid that flowed from the reservoir to the outlet would first flow through the pump before reaching the outlet.

Figure 8:
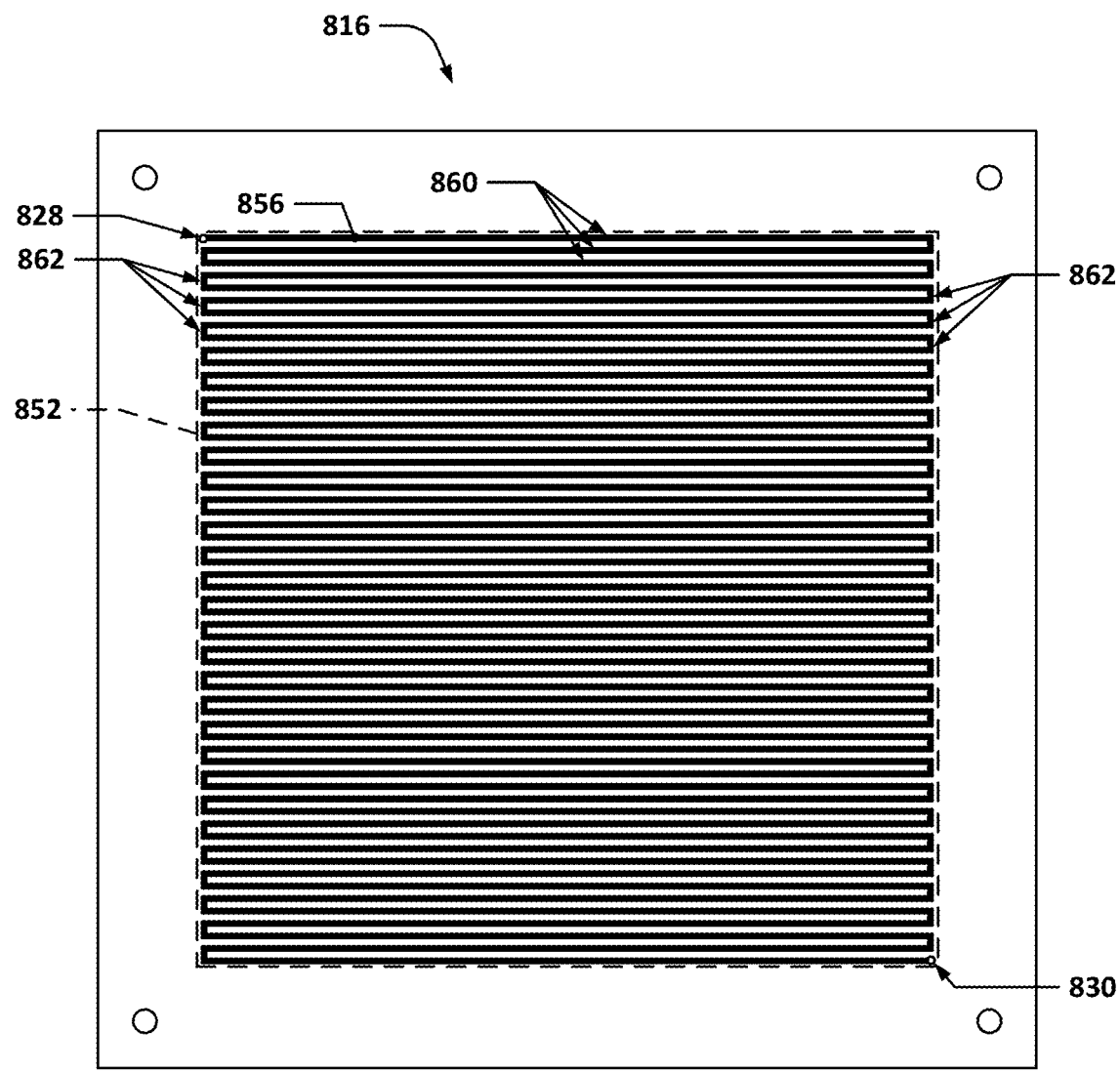
FIG. 8 depicts an example of a cathode flow field with a single serpentine channel.

Single serpentine channel arrangements may have limited water evacuation performance in the context of $CO_x$ electrolyzers for larger-area cells (e.g., larger than 100 $cm^2$). Nevertheless, their performance may be adequate for some applications. In a single serpentine channel arrangement, e.g., such as is shown in FIG. 8, a single, continuous serpentine channel 856 switchbacks across an area 852 of a cathode flow field 816 bounded by shorter segments 862 and first and last longer segments 860. The serpentine channel 856 is thus the only conduit for $CO_x$ gas to enter a corresponding cathode GDL and MEA and is also the only conduit for liquid water that comes into the cathode flow field 816 from the cathode GDL via that area. Thus, the rate at which liquid water is added to the serpentine channel 856 is equal to the rate at which liquid water flows out of the area 852 and into the cathode flow field 816. The high rate of liquid water introduction into such a serpentine channel 856, coupled with the long average distance that such water must travel in order to be pushed through the serpentine channel 856 before reaching a fluidic outlet port, such as fluidic outlet port 830, generally makes it very challenging to properly manage the liquid water levels within the cathode flow field 816, rendering $CO_x$ electrolyzers that use such single-channel serpentine cathode flow fields 816 with significantly compromised performance compared to $CO_x$ electrolyzers using, for example, multiple serpentine channel arrangements. In some implementations, a single serpentine channel has an overall channel length (distance from inlet to outlet) of about 12 m or less, or about 6 m or less, or about 2 m or less.

Figure 9:
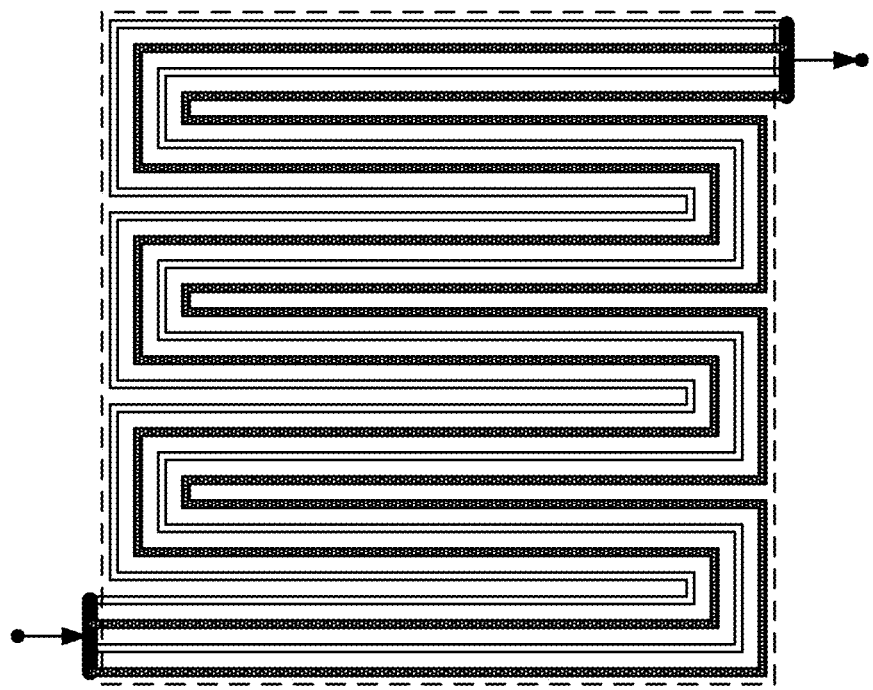
FIG. 9 depicts a diagram of an example multiple serpentine channel arrangement.
Figure 10:
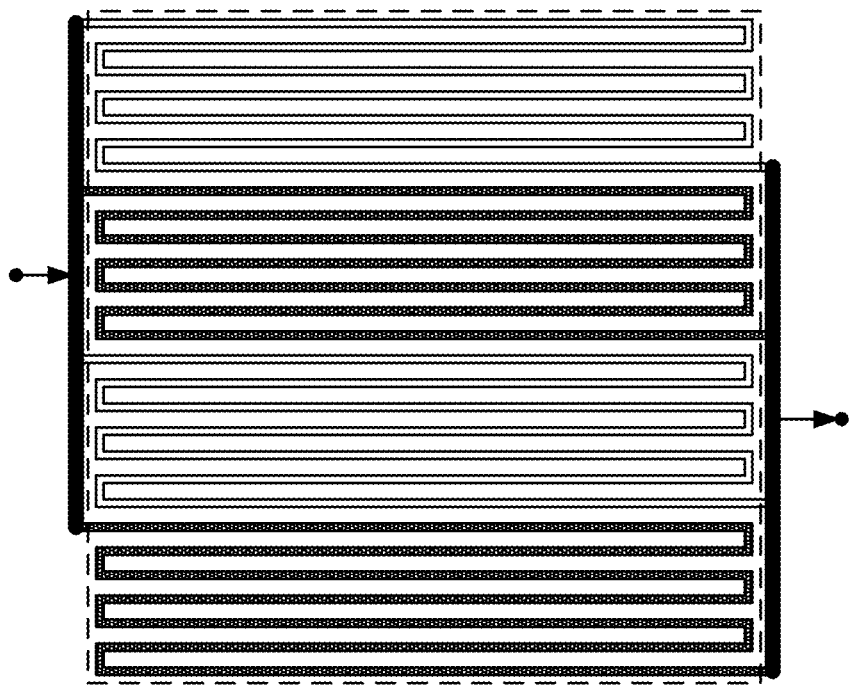
FIG. 10 depicts a diagram of another example multiple serpentine channel arrangement.

Multiple serpentine channels can refer to multiple separate serpentine channels that generally follow a common serpentine path, thereby resulting in an interleaved or nested arrangement of the separate serpentine channels, or can refer to multiple instances of the same serpentine channel (or nearly the same serpentine channel) that arranged side-by-side or otherwise arranged so as to flow in parallel. FIG. 9 depicts the former arrangement, which may also be referred to herein as nested or interleaved multiple serpentine channel arrangements. In FIG. 9, four serpentine channels that generally follow the same serpentine path are shown (two are shown with interiors with white fill and two with interiors with shaded fill to make it easier to differentiate between them; a broken-line rectangle representing the combined open channel area and wall footprint area of a flow field having such an arrangement is also shown). The open channel area refers to the total area through which gas may exit the flow field and travel into the GDL; in a flow field with constant- and equal-width paths, the open channel area would generally be equal to the total path length of the channel(s) times the channel width. The wall footprint area of a flow field refers to the area of the portion of the flow field that defines walls between adjacent portions of a channel or channels of the flow field and that is pressed into contact with the GDL. Thus, both areas are evaluated within the plane of the flow field that is pressed into contact with the GDL. Fluid may be introduced into/removed from the serpentine channels through the inlet and outlet ports (the short segments terminating in small solid black circles). In FIG. 10, a similar arrangement is shown for a side-by-side arrangement of four multiple serpentine channels, which may also be referred to herein as side-by-side multiple serpentine channels. A similar convention with regard to the inlet/outlet, combined open channel area and wall footprint area, and use of shaded/unshaded fill to illustrate the different channels is used in FIG. 10 as in FIG. 9.

In such arrangements, the total length of each individual serpentine channel may generally be equal to the total lengths of the other individual serpentine channels in the multiple serpentine channels (although in the nested or interleaved multiple serpentine channel arrangements, some small variation in length may be present depending on how the channels are arranged, e.g., whether or not there is an odd or even number of longer segments in each channel), resulting in generally equal flow resistance, pressure drop, and transit time between the channels (assuming that each such channel is fluidically connected with the same fluidic environments on both ends).

Figure 11:
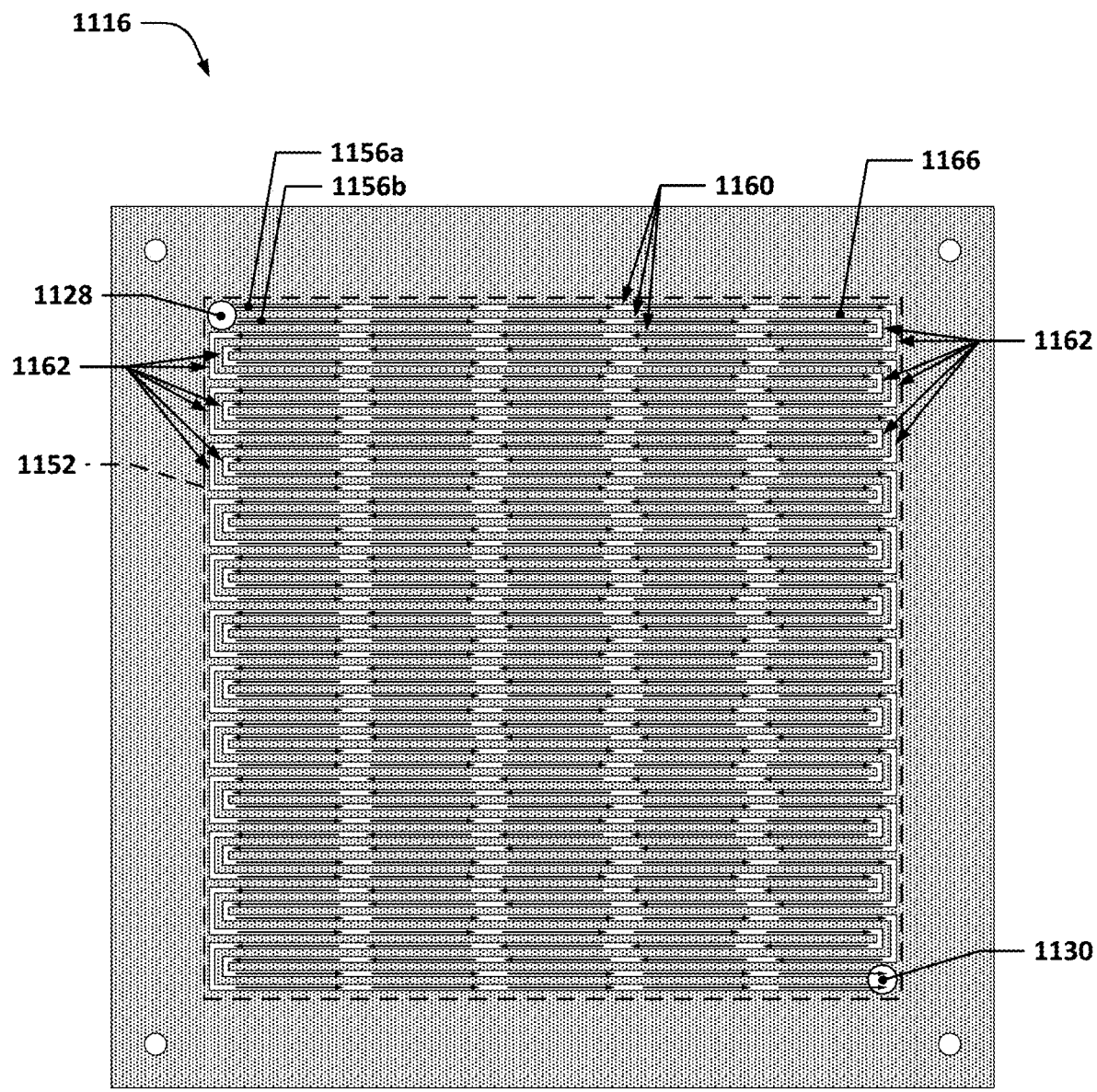
FIG. 11 depicts an example of a cathode flow field that includes a two-channel multiple serpentine channel arrangement.

FIG. 11 depicts an example of a cathode flow field 1116 that includes a two-channel multiple serpentine channel arrangement. As can be seen, the cathode flow field 1116 has a fluidic inlet port 1128 and a fluidic outlet port 1130. Two serpentine channels 1156a and 1156b are shown which follow a common serpentine path (not shown, but would generally be represented by the path followed by partition wall 1166, which separates the two serpentine channels 1156a and 1156b). The serpentine channels 1156a and 1156b switchback across an area 1152 in a generally tandem fashion. As a result, fluid that is flowed through either of the serpentine channels 1156a and 1156b, e.g., $CO_x$ gas, may generally be evenly delivered to an adjoining cathode GDL within a region corresponding to the area 1152. At the same time, any liquid water that is flowed into the cathode flow field 1116 from the adjoining cathode GDL may correspondingly tend to be evenly delivered to both serpentine channels 1156a and 1156b. Thus, each serpentine channel 1156 would receive, assuming that the cathode flow field 1116 is substituted for the cathode flow field 816 of FIG. 8, approximately half the water that was delivered to the single serpentine channel 856 of FIG. 8. Generally speaking, the amount of water delivered to each serpentine channel in a cathode flow field having a multiple serpentine channel arrangement will be equivalent to the total amount of water received by the multiple serpentine channel arrangement divided by the number of separate channels in the multiple serpentine channel arrangement. This has the effect of reducing the amount of water that must be evacuated from each serpentine channel per unit time, which may make it more feasible to properly manage the liquid water conditions within a $CO_x$ electrolyzer if the gas flow velocity is maintained or at least not proportionately decreased. For example, the lower per channel quantities of water will have less mass and require less energy in order to be pushed through the channels to the fluidic outlet port 1130 of the cathode flow field 1116. As a result, lower pressure differentials between the fluidic inlet port 1128 and fluidic outlet port 1130 of the cathode flow field 1116 may be used while still providing for efficient evacuation of liquid water from the cathode flow field 1116.

Multiple serpentine channels may also allow for relatively even distribution of the fluid that flows within them across the cathode GDL 514 but with decreased total flow path length for each such serpentine channel as compared with multiple serpentine channel or single serpentine channel implementations having the same or similar channel depth and width and total open channel area in contact with the cathode GDL 514 but with fewer numbers of such channels. For example, for a given multiple serpentine channel arrangement, it may be desirable to maintain the distance between adjacent portions of at least the longer portions of the serpentine channel(s) to be within a minimum distance of each other. For each additional serpentine channel that is included in a multiple serpentine channel arrangement, meeting such inter-channel spacing restrictions may be attained using serpentine channels of increasingly shorter overall lengths. For clarity, the overall length of a serpentine channel refers to the total of the average path lengths for all of the longer segments of the serpentine channel plus the total average path length and shorter segments that fluidically connect those longer segments with one another, plus the total average path length of any other segments that are fluidically interposed between the inlet and outlet of the serpentine channel.

Moreover, as serpentine channels decrease in length, the average potential distance that liquid water must travel in order to be expelled from such a serpentine channel will also decrease, as does generally the maximum amount of water that would potentially need to be removed. As a result, less energy is required to evacuate water from such serpentine channels in the event that water collects within such a serpentine channel; this is because the maximum amount of water that may need to be removed from such a channel will be less than in longer-length channels (of the same general cross-sectional area)—there is thus less mass to move. Moreover, the distance that such a water mass must be displaced by in order to push it through such a channel to the fluidic outlet port will generally be less than the distance that a similar water mass must be displaced by in order to be pushed through a longer-length channel to the fluidic outlet port. Of course, the distance that the water mass must be displaced by in order to be pushed through the channel to the fluidic outlet port is dependent on where the water mass is located within the channel. However, on average, water masses that collect in shorter-length channels will generally need to be displaced by a lesser amount than water masses that collect in longer-length channels in order to move such water masses to the fluidic outlet port of the flow field having such channels. Since less energy is needed to move such water masses (droplets) in flow fields with shorter-length passages, lower gas flow velocities, and lower pressure drops, may be used. In some embodiments, a cathode flow field has a serpentine channel with a length of about 12 m or less, or about 10 m or less, or about 6 m or less. For example, serpentine channels that have overall lengths on the order of less than about 6 meters, e.g., less than about 6 meters, less than about 5.5 meters, less than about 5 meters, less than about 4.5 meters, less than about 4 meters, less 3.5 meters, less than about 3 meters, less than about 2.5 meters, or less than about 2 meters may, in some implementations, provide a fluid flow path in the cathode flow field 516 that allows for the flow of $CO_x$ gas to be distributed across a wide area of the cathode GDL 514 while, at the same time, avoiding being so long that evacuating liquid water from within such serpentine channels becomes too difficult. At the same time, serpentine channels that are too short may make it challenging to maintain a desired pressure drop (see later discussion below) across the cathode flow field 516. To that end, some cathode flow field serpentine channels may be configured to also have overall lengths greater than or equal to 1.5 meters.

In some implementations, the length of an individual serpentine channel for a cathode flow field may be between about 1.5 m and about 12 m, between about 1.5 m and about 6 m, between about 1.5 m and about 3.8 m, between about 3.8 m and about 6 m, between about 1.5 m and about 2.6 m, between about 2.6 m and about 3.8 m, between about 3.8 m and about 4.9 m, between about 4.9 m and about 6 m, between about 1.5 m and about 2.1 m, between about 2.1 m and about 2.6 m, between about 2.6 m and about 3.2 m, between about 3.2 m and about 3.8 m, between about 3.8 m and about 4.3 m, between about 4.3 m and about 4.9 m, between about 4.9 m and about 5.4 m, between about 5.4 m and about 6 m, between about 1.5 m and about 1.8 m, between about 1.8 m and about 2.1 m, between about 2.1 m and about 2.3 m, between about 2.3 m and about 2.6 m, between about 2.6 m and about 2.9 m, between about 2.9 m and about 3.2 m, between about 3.2 m and about 3.5 m, between about 3.5 m and about 3.8 m, between about 3.8 m and about 4 m, between about 4 m and about 4.3 m, between about 4.3 m and about 4.6 m, between about 4.6 m and about 4.9 m, or between about 4.9 m and about 5.2 m. It will be understood that reference herein, both above and below, to a value being "between" two other values, unless the context indicates otherwise, is inclusive of the values in between the two other values as well as the values themselves.

In cathode flow fields with serpentine channels, it may be beneficial to configure the serpentine channels to have particular structural characteristics that may provide for enhanced liquid water removal while at the same time providing for effective $CO_x$ delivery to the cathode GDL. For example, serpentine channels within the length ranges discussed above may be further constrained to have particular widths (the dimension of a serpentine channel in a direction parallel to the plane of the cathode GDL 514 and transverse to the path that the channel follows (or, generally, transverse to the nominal flow direction of fluid flow through the channel)) and depths (the dimension of a serpentine channel in a direction perpendicular to the plane of the cathode GDL 514) to further enhance their water-removal performance in the context of a $CO_x$ electrolyzer. For clarity, the cathode GDL 514 is generally in the form of a thin sheet that, when stacked with the MEA 502 and the anode GDL 504, is compressed between the cathode flow field 516 and the anode flow field 506 into a nominally planar geometry; reference to "the plane of the cathode GDL" is thus to be understood to refer to a plane that is generally parallel to, and coincident with, the cathode GDL 514 in such a state. For example, such serpentine channels may have widths that are between about 0.3 mm and about 2 mm, between about 0.3 mm and about 1.2 mm, between about 1.2 mm and about 2 mm, between about 0.3 mm and about 0.72 mm, between about 0.72 mm and about 1.2 mm, between about 1.2 mm and about 1.6 mm, between about 1.6 mm and about 2 mm, between about 0.3 mm and about 0.51 mm, between about 0.51 mm and about 0.72 mm, between about 0.72 mm and about 0.94 mm, between about 0.94 mm and about 1.2 mm, between about 1.2 mm and about 1.4 mm, between about 1.4 mm and about 1.6 mm, between about 1.6 mm and about 1.8 mm, or between about 1.8 mm and about 2 mm.

Such serpentine channels may also have depths that are between about 0.3 mm and about 3 mm, between about 0.3 mm and about 1.6 mm, between about 1.6 mm and about 3 mm, between about 0.3 mm and about 0.98 mm, between about 0.98 mm and about 1.6 mm, between about 1.6 mm and about 2.3 mm, between about 2.3 mm and about 3 mm, between about 0.3 mm and about 0.64 mm, between about 0.64 mm and about 0.98 mm, between about 0.98 mm and about 1.3 mm, between about 1.3 mm and about 1.6 mm, between about 1.6 mm and about 2 mm, between about 2 mm and about 2.3 mm, between about 2.3 mm and about 2.7 mm, or between about 2.7 mm and about 3 mm.

In particular, in some cathode flow field implementations with serpentine channels, the channels may be dimensioned such that the open surface area per channel, i.e., the area that is bounded by the edges of the channel that contact the cathode GDL, is between about 750 $mm^2$ and about 200,000 $mm^2$, between about 750 $mm^2$ and about 100,000 $mm^2$, between about 100,000 $mm^2$ and about 200000 $mm^2$, between about 750 $mm^2$ and about 51000 $mm^2$, between about 51000 $mm^2$ and about 100000 $mm^2$, between about 100000 $mm^2$ and about 150000 $mm^2$, between about 150000 $mm^2$ and about 200000 $mm^2$, between about 750 $mm^2$ and about 26000 $mm^2$, between about 26000 $mm^2$ and about 51000 $mm^2$, between about 51000 $mm^2$ and about 75000 $mm^2$, between about 75000 $mm^2$ and about 100000 $mm^2$, between about 100000 $mm^2$ and about 130000 $mm^2$, between about 130000 $mm^2$ and about 150000 $mm^2$, between about 150000 $mm^2$ and about 180000 $mm^2$, or between about 180000 $mm^2$ and about 200000 $mm^2$.

In some such implementations, such channels may be further dimensioned such that the cross-sectional area (or areas, if the channel has a varying cross-sectional area along its length) of each such channel, i.e., the area of the channel in a plane that is perpendicular to the direction of flow of fluid through the channel under normal operating conditions or to the path that the channel follows across the cathode flow field, is between about 0.15 $mm^2$ and about 6 $mm^2$, between about 0.15 $mm^2$ and about 3.1 $mm^2$, between about 3.1 $mm^2$ and about 6 $mm^2$, between about 0.15 $mm^2$ and about 1.6 $mm^2$, between about 1.6 $mm^2$ and about 3.1 $mm^2$, between about 3.1 $mm^2$ and about 4.5 $mm^2$, between about 4.5 $mm^2$ and about 6 $mm^2$, between about 0.15 $mm^2$ and about 0.88 $mm^2$, between about 0.88 $mm^2$ and about 1.6 $mm^2$, between about 1.6 $mm^2$ and about 2.3 $mm^2$, between about 2.3 $mm^2$ and about 3.1 $mm^2$, between about 3.1 $mm^2$ and about 3.8 $mm^2$, between about 3.8 $mm^2$ and about 4.5 $mm^2$, between about 4.5 $mm^2$ and about 5.3 $mm^2$, or between about 5.3 $mm^2$ and about 6 $mm^2$.

In yet further implementations, the total channel volume of each such channel may be between about 200 µl and about 36000 µl, between about 200 µl and about 18000 µl, between about 18000 µl and about 36000 µl, between about 200 µl and about 9200 µl, between about 9200 µl and about 18000 µl, between about 18000 µl and about 27000 µl, between about 27000 µl and about 36000 µl, between about 200 µl and about 4700 µl, between about 4700 µl and about 9200 µl, between about 9200 µl and about 14000 µl, between about 14000 µl and about 18000 µl, between about 18000 µl and about 23000 µl, between about 23000 µl and about 27000 µl, between about 27000 µl and about 32000 µl, or between about 32000 µl and about 36000 µl.

In some such implementations, cathode flow fields with serpentine channels may also have structural characteristics relating to the thickness of the walls that are interposed between adjacent longer segments of one or more of the serpentine channels. For example, the wall thickness in between adjacent longer segments of one or more of the serpentine channels (and thus the distance between surfaces of that channel or those channels that are closest to one another) may be selected to be between about between about 0.00005 and about 0.0013333, between about 0.00005 and about 0.00069, between about 0.00069 and about 0.0013333, between about 0.00005 and about 0.00037, between about 0.00037 and about 0.00069, between about 0.00069 and about 0.001, between about 0.001 and about 0.0013333, between about 0.00005 and about 0.00021, between about 0.00021 and about 0.00037, between about 0.00037 and about 0.00053, between about 0.00053 and about 0.00069, between about 0.00069 and about 0.00085, between about 0.00085 and about 0.001, between about 0.001 and about 0.0012, or between about 0.0012 and about 0.0013333 times the average overall length of that serpentine channel or those serpentine channels (the latter case applying if the wall separates the longer portions of two different serpentine channels from each other—for clarity, in this instance the "average" overall length is half the sum of the overall lengths of both serpentine channels). In some such serpentine channel implementations having dimensional characteristics like those discussed above, the wall thickness may be, for example, between about 0.3 mm and about 2 mm, between about 0.3 mm and about 1.2 mm, between about 1.2 mm and about 2 mm, between about 0.3 mm and about 0.72 mm, between about 0.72 mm and about 1.2 mm, between about 1.2 mm and about 1.6 mm, between about 1.6 mm and about 2 mm, between about 0.3 mm and about 0.51 mm, between about 0.51 mm and about 0.72 mm, between about 0.72 mm and about 0.94 mm, between about 0.94 mm and about 1.2 mm, between about 1.2 mm and about 1.4 mm, between about 1.4 mm and about 1.6 mm, between about 1.6 mm and about 1.8 mm, or between about 1.8 mm and about 2 mm.

Serpentine channel cathode flow fields having characteristics such as those discussed above may offer superior liquid water evacuation performance in the context of $CO_x$ electrolyzers, e.g., under operating conditions typically seen in $CO_x$ electrolyzers (such as are discussed earlier herein) as compared with serpentine channel cathode flow fields having other such characteristics, such as may be designed for use with fuel cells.

While including increasingly higher numbers of multiple serpentine channels in a cathode flow field would generally seem desirable, unfettered increases in the number of flow field channels of the cathode flow field 516 may be counterproductive. Each additional parallel flow field channel that exists in the cathode flow field 516 may represent another path that fluid flowing through the multiple serpentine channels may take if blocked from flowing through one or more other serpentine channels in the arrangement of multiple serpentine channels. When such a rerouting of fluid occurs, it may cause an increase in the pressure differential along the channel, e.g., from channel start to channel end, that may cause the fluid that is pressing against the blockage to apply greater pressure on the blockage, thereby increasing the likelihood that the blockage (liquid water) will be dislodged, propelled through the serpentine channel that is being blocked, and eventually evacuated from the cathode flow field 516 via flow field outlet such as flow field outlet 1830. However, if there are a sufficiently high enough number of channels present, the blockage of any one of them (or a small number of them) may result in a much smaller increase in the pressure differential in any single channel that may occur when an equivalent number of channels is blocked in a flow field with a lesser number of channels. In short, the gas flow that is blocked and reroutes through the other unblocked channels may be divided among a larger number of alternate channels, thereby resulting in a smaller amount of extra gas that must flow through each channel than might be the case with a lower number of channels in a similar blockage situation. The smaller the amount of extra gas that must flow through each channel, the smaller the change in pressure drop that is needed to accommodate such a change. As a result, there the increase in pressure drop that may occur in unblocked channels when gas flows re-route therethrough due to a blocked channel or channels decreases as the number of channels that are present increases.

At the same time, if the total lengths of the serpentine passages are sufficiently long, e.g., 0.3 m to 6 m, the pressure drop that occurs across each such channel may be high enough that it may act to help dislodge any obstructions, e.g., water, that may exist within any individual serpentine channel regardless of the number of channels present. For example, serpentine channels for $CO_x$ electrolyzers may have dimensions and operational conditions, e.g., fluidic inlet port pressures, that are selected so as to produce a 0.001 psi to 4 psi pressure drop during normal operational flows for such serpentine channels, which may be high enough to dislodge potential water blockages that may be present within the serpentine channels; while higher pressure drops may be used as well, they may be unnecessary with respect to water evacuation and simply result in wasted energy that is needed to move the fluids through the serpentine channels under such pressure drop conditions. In some implementations, serpentine channels for $CO_x$ electrolyzers may have dimensions and operational conditions, e.g., fluidic inlet port pressures, that are selected so as to produce, during normal operational flow conditions for a $CO_x$ electrolyzer, a pressure drop of between about 0.001 psi and about 4 psi, between about 0.001 psi and about 2 psi, between about 2 psi and about 4 psi, between about 0.001 psi and about 1 psi, between about 1 psi and about 2 psi, between about 2 psi and about 3 psi, between about 3 psi and about 4 psi, between about 0.001 psi and about 0.5 psi, between about 0.5 psi and about 1 psi, between about 1 psi and about 1.5 psi, between about 1.5 psi and about 2 psi, between about 2 psi and about 2.5 psi, between about 2.5 psi and about 3 psi, between about 3 psi and about 3.5 psi, between about 3.5 psi and about 4 psi, between about 0.001 psi and about 0.25 psi, between about 0.25 psi and about 0.5 psi, between about 0.5 psi and about 0.75 psi, between about 0.75 psi and about 1 psi, between about 1 psi and about 1.3 psi, between about 1.3 psi and about 1.5 psi, between about 1.5 psi and about 1.8 psi, between about 1.8 psi and about 2 psi, between about 2 psi and about 2.3 psi, between about 2.3 psi and about 2.5 psi, between about 2.5 psi and about 2.8 psi, between about 2.8 psi and about 3 psi, between about 3 psi and about 3.3 psi, between about 3.3 psi and about 3.5 psi, between about 3.5 psi and about 3.8 psi, between about 3.8 psi and about 4 psi, between about 0.001 psi and about 0.13 psi, between about 0.13 psi and about 0.25 psi, between about 0.25 psi and about 0.38 psi, between about 0.38 psi and about 0.5 psi, between about 0.5 psi and about 0.63 psi, between about 0.63 psi and about 0.75 psi, between about 0.75 psi and about 0.88 psi, between about 0.88 psi and about 1 psi, between about 1 psi and about 1.1 psi, between about 1.1 psi and about 1.3 psi, between about 1.3 psi and about 1.4 psi, between about 1.4 psi and about 1.5 psi, between about 1.5 psi and about 1.6 psi, between about 1.6 psi and about 1.8 psi, between about 1.8 psi and about 1.9 psi, between about 1.9 psi and about 2 psi, between about 2 psi and about 2.1 psi, between about 2.1 psi and about 2.3 psi, between about 2.3 psi and about 2.4 psi, between about 2.4 psi and about 2.5 psi, between about 2.5 psi and about 2.6 psi, between about 2.6 psi and about 2.8 psi, between about 2.8 psi and about 2.9 psi, between about 2.9 psi and about 3 psi, between about 3 psi and about 3.1 psi, between about 3.1 psi and about 3.3 psi, between about 3.3 psi and about 3.4 psi, between about 3.4 psi and about 3.5 psi, between about 3.5 psi and about 3.6 psi, between about 3.6 psi and about 3.8 psi, between about 3.8 psi and about 3.9 psi, or between about 3.9 psi and about 4 psi. In some other implementations, serpentine channels for $CO_x$ electrolyzers may have dimensions and operational conditions, e.g., fluidic inlet port pressures, that are selected so as to produce, during normal operational flow conditions for a $CO_x$ electrolyzer, a pressure drop of between about 4 psi and about 50 psi, between about 4 psi and about 27 psi, between about 27 psi and about 50 psi, between about 4 psi and about 16 psi, between about 16 psi and about 27 psi, between about 27 psi and about 38 psi, between about 38 psi and about 50 psi, between about 4 psi and about 9.8 psi, between about 9.8 psi and about 16 psi, between about 16 psi and about 21 psi, between about 21 psi and about 27 psi, between about 27 psi and about 33 psi, between about 33 psi and about 38 psi, between about 38 psi and about 44 psi, between about 44 psi and about 50 psi, between about 4 psi and about 6.9 psi, between about 6.9 psi and about 9.8 psi, between about 9.8 psi and about 13 psi, between about 13 psi and about 16 psi, between about 16 psi and about 18 psi, between about 18 psi and about 21 psi, between about 21 psi and about 24 psi, between about 24 psi and about 27 psi, between about 27 psi and about 30 psi, between about 30 psi and about 33 psi, between about 33 psi and about 36 psi, between about 36 psi and about 38 psi, between about 38 psi and about 41 psi, between about 41 psi and about 44 psi, between about 44 psi and about 47 psi, or between about 47 psi and about 50 psi. In some other implementations, serpentine channels for $CO_x$ electrolyzers may have dimensions and operational conditions, e.g., fluidic inlet port pressures, that are selected so as to produce, during normal operational flow conditions for a $CO_x$ electrolyzer, a pressure drop of between about 0.001 psi and about 50 psi, between about 0.001 psi and about 25 psi, between about 25 psi and about 50 psi, between about 0.001 psi and about 13 psi, between about 13 psi and about 25 psi, between about 25 psi and about 38 psi, between about 38 psi and about 50 psi, between about 0.001 psi and about 6.3 psi, between about 6.3 psi and about 13 psi, between about 13 psi and about 19 psi, between about 19 psi and about 25 psi, between about 25 psi and about 31 psi, between about 31 psi and about 38 psi, between about 38 psi and about 44 psi, or between about 44 psi and about 50 psi. Pressure drops in the ranges listed above may be high enough to dislodge potential water blockages that may be present within such serpentine channels, particularly in the context of the higher water generation rates that $CO_x$ electrolyzers tend to exhibit.

Figure 12:
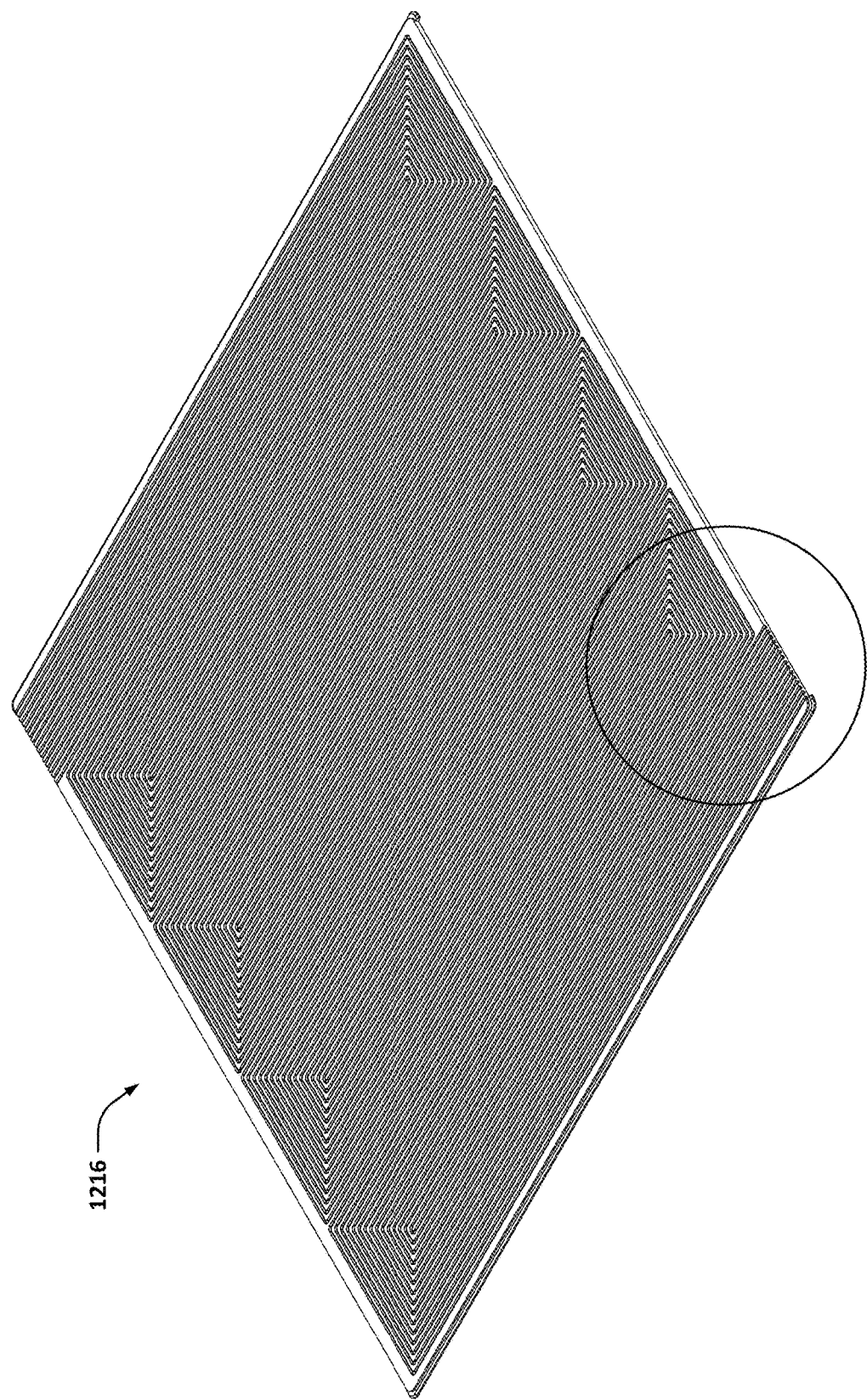
FIGS. 12 through 14 depict an example cathode flow field that may be used in some implementations.
Figure 13:
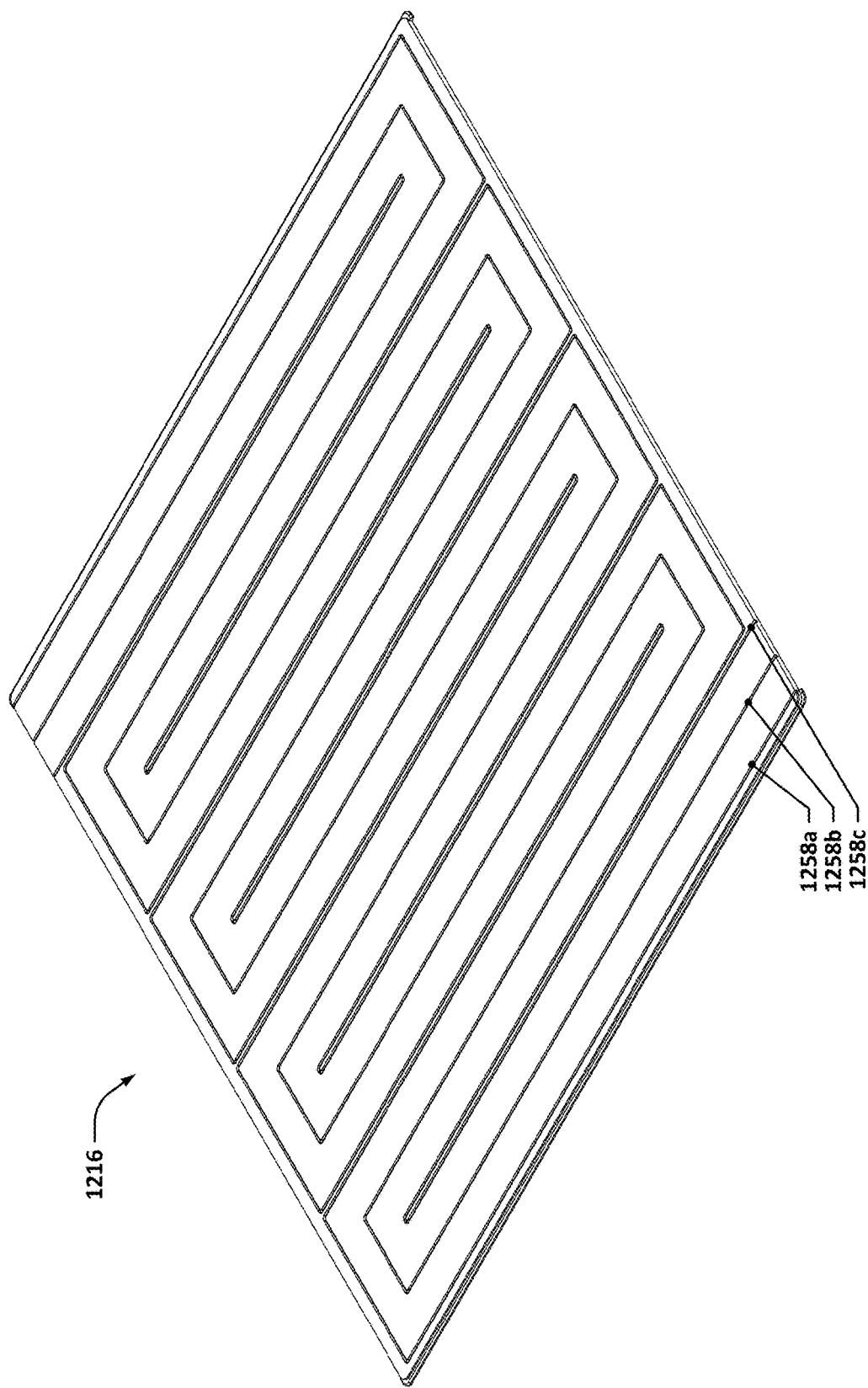
Figure 14:
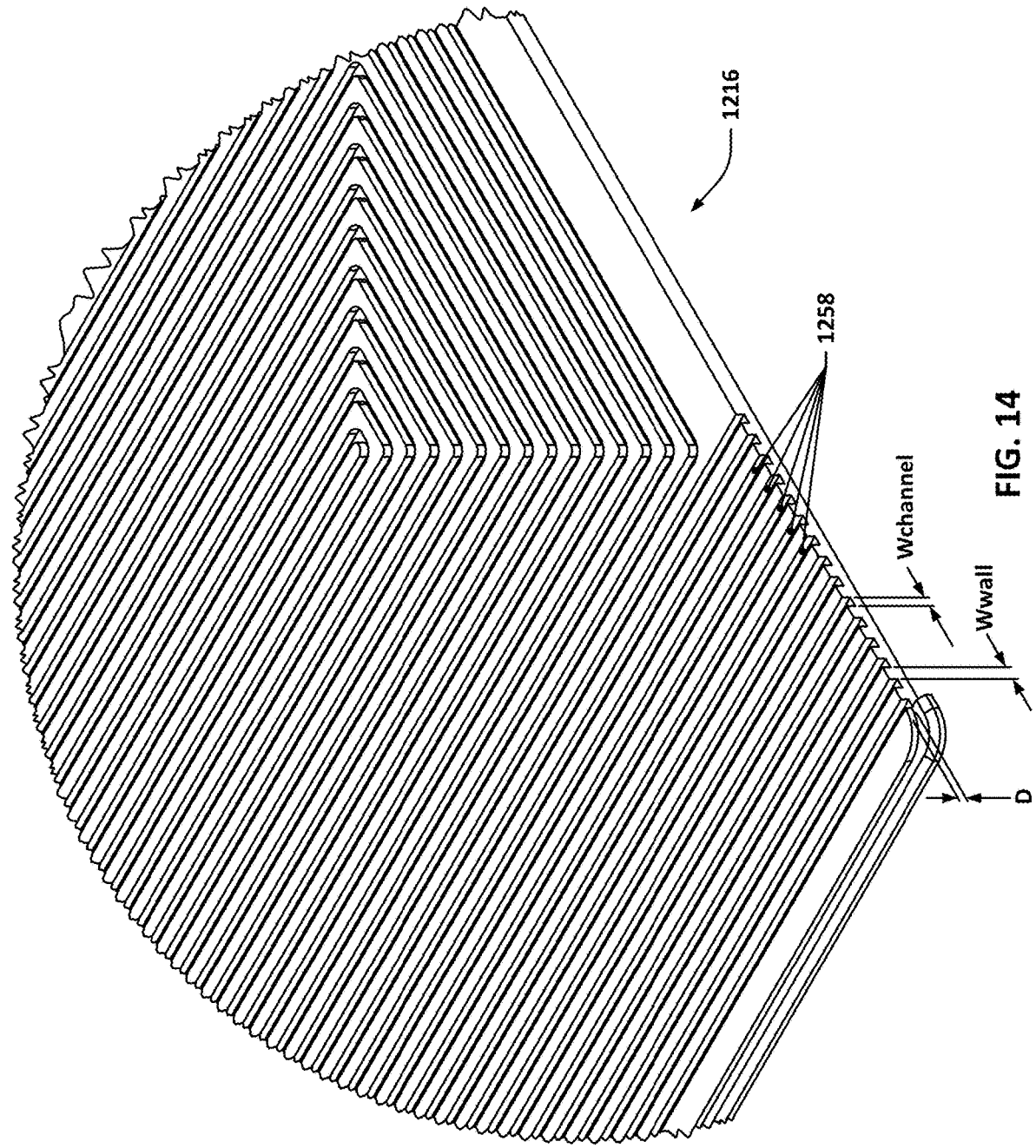

FIGS. 12 through 14 depict an example cathode flow field 1216 that may be used in some implementations. The depicted flow field has 15 channels and 9 passes. In one implementation, the depicted flow field has a planar surface area (facing a GDL) of 700 cm². FIG. 12 depicts an isometric view and FIG. 14 depicts a detail view of the portion of FIG. 12 enclosed by a circle. FIG. 13 depicts the isometric view of FIG. 12, but with most of the channels of the flow field omitted, leaving only three channels 1258a, 1258b, and 1258c visible; this view is intended to make it easier to see the representative serpentine paths followed by the various channels. The cathode flow field 1216 actually includes 15 channels 1258. The channels in the example cathode flow field 1216 are each 0.66 mm deep by 0.81 mm wide, and each have a length of ~2310 mm, a channel open area of ~1880 mm$^2$, and a volume of ~1240 mm$^3$. The total open channel area of the cathode flow field 1216 is, in this example, 28,200 mm$^2$. With each of the 15 channels being separated from any adjacent channels by walls of 1.12 mm in width and the cathode flow field having dimensions of about 265 mm by 265 mm, about 40% of the cathode flow field 1216 surface area is taken up by the channels 1258. The depicted cathode flow field 1216 is designed to receive (and deliver) fluids from external manifolds that may be mounted against the external edges of the cathode flow field so as to flow fluid into or out of the channels 1258 from the side.

Figure 15:
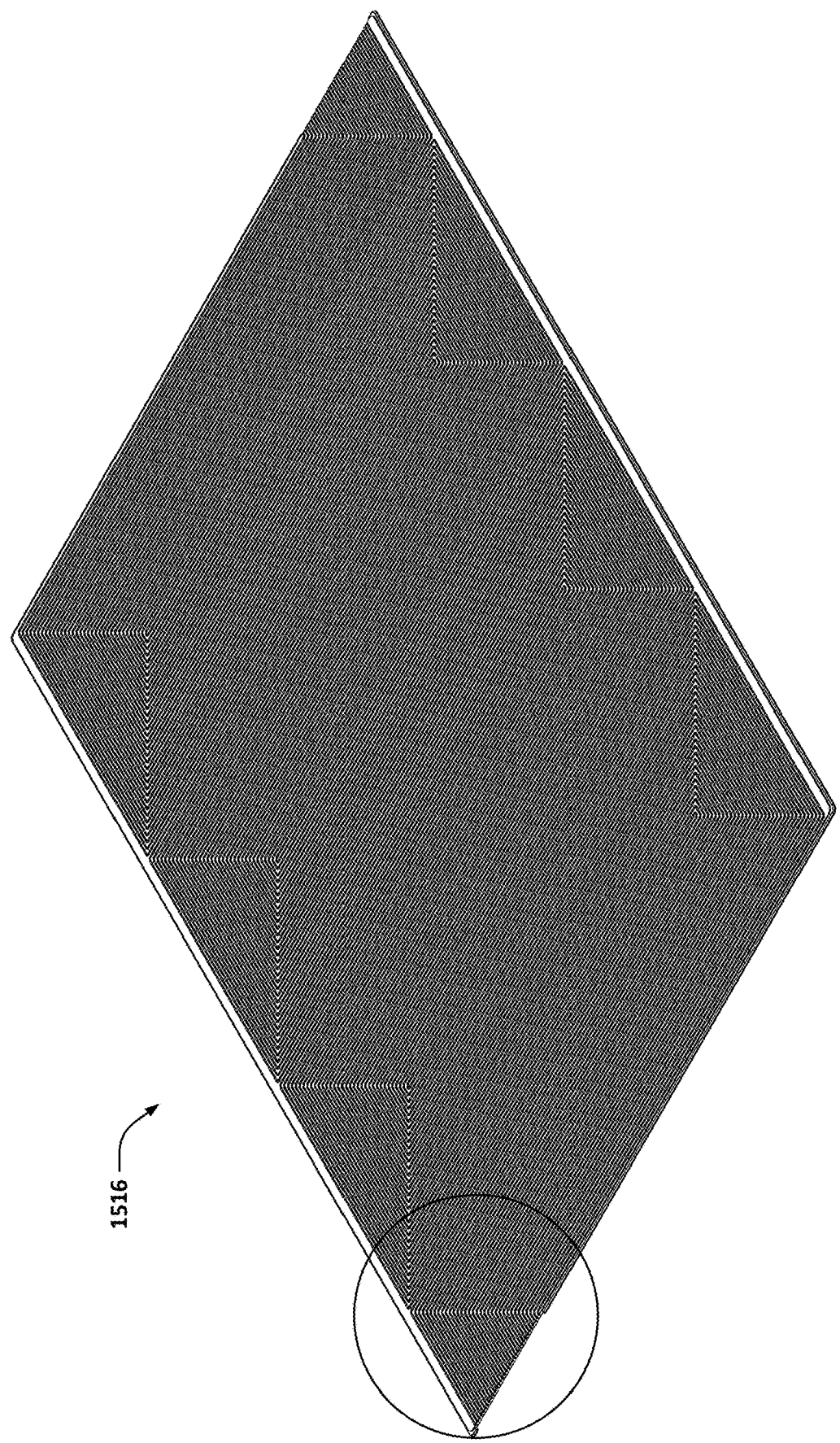
FIGS. 15 through 17 depict an example cathode flow field that may be used in some implementations.
Figure 16:
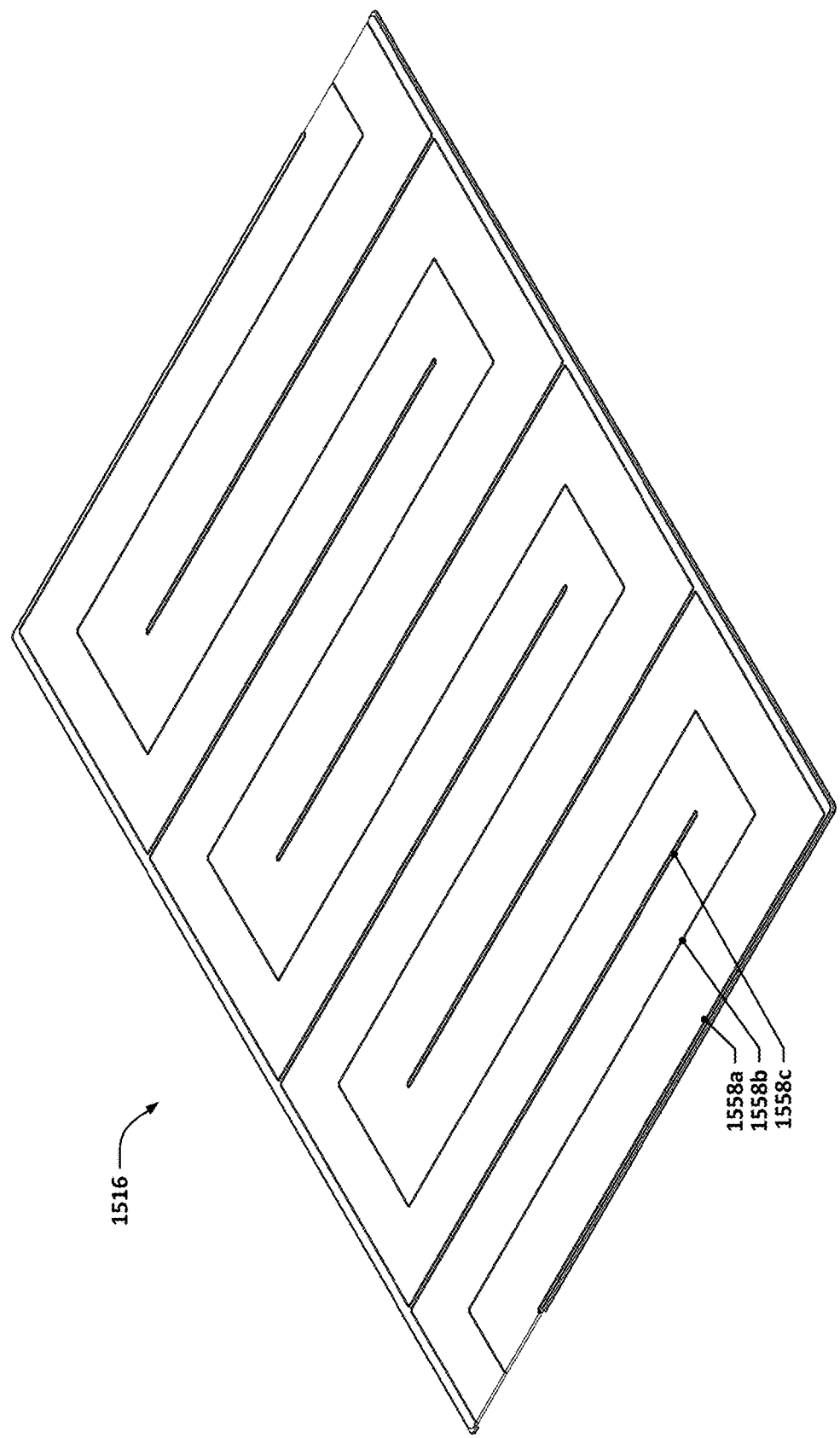
Figure 17:
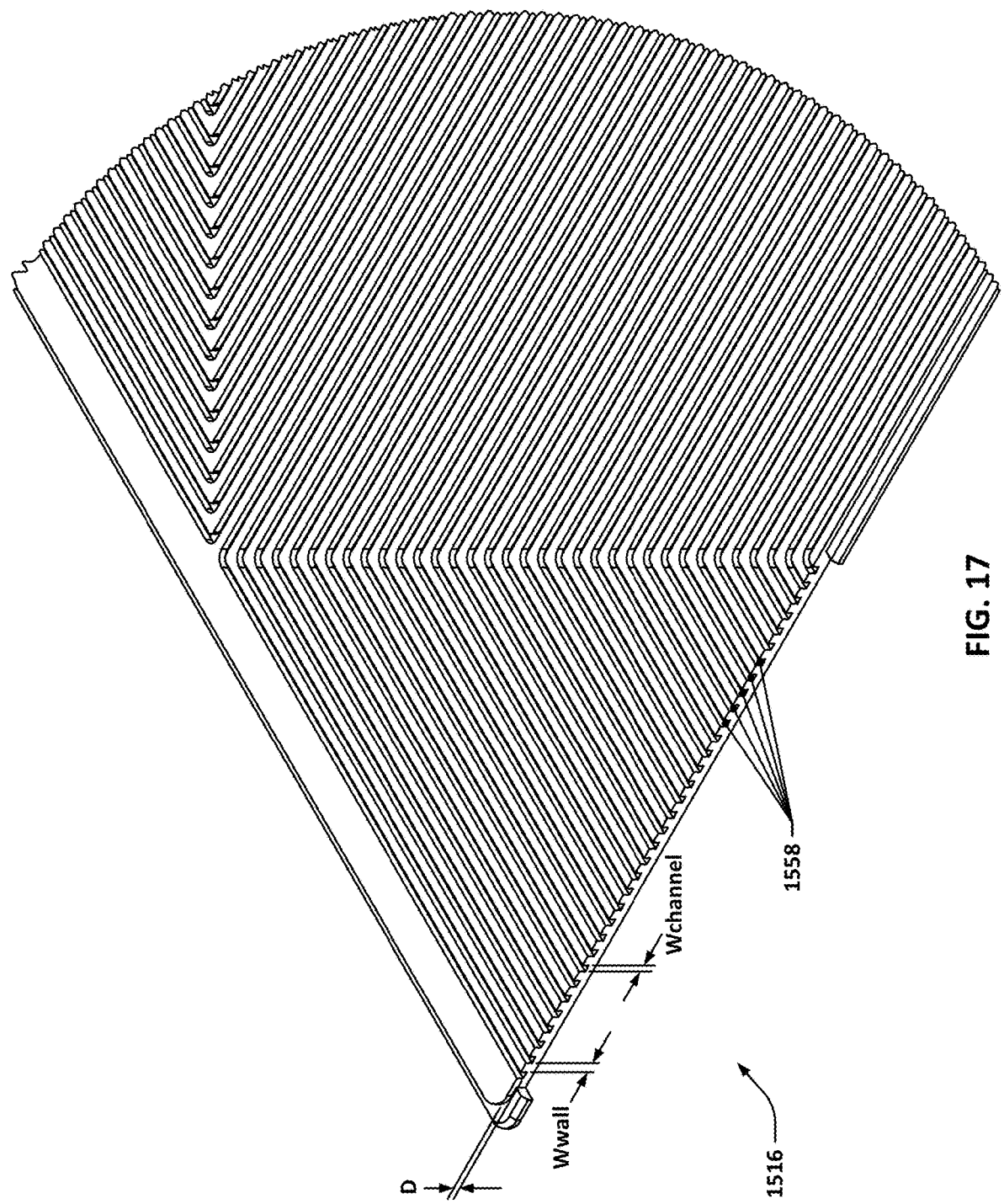

FIGS. 15 through 17 depict another example cathode flow field 1516 that may be used in some implementations. The depicted flow field has 34 channels and 7 passes. In one implementation, the depicted flow field has a planar surface area (facing a GDL) of 1600 cm$^2$. As with FIGS. 12 through 14, FIG. 15 depicts an isometric view and FIG. 17 depicts a detail view of the portion of FIG. 15 enclosed by a circle. FIG. 16 depicts the isometric view of FIG. 15, but with most of the channels of the flow field omitted, leaving only three channels 1558a, 1558b, and 1558c visible; as with FIG. 14, this view is intended to make it easier to see the representative serpentine paths followed by the various channels. The cathode flow field 1516 actually includes 34 channels 1558. The channels in the example cathode flow field 1516 are each 0.66 mm deep by 0.76 mm wide, and each have a length of ~2440 mm, a channel open area of ~1880 mm$^2$, and a volume of ~1230 mm$^3$. The total open channel area of the cathode flow field 1516 is, in this example, 63,230 mm$^2$. With each of the 34 channels being separated from any adjacent channels by walls of 1.14 mm in width and the cathode flow field having dimensions of about 360 mm by 450 mm, about 39% of the cathode flow field 1516 surface area is taken up by the channels 1558. As with the cathode flow field 1216, the depicted cathode flow field 1516 is designed to receive (and deliver) fluids from external manifolds that may be mounted against the external edges of the cathode flow field so as to flow fluid into or out of the channels 1558 from the side.

In certain embodiments, a serpentine flow field as in FIGS. 12-17, the channel depth is about 0.5 mm to 1.5 mm. In certain embodiments, the nominal length of each flow channel in a flow field of FIGS. 12-17 is about 300 mm to 3000 mm. In certain embodiments, the nominal channel width in a flow field of FIGS. 12-17 is about 0.5 mm to 1 mm. In certain embodiments, the nominal channel separation distance in a flow field of FIGS. 12-17 is about 1 mm to 1.5 mm.

Figure 18:
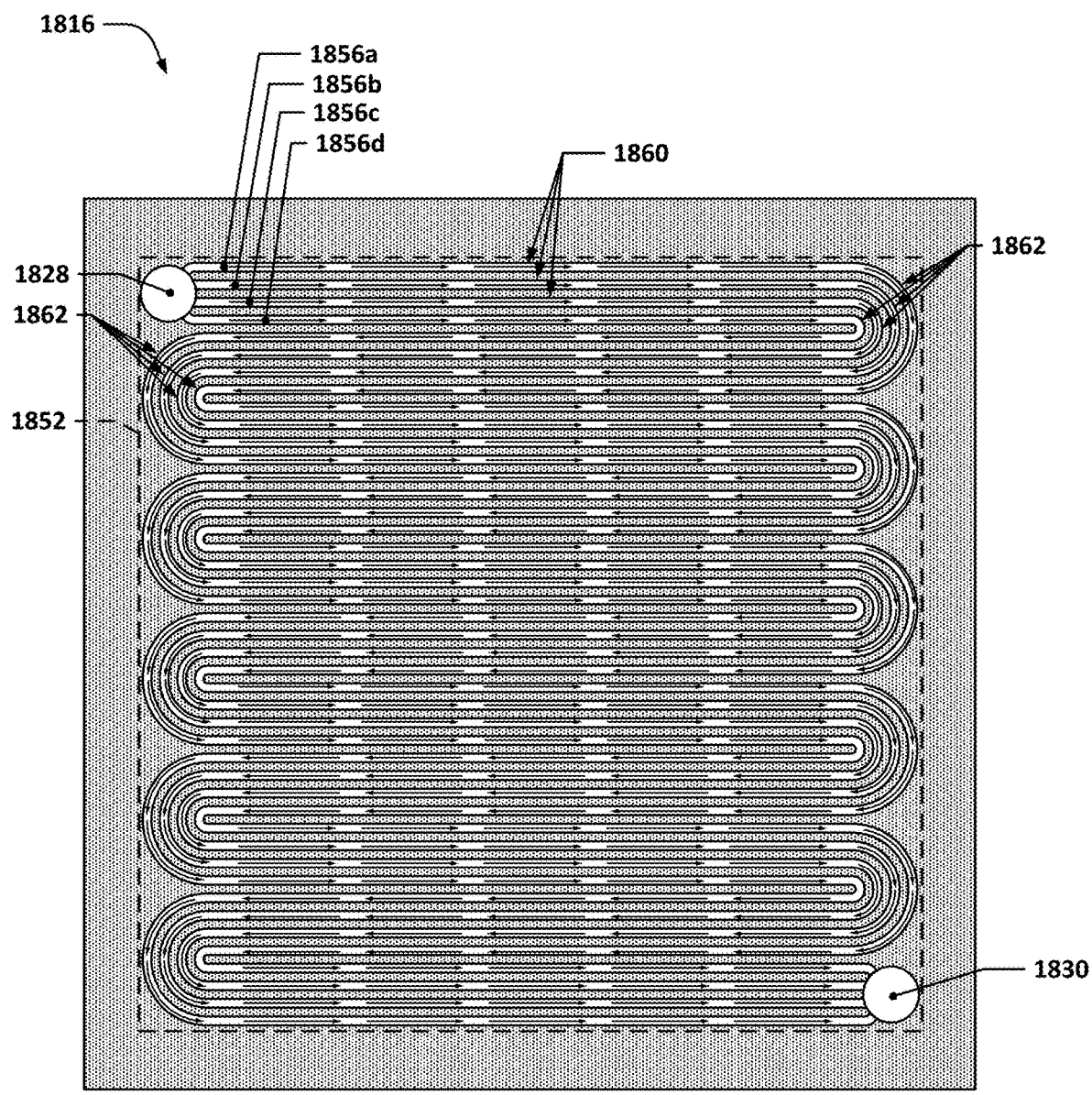
FIG. 18 depicts an example of a cathode flow field that has four cathode serpentine channels arranged in a multiple serpentine channel arrangement.

In some implementations, serpentine channel cathode flow fields may feature serpentine channels that have rounded or smooth transitions between the longer and shorter segments as opposed to sharp transitions between such segments. For example, FIG. 18 depicts an example of a cathode flow field 1816 that has four cathode serpentine channels 1856 arranged in a multiple serpentine channel arrangement. It will be noted that unlike the single-channel and two-channel serpentine arrangements depicted in FIGS. 8 and 11, the transitions between the longer segments are provided by arcuate shorter segments instead of straight shorter segments. In other implementations, the shorter segments may still include a straight portion but may be joined to fluidically adjacent longer segments by smaller arcuate segments. Such cathode flow fields may further enhance the water evacuation performance of a $CO_x$ electrolyzer since the absence of sharp interior corners in the serpentine channels may eliminate a potential dead zone or stagnation location for fluid flow that could otherwise serve as a location where liquid water could collect and reside indefinitely during use of the cathode flow field.

Figure 19:
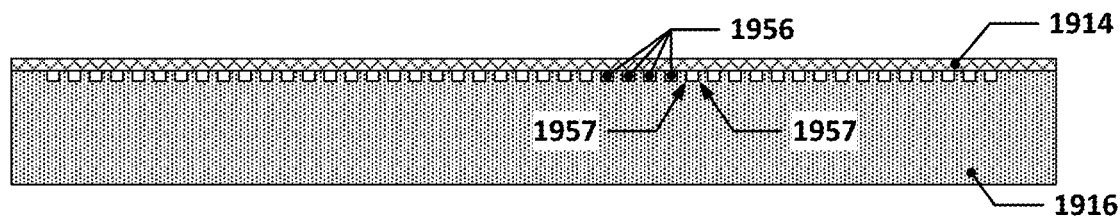
FIG. 19 depicts a cross-sectional view of a cathode flow field with square- or rectangular-cross-section serpentine channels.

Other aspects of flow field channels may be alternatively or additionally modified as well in order to promote more effective liquid water evacuation. FIG. 19, for example, depicts a cross-sectional view of a cathode flow field 1916 that is pressed against a cathode GDL 1914. A plurality of square- or rectangular-cross-section serpentine channels 1956 are formed in the face of the cathode flow field 1916 that is pressed against the cathode GDL 1914. These serpentine channels 1956 have sharp corners at their interior bottom edges 1957, which may act to create small fluid flow stagnation areas that may cause liquid water to not be readily evacuated during normal $CO_x$ electrolyzer operating conditions.

Figure 20:
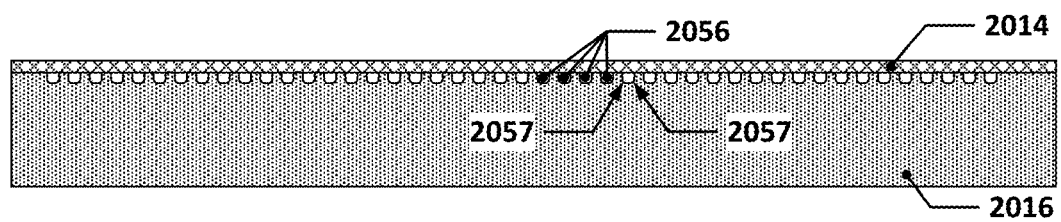
FIG. 20 shows a cross-sectional view of a cathode flow field with a plurality of square- or rectangular-cross-section serpentine channels with rounded interior bottom edges.

FIG. 20, by contrast, shows a cross-sectional view of a similar structure with a cathode flow field 2016 that is pressed against a cathode GDL 2014. A plurality of square- or rectangular-cross-section serpentine channels 2056 are formed in the face of the cathode flow field 2016 that is pressed against the cathode GDL 2014. Unlike the serpentine channels 1956, the serpentine channels 2056 have rounded corners at their interior bottom edges 2057, which may act to reduce flow stagnation in the bottom interior edge regions of such channels, thereby promoting liquid water evacuation during normal $CO_x$ electrolyzer operating conditions.

Figure 21:
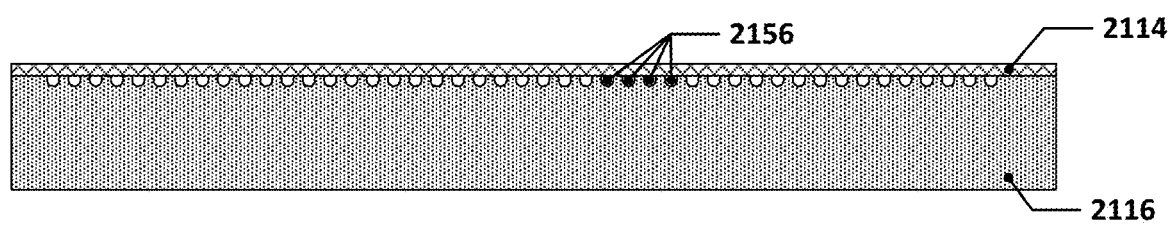
FIG. 21 shows a cross-sectional view of a cathode flow field with a plurality of U-shaped cross-section serpentine channels.

FIG. 21 is a further example of a cathode flow field that may more readily evacuate liquid water during normal $CO_x$ electrolyzer operating conditions. As can be seen, a cathode flow field 2116 is pressed against a cathode GDL 2114. A plurality of U-shaped cross-section serpentine channels 2156 are formed in the face of the cathode flow field 2116 that is pressed against the cathode GDL 2114. In this case, there effectively are no interior bottom edges of the serpentine channels 2156 since the bottom surface of such serpentine channels 2156 is semicircular, which may act to further reduce flow stagnation in such channels, thereby further promoting liquid water evacuation during normal $CO_x$ electrolyzer operating conditions.

Figure 22:
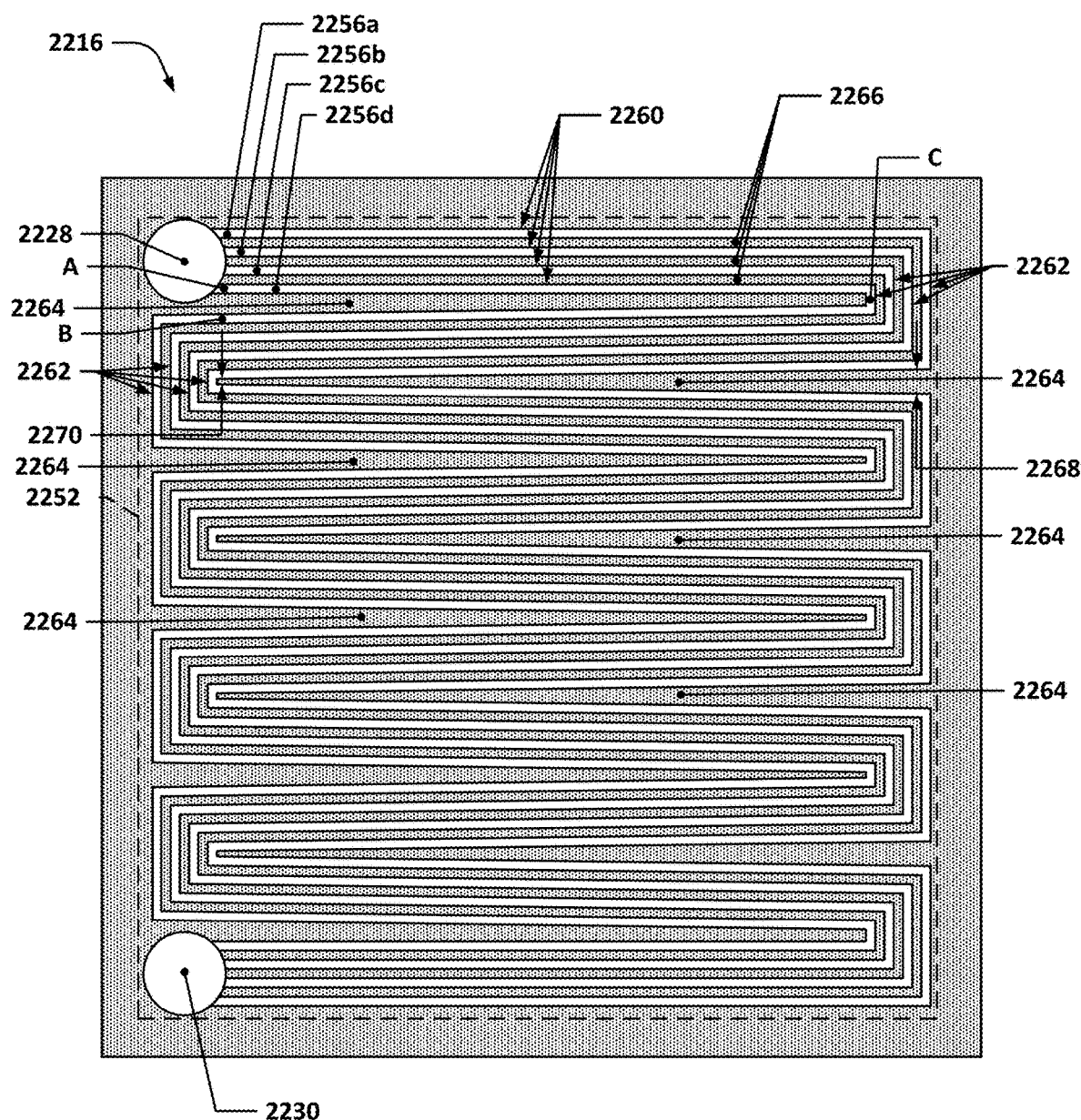
FIG. 22 depicts an example of a cathode flow field with peninsular walls having variable wall thickness.

In some other or additional implementations, serpentine channel cathode flow fields may have variable-width walls in between some or all of the longer segments of one or more serpentine channels. FIG. 22 depicts an example of such a cathode flow field. In FIG. 22, a cathode flow field 2216 is shown which has a four-channel serpentine arrangement with each serpentine channel 2256 having longer segments 2260 and shorter segments 2262. It will be noted that the multiple serpentine channel arrangement has "peninsular" walls 2264 that are interposed between neighboring longer segments 2260 of a common serpentine channel 2256a (or 2256b) that have opposing fluid flow directions when fluid is flowing through the serpentine channels 2256 (generally all nested or interleaved multiple serpentine channel arrangements will have peninsular walls; they are only specifically called out here due to the particulars of this example implementation).

As can be seen in FIG. 22, the peninsular walls 2264 may have a varying wall thickness. For example, the peninsular walls 2264 have a root width 2268 where the peninsular walls 2264 "connect" with the outer perimeter region of the cathode flow field (which may be thought of as the "root" of the peninsular wall) and a tip width 2270 at their opposite ends. The increased width at the root as compared with the tip of the peninsular walls 2264 may reduce the chance of gas flow through the cathode GDL that might bypass some or all of the longer segments 2260 that are separated by the peninsular walls 2264 by passing under the wall, i.e., through the GDL that is sandwiched between the cathode flow field 2216 and the MEA (not shown, but see FIG. 5) and which, in effect, caps the cathode serpentine channels 2256.

For example, in a serpentine channel of a cathode flow field that has portions thereof that are adjacent to one another, e.g., the outermost or innermost serpentine channel on a multi-channel, interleaved serpentine channel arrangement, gas that is flowed through such a channel, e.g., from point A to point B may experience a pressure drop/flow resistance if travelling from point A to point B via flow through point C that may, under some circumstances, exceed the pressure drop/flow resistance that may be experienced by that gas if it simply flowed from point A to point B more directly, e.g., by passing under the peninsular wall 2264 in between points A and B by way of the porous GDL that spans between points A and B and under the peninsular wall 2264. For example, if water accumulates in the channel between points A and C and/or between points C and B, the resulting blockage may increase the pressure drop/flow resistance for gas that flows along this path that it exceeds the pressure drop/flow resistance that the gas would experience if traveling from point A to point B more directly, e.g., under the peninsular wall 2264. As the flow path between points A and B under the peninsular wall 2264 may offer less flow resistance than the flow path between A and B via point C, the gas may then preferentially flow from point A under the peninsular wall 2264 to point B rather than via point C, thus depriving the GDL and MEA of exposure to gas that would normally flow through point C and decrease the efficiency of the $CO_x$ cell in which the cathode flow field 2216 is used. To prevent this from happening, or to at least reduce the chances of this occurring, in some implementations, the peninsular walls 2264 may simply have a constant thickness along their lengths but may be thicker than partition walls 2266 that may separate other neighboring longer segments 2260 that have fluid flows in the same directions, thereby increasing the flow resistance experienced by gas that attempts to flow under the peninsular walls 2264. In other implementations, such as that shown in FIG. 22, the peninsular walls 2264 may taper towards their tips such that the tip width 2270 decreases in size, thereby causing the flow resistance under the peninsular walls 2264 to decrease from what it was near the root of a peninsular wall 2264 as the flow nears the tip of the peninsular wall 2264. This may assist with discouraging the flow of gas under the peninsular walls 2264 near the roots of those walls, but this effect may also decrease as the gas flow moves along the peninsular wall towards the tip thereof-however, the flow resistance along the desired flow path (via point C<, for example) may also decrease, and there may thus not be as much of an incentive for gas to flow under the peninsular walls near the tips of the peninsular walls 2264. By tapering the thickness of the peninsular walls, the area of the cathode GDL that is compressed under the peninsular walls 2264 may be reduced as compared with non-tapering peninsular walls 2264, thereby increasing the area of the cathode GDL which has direct exposure to gas flow through the channels and increasing the opportunity for a reduction reaction to occur with such gas.

Mirror Serpentine Channel Flow Fields

In the serpentine channel flow fields discussed above, the serpentine channels discussed generally do not exhibit any mirroring or bilateral symmetry. A further class of serpentine channel flow fields may, however, feature serpentine channels that are arranged in a generally bilaterally symmetric manner. In such flow fields, the flow field may generally be partitioned into two zones. The two zones may be generally equally sized and shaped, and may each contain a similar number of serpentine channels. The serpentine channel or channels in each zone may be arranged so as to generally be mirror images of one another with respect to the boundary between the two zones, e.g., the serpentine channels may exhibit bilateral symmetry about the boundary between the two zones.

Figure 23:
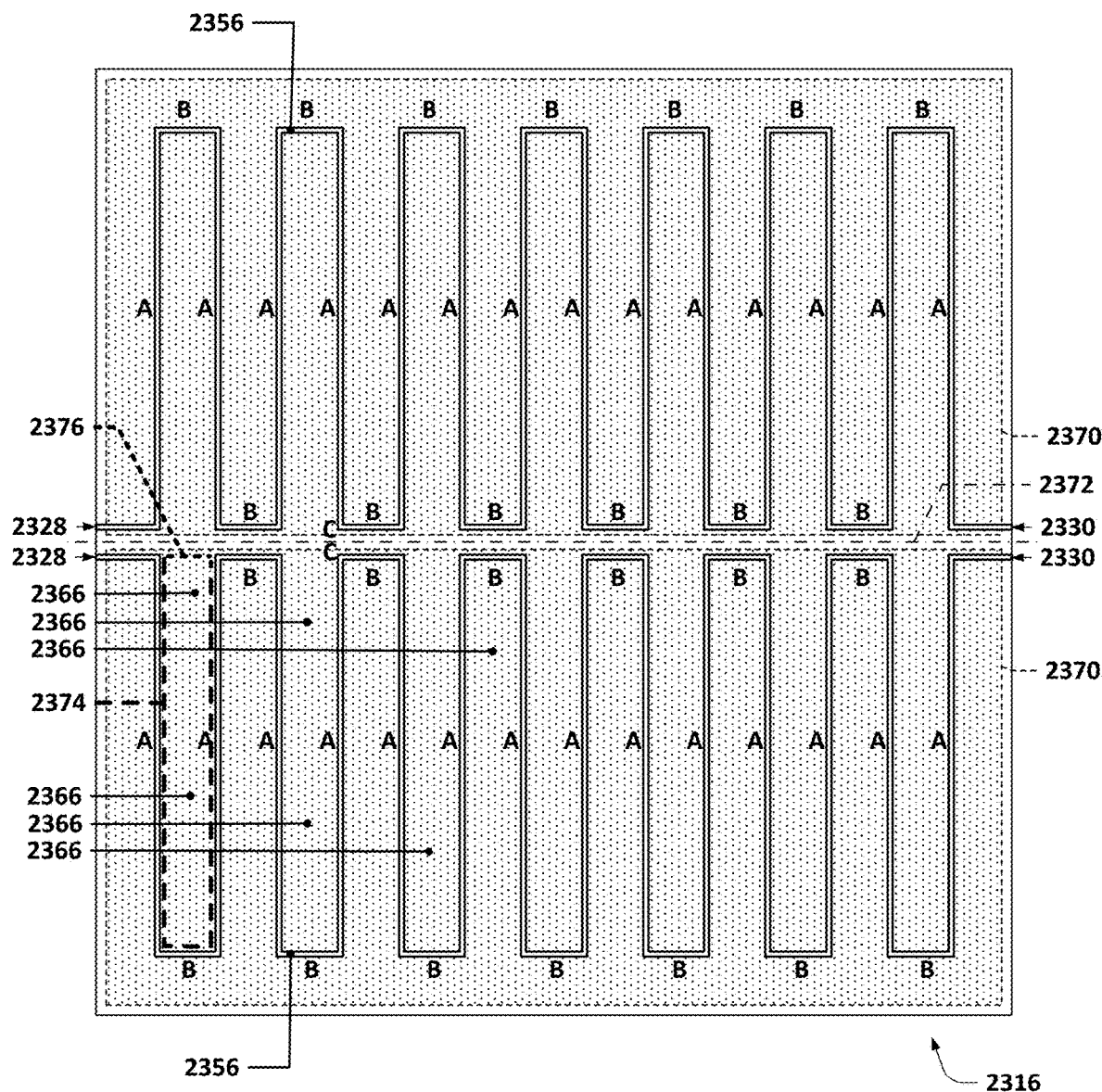
FIG. 23 depicts a plan view of a simplified representation of an example cathode flow field.

FIG. 23 depicts a plan view of a simplified representation of an example such cathode flow field. In FIG. 23, a cathode flow field 2316 is shown that is partitioned into two zones 2370 that are generally the same shape and size. A boundary 2372 is defined in between the two zones 2370; the zones 2370 are generally symmetrically arranged on either side of the boundary 2372. Each zone 2370 in this example includes a single cathode serpentine channel 2356, although it will be understood that each zone may include a larger number of cathode serpentine channels 2356 that follow a common path in a nested or interleaved manner, as with examples discussed earlier. The cathode serpentine channels 2356 each extend between a corresponding fluidic inlet port 2328 and a corresponding fluidic outlet port 2330 (it will be understood that these fluidic inlet ports 2328 may, for example, terminate in the same location, e.g., a common flow passage or manifold, and that the fluidic outlet ports 2330 may be similarly configured).

As is discussed further below, the symmetric arrangement of the cathode serpentine channels 2356 may provide various advantages over non-symmetric arrangements of cathode serpentine channels with respect to maintaining flow uniformity across the cathode flow field 2316. For example, the two zones 2370 may, together, generally represent an active area of the cathode flow field 2316. That active area could, for example, be traversed by a cathode serpentine channel or channels that travel back and forth between opposite sides of the active area, as shown in FIG. 24.

Figure 24:
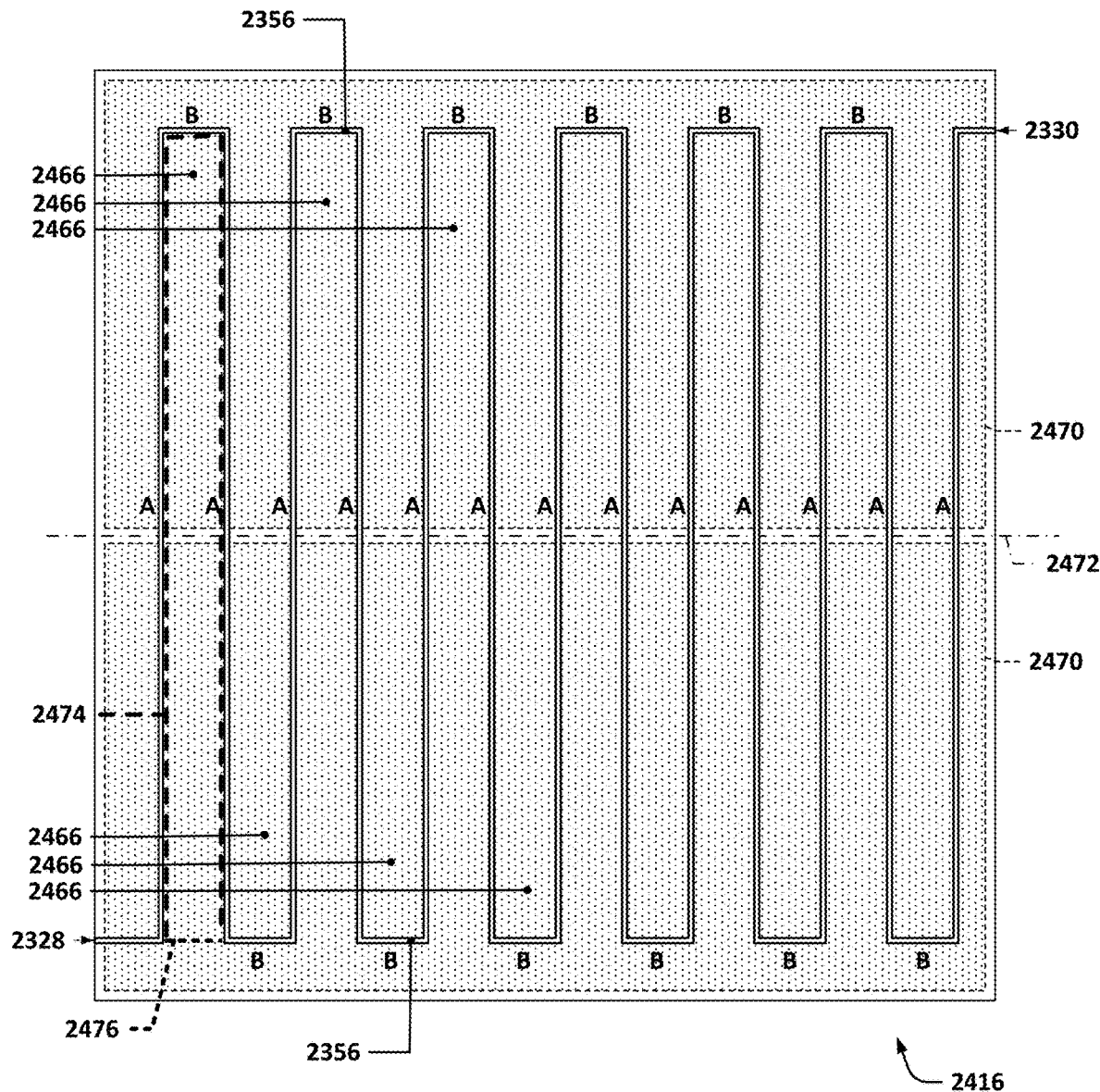
FIG. 24 depicts a cathode flow field with two zones and a boundary.

FIG. 24 depicts a cathode flow field 2416; two zones 2470 and a boundary 2472 that are similar to the zones 2370 and the boundary 2372 are shown as well. The cathode flow field 2416 has a serpentine channel 2456 that includes longer segments A extending in directions nominally perpendicular to one set of opposing edges of the active area and shorter segments B extending in directions nominally parallel to those opposing edges. The longer-length segments generally have lengths that are of the same order of magnitude as the distance between the two opposing edges of the active area (although potentially shortened somewhat to allow additional cathode serpentine channels to be routed in a nested or interleaved fashion). The longer segments A of the cathode serpentine channel 2456 can be seen to cross over the boundary 2472 and extend into both zones 2470. In such an arrangement, fluid that flows down a longer segment A, through a shorter segment B, and into another longer segment A that neighbors the original longer segment A, e.g., along the heavy dashed line 2474 shown in association with the leftmost two longer segments A in FIG. 24, will experience a pressure drop that is generally proportional to the sum of the lengths of the two longer segments A and the shorter segment B that joins them.

The gas flow through the cathode serpentine channel 2456, however, is not limited to staying within the cathode serpentine channel 2456. For example, as discussed earlier, the side of the cathode flow field 2416 in which the cathode serpentine channel 2456 is provided may be compressed against a porous or fibrous GDL (not shown) that provides an alternate flow path that allows gas to also or alternatively flow under partition walls 2466 that lie in between each pair of adjacent longer segments A, e.g., through the GDL that is sandwiched between the cathode flow field 2416 and an adjacent structure, e.g., an MEA. For example, the gas flow may also flow between the two longer segments A at the left of FIG. 24 via a flow path along dotted line 2476.

Generally speaking, the ratio of gas that flows along the flow path 2474 and the flow path 2476 may be biased towards gas flow along the channel flow path 2474 due to the fact that the cathode serpentine channel 2456 has a relatively large, open cross-section compared to the GDL flow path 2476. For example, the cathode serpentine channel 2456 may have a cross-section that is entirely open and that has relatively large dimensions (e.g., on the order of a millimeter or so in height and width), while the flow path offered by the GDL may only be on the order of a few hundred microns in height and be filled with the fibrous or porous material of the GDL. Put another way, the per-unit-length flow resistance of the GDL may be much higher than the per-unit-length flow resistance of the cathode serpentine channel 2456.

However, the overall flow resistance of the flow path 2474 will increase with increasing length of the longer segments A of the cathode serpentine channel 2456. Thus, the longer that the longer segments A of the cathode serpentine channel 2456 are, the higher the flow resistance along the flow path 2474, which causes the ratio of gas that flows through the flow path 2474 to the gas that flows through the flow path 2476 to decrease. In other words, shorter lengths of the longer segments A will result in less gas flow along the flow paths 2476 than longer lengths of the longer segments A.

Moreover, the flow resistance of the flow path 2474 may also increase during operation due to the potential of blockages, e.g., by liquid water or, for example, mineral deposits, within the cathode serpentine channel 2456. If such blockages occur, this will increase the flow resistance along the cathode serpentine channel, thereby causing the ratio of gas that flows through the flow path 2474 to the gas that flows through the flow path 2476 to decrease.

It will be understood that while only one flow path 2474 and one flow path 2476 are shown in FIG. 24, such flow paths may generally be replicated for similar geometrical features across the cathode flow field 2416 and such additional flow paths may have similar characteristics and behavior.

Returning to FIG. 23, it can be seen that by filling the same two zones 2370 with separate cathode serpentine channels 2356, the longer segments A of those serpentine channels 2356 may be decreased as compared with the longer segments A of the cathode serpentine channel 2456. In FIG. 23, the longer segments A of the cathode serpentine channels 2356 are approximately half the length of the longer segments A of the cathode serpentine channels 2456. Assuming that the cathode serpentine channels 2356 and 2456 are generally otherwise similar, e.g., similar cross-sectional areas, the flow resistance along the flow path 2374 will be significantly less, e.g., ~50% or so, of the flow resistance along the flow path 2474. This, in turn, increases the ratio of gas that flows through the cathode serpentine channels 2356 as opposed to leaking, for example, under peninsular walls 2366 (e.g., via flow path 2376). As the cathode serpentine channels 2356 traverse across the zones 2370 in a generally evenly distributed manner, this results in a more uniform distribution of gas across the zones 2370 than may occur in cathode flow fields such as the cathode flow field 2416.

Another aspect of the geometry shown in FIG. 23 is that the depicted cathode serpentine channels 2356 are arranged in a generally symmetric manner such that at locations where the cathode serpentine channels in the two zones come into close proximity to each other, e.g., the shorter segments B that are adjacent to the boundary 2372, the total flow resistance along the serpentine channel from their respective inlets to those segments is generally equal, thereby resulting in a generally equal pressure drop from the inlet to each set of locations. This avoids a scenario in which two segments from different cathode serpentine channels are adjacent to one another but may have nominally different pressures that result in a pressure differential between them that may act to cause gas to cross from one such cathode serpentine channel to another.

For example, if one considers the flow resistance along the portions of the cathode serpentine channels 2356 that lie between the locations C in FIG. 23 and the fluidic inlet ports 2328, it can be seen that gas that flows through each cathode serpentine channel 2356 from the corresponding fluidic inlet port 2328 to the corresponding location C will flow along four longer segments A and three shorter segments B (and, arguably, a fourth shorter segment B that is not labeled but which leads from the fluidic inlet port 2328 to the leftmost longer segment A). Thus, the lengths of the portions of the cathode serpentine channels 2356 that are traversed by the gas flowing through the cathode serpentine channels 2356 may be generally the same and, accordingly (assuming that the cathode serpentine channels 2356 are otherwise the same, e.g., same cross-sectional dimensions), the total flow resistances between the fluidic inlet ports 2328 and the locations C may be the same. This results in the pressure drop experienced between the fluidic inlet ports 2328 and the locations C being generally the same, resulting in little or no pressure differential between the two locations C. As a result, there is little or no pressure differential present in the vicinity of the locations C that would act to cause gas from one cathode serpentine channel 2356 to flow that cathode serpentine channel 2356 into the other cathode serpentine channel 2356. This avoids or reduces the risk or severity of a scenario where gas flowed into one zone 2370 migrates into the other zone 2370, resulting in a gas distribution across the cathode flow field 2316 that is skewed.

The symmetric arrangement of cathode serpentine channels depicted in FIG. 23 may thus, for example, be characterized as having, for each set of locations along the cathode serpentine channels where there is the least separation between them, identical or nominally identical path lengths along the serpentine paths followed by the cathode serpentine channels between their fluidic inlet ports and those locations.

A further benefit to the bilaterally symmetric arrangement of cathode serpentine channels that is evident from the above-discussed Figures is that such an arrangement allows the fluidic inlet ports and the fluidic outlet ports to be located near the centers of edges of the cathode flow fields (as opposed to at a corner). In implementations in which similar serpentine channel geometries may be used in both cathode flow fields and anode flow fields, locating the fluidic inlet ports and the fluidic outlet ports in the middle of opposing edges of the flow fields may allow the same flow field component to be used as either a cathode flow field or an anode flow field, thereby potentially reducing the number of unique parts that may be needed to assemble a particular $CO_x$ electrolyzer cell.

Figure 25:
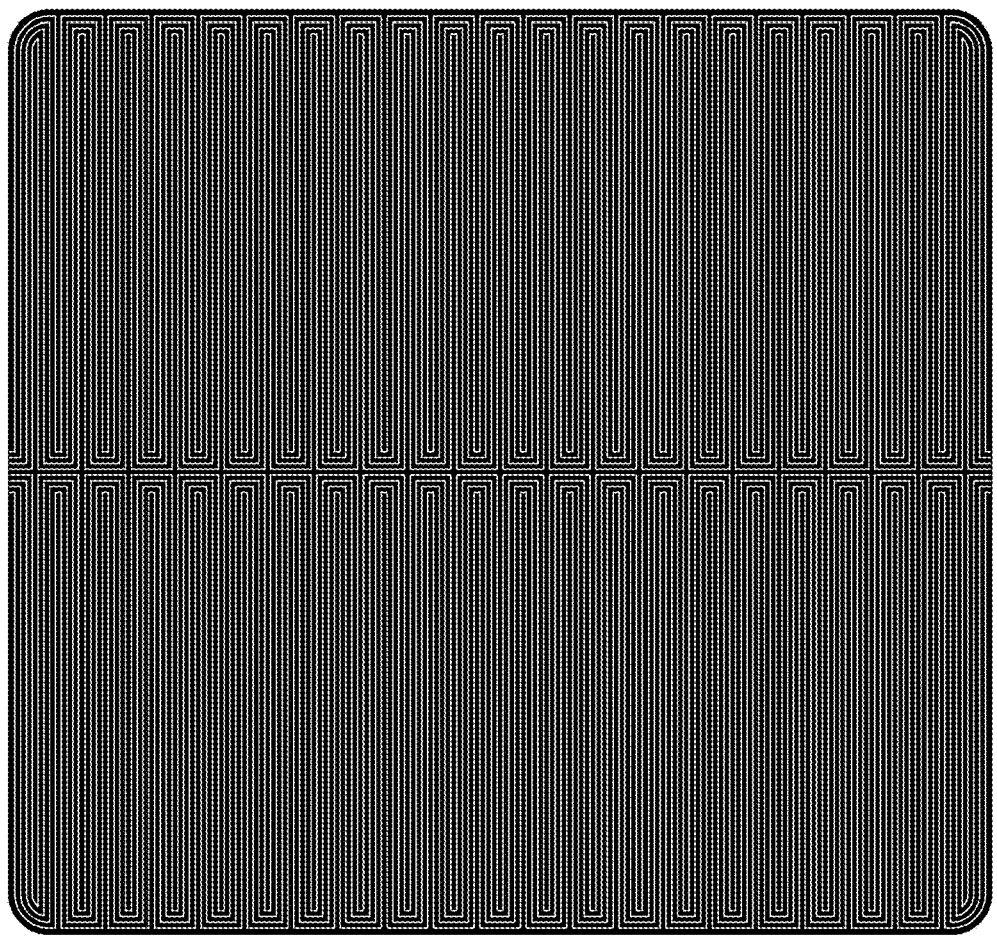
FIG. 25 depicts a cathode flow field with serpentine channels arranged in a bilaterally symmetric manner.
Figure 26:
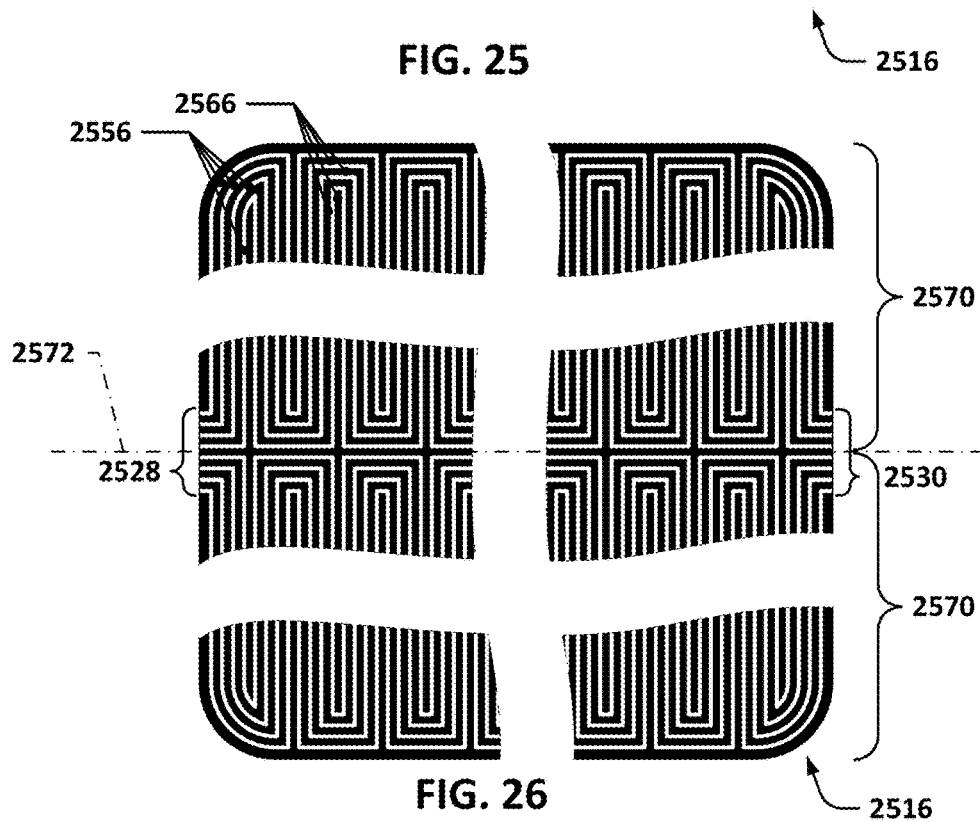
FIG. 26 depicts the same cathode flow field as in FIG. 25 in a scaled-up, broken view manner to allow various features to be more easily labeled and seen.

FIG. 25 depicts a cathode flow field 2516 with serpentine channels arranged in a bilaterally symmetric manner. FIG. 26 depicts the same cathode flow field in a scaled-up, broken view manner to allow various features to be more easily labeled and seen. Large sections of the cathode flow field 2516 have been cut out and removed in FIG. 26, with the remaining portions moved so as to be adjacent to one another. In the implementation of FIGS. 25 and 26, the cathode flow field 2516 is divided into two zones 2570 that are separated by a boundary 2572. Each zone 2570 has a set of four cathode serpentine channels 2556 that switchback in a nested or interleaved manner between the boundary 2572 and the edge of the relevant zone 2570 that is farthest from the boundary 2572. The cathode serpentine channels 2556 each extend between a corresponding fluidic inlet port 2528 and a corresponding fluidic outlet port 2530 (it will be understood that such fluidic inlet ports 2528 and fluidic outlet ports 2530 may, in some implementations, fluidically connect with a common plenum or manifold in a stack of cells where the plenum or manifold delivers gas to all of the fluidic inlet ports simultaneously (or that receives gas from all of the fluidic outlet ports simultaneously, as appropriate).

The cathode flow field of FIGS. 25 and 26 may, for example, have an active area (generally corresponding to the area within the bounds of the depicted component in FIG. 25) on the order of 750-800 cm², e.g., 760-790 cm² or 770-780 cm², while the cathode serpentine channels 2556 themselves may, for example, each have a length of approximately 5000 to 6000 mm, e.g., 5200 to 5800 mm, 5400 to 5600 mm, 5400 to 5800 mm, or 5200 to 5600 mm. The cathode serpentine channels may each be generally rectangular or square in cross-section, e.g., having a transverse width (generally perpendicular to the direction of gas flow within the cathode serpentine channels) and/or depth that ranges from 0.5 mm to 2 mm, e.g., 0.5 mm, 0.6 mm, 0.7 mm, 0.8 mm, 0.9 mm, 1 mm, 1.1 mm, 1.2 mm, etc. In the depicted example, cathode serpentine channels 2556 are each separated from adjacent cathode serpentine channels by peninsular walls 2566 that are, for example, 0.5 mm to 2 mm in transverse width, e.g., 0.5 mm to 2 mm, e.g., 0.5 mm, 0.6 mm, 0.7 mm, 0.8 mm, 0.9 mm, 1 mm, 1.1 mm, 1.2 mm, etc. For example, the cathode serpentine channels 2556 may be approximately 0.8 mm in width and depth, separated from each other by peninsular walls of approximately 0.9 mm width, and each be approximately 5600 mm in length (thus having open channel areas of ~5400 mm2 for each channel for zones covering an active area of 77650 mm2.

Figure 27:
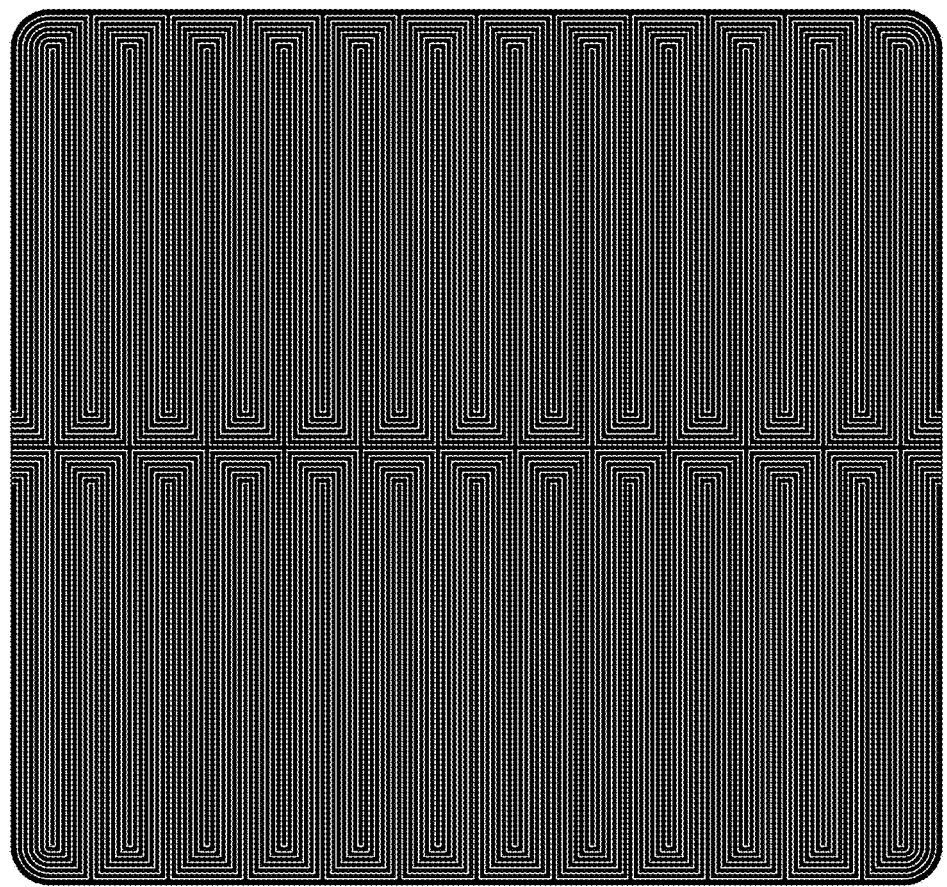
FIG. 27 depicts another cathode flow field with serpentine channels arranged in a bilaterally symmetric manner.
Figure 28:
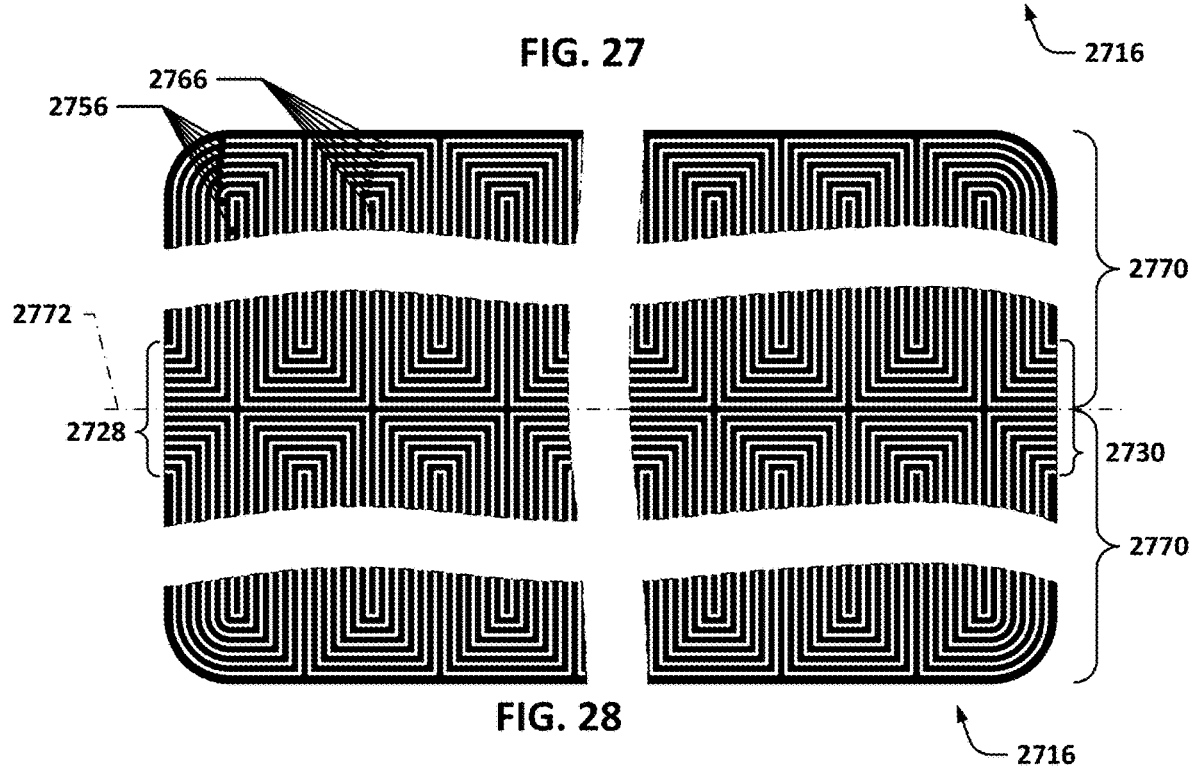
FIG. 28 depicts the same cathode flow field as in FIG. 27 in a scaled-up, broken view manner to allow various features to be more easily labeled and seen.

FIG. 27 depicts another cathode flow field 2716 with serpentine channels arranged in a bilaterally symmetric manner. FIG. 28 depicts the same cathode flow field 2716 in a scaled-up, broken view manner to allow various features to be more easily labeled and seen. Large sections of the cathode flow field 2716 have been cut out and removed in FIG. 28, with the remaining portions moved so as to be adjacent to one another. The implementation of FIGS. 27 and 28 is generally similar to that of FIGS. 25 and 26, with corresponding elements labeled with Figure callouts sharing the last two digits in common with their counterparts in the implementation of FIGS. 25 and 26. The discussion above regarding such elements in the context of FIGS. 25 and 26 is equally applicable to those same elements in FIGS. 27 and 28 unless otherwise indicated below.

The implementation of FIGS. 27 and 28, for example, features a larger number of cathode serpentine channels 2756 in each zone 2770, e.g., seven cathode serpentine channels 2756 in each zone 2770. The cathode serpentine channels 2756 may each be on the order of 3000 mm to 3500 mm long. In the implementation shown, the cathode serpentine channels 2756 may be approximately 0.8 mm in width and depth, separated from each other by peninsular walls of approximately 0.9 mm width, and each be approximately 3200 mm in length (thus having open channel areas of ~2570 mm2 for each channel for zones covering an active area of 77650 mm2.

Parallel Channel Flow Fields

Figure 29:
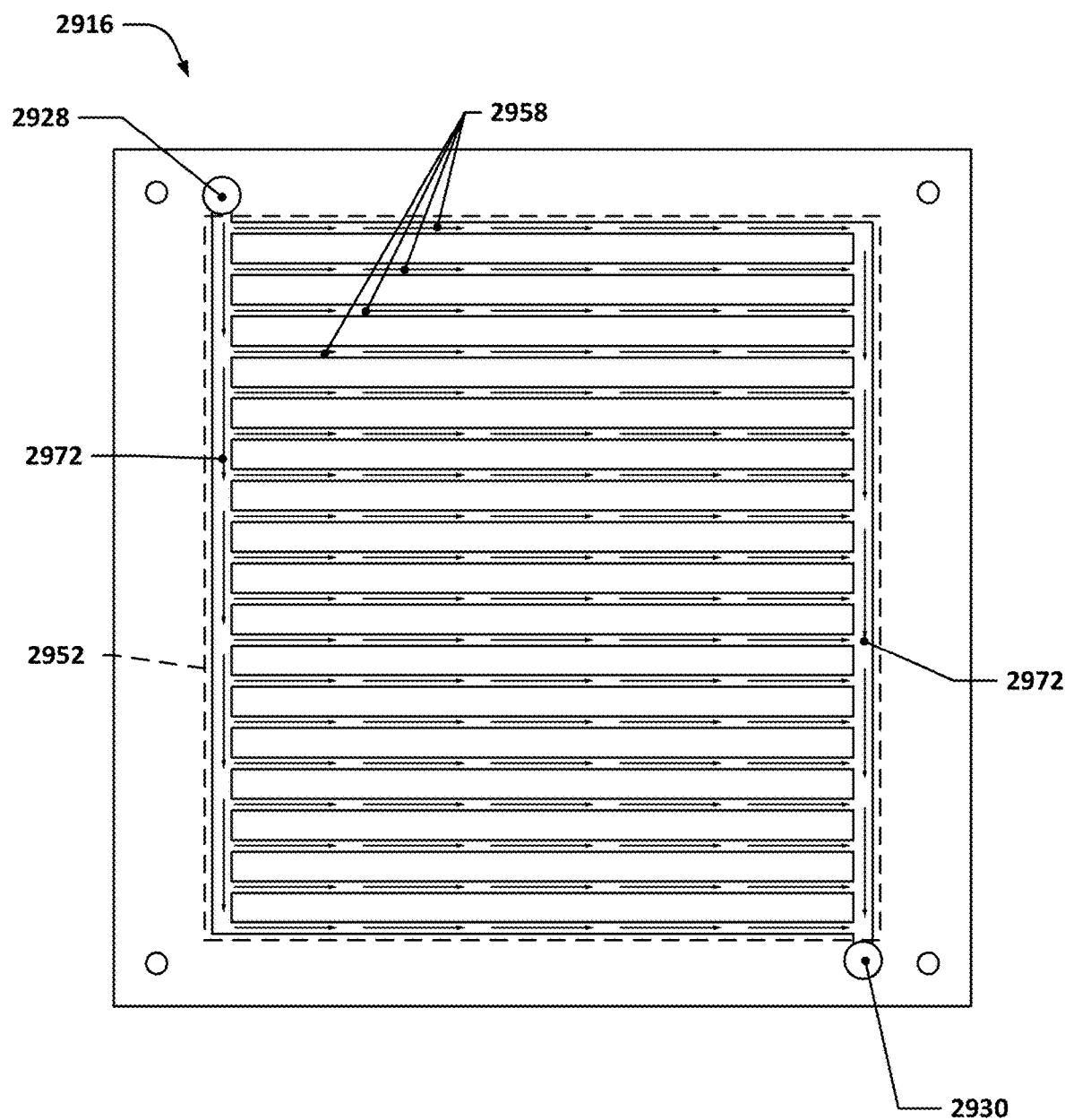
FIG. 29 depicts an example of a cathode flow field with a parallel channel arrangement.

Another type of channel arrangement that may be used in some cathode flow fields is a parallel channel arrangement. Flow fields having a parallel channel arrangement have at least some channels that have a straight or substantially straight path between an inlet port and an outlet port. In some embodiments, all channels in a flow field having a parallel channel arrangement have a straight or substantially straight path between an inlet port and an outlet port. In some embodiments, Flow fields having a parallel channel arrangement have at least one dimension that is at least as long as the channel length of the parallel channels in the flow field. FIG. 29 depicts an example parallel channel cathode flow field. As can be seen, a cathode flow field 2916 is depicted that has a fluidic inlet port 2928 and a fluidic outlet port 2930. The fluidic inlet port 2928 and the fluidic outlet port 2930 may each be fluidically connected with corresponding plenum passages 2972, which may generally extend in directions parallel to one another. A series of parallel channels 2958 may be arranged in a linear array, with each parallel channel 2958 fluidically connected with and fluidically interposed between the two plenum passages 2972. The parallel channels 2958 may be designed to have similar flow resistances, e.g., similar or identical cross-sections and similar or identical lengths. The fluidic inlet port 2928 and the fluidic outlet port 2930 may be positioned at opposing corners of the parallel channel arrangement such that the flow paths from the fluidic inlet port 2928 to the fluidic outlet port 2930 via the parallel channels 2958 and the plenum passages 2972 are of generally equal length regardless of which parallel channel 2958 any given flow path flows through.

Cathode flow fields with parallel channel arrangements offer more direct fluid flow paths than serpentine channel arrangements for equivalent coverage areas provide, and the average distances that accumulated liquid water must be moved through in order to evacuate it from a parallel channel in such arrangements are significantly shorter in a parallel channel than in a serpentine channel for a similarly sized $CO_x$ electrolyzer. While this is advantageous in that less energy is needed in order to evacuate liquid water from the channels, parallel channel arrangements will typically also include a larger number of potential alternate flow paths, e.g., tens or hundreds of flow paths, as compared with serpentine channel arrangements, which tend to include fewer numbers of flow paths, e.g., 2, 3, 4, or other relatively low numbers of flow paths. As discussed earlier, as the number of flow paths through a cathode flow field increases, it may be more likely that fluid flow that would normally flow through a blocked parallel channel will simply re-route itself and travel through one or more other unobstructed parallel channels within the cathode flow field rather than act to eject the liquid water that is obstructing fluid flow.

The larger numbers of parallel channels that may need to be used in parallel channel cathode flow fields may make it difficult to maintain the higher pressures and flow speeds needed within such cathode flow fields in the context of a $CO_x$ electrolyzer without also reducing the cross-sectional area of the parallel channels in order to allow for higher pressure differentials between the two plenum passages 2272. Achieving such cross-sectional areas may prove challenging from a machining perspective and may make manufacturing of such cathode flow fields more challenging on the smaller scale. However, larger-sized cathode flow fields, e.g., ones that are sufficiently large enough to be able to support parallel, straight-channel flow fields, may allow the use of channel dimensions that are easily machinable to achieve a desired pressure drop. For example, parallel, straight-channel flow fields each having a length on the order of 1.5 meters in length and 0.2 mm² in cross-sectional area, e.g., 0.5 mm in width and 0.4 mm in depth, may allow for a pressure drop of 1.9 psi during normal operating conditions in some cathode flow fields, which may be sufficient to evacuate any accumulated water resulting from $CO_x$ electrolyzer operation.

By way of example, some parallel channel cathode flow fields may have parallel channels that each have overall lengths of about 12 m or less or about 6 m or less. Some parallel channel cathode flow fields have parallel channels that each have an overall length of about 0.3 m or greater. In some embodiments, parallel channel cathode flow fields have channels that each have overall lengths on the order of between about 0.1 m and about 1.5 m, between about 0.1 m and about 0.8 m, between about 0.3 and about 2 m, between about 0.8 m and about 1.5 m, between about 0.1 m and about 0.45 m, between about 0.45 m and about 0.8 m, between about 0.8 m and about 1.15 m, between about 1.15 m and about 1.5 m, between about 0.1 m and about 0.275 m, between about 0.275 m and about 0.45 m, between about 0.45 m and about 0.625 m, between about 0.625 m and about 0.8 m, between about 0.8 m and about 0.975 m, between about 0.975 m and about 1.15 m, between about 1.15 m and about 1.32 m, or between about 1.32 m and about 1.5 m.

For example, such parallel channels may have widths that are between about 0.5 mm and about 2 mm, between about 0.5 mm and about 1.2 mm, between about 1.2 mm and about 2 mm, between about 0.5 mm and about 0.88 mm, between about 0.88 mm and about 1.2 mm, between about 1.2 mm and about 1.6 mm, between about 1.6 mm and about 2 mm, between about 0.5 mm and about 0.69 mm, between about 0.69 mm and about 0.88 mm, between about 0.88 mm and about 1.1 mm, between about 1.1 mm and about 1.2 mm, between about 1.2 mm and about 1.4 mm, between about 1.4 mm and about 1.6 mm, between about 1.6 mm and about 1.8 mm, or between about 1.8 mm and about 2 mm.

Such parallel channels may also have depths that are between about 0.3 mm and about 3 mm, between about 0.3 mm and about 1.6 mm, between about 1.6 mm and about 3 mm, between about 0.3 mm and about 0.98 mm, between about 0.98 mm and about 1.6 mm, between about 1.6 mm and about 2.3 mm, between about 2.3 mm and about 3 mm, between about 0.3 mm and about 0.64 mm, between about 0.64 mm and about 0.98 mm, between about 0.98 mm and about 1.3 mm, between about 1.3 mm and about 1.6 mm, between about 1.6 mm and about 2 mm, between about 2 mm and about 2.3 mm, between about 2.3 mm and about 2.7 mm, or between about 2.7 mm and about 3 mm.

Parallel channels with widths and depths such as those discussed above may result in each such parallel channel having an open surface area per channel of between about 150 mm² and about 3000 mm², between about 150 mm² and about 1600 mm², between about 1600 mm² and about 3000 mm², between about 150 mm² and about 860 mm², between about 860 mm² and about 1600 mm², between about 1600 mm² and about 2300 mm², between about 2300 mm² and about 3000 mm², between about 150 mm² and about 510 mm², between about 510 mm² and about 860 mm², between about 860 mm² and about 1200 mm², between about 1200 mm² and about 1600 mm², between about 1600 mm² and about 1900 mm², between about 1900 mm² and about 2300 mm², between about 2300 mm² and about 2600 mm², or between about 2600 mm² and about 3000 mm².

Such parallel channels may also have per-channel cross-sectional areas of between about 0.15 mm² and about 6 mm², between about 0.15 mm² and about 3.1 mm², between about 3.1 mm² and about 6 mm², between about 0.15 mm² and about 1.6 mm², between about 1.6 mm² and about 3.1 mm², between about 3.1 mm² and about 4.5 mm², between about 4.5 mm² and about 6 mm², between about 0.15 mm² and about 0.88 mm², between about 0.88 mm² and about 1.6 mm², between about 1.6 mm² and about 2.3 mm², between about 2.3 mm² and about 3.1 mm², between about 3.1 mm² and about 3.8 mm², between about 3.8 mm² and about 4.5 mm², between about 4.5 mm² and about 5.3 mm², or between about 5.3 mm² and about 6 mm²

Such parallel channels may also have total channel volumes (per channel) of between about 100 µl and about 9000 µl, between about 100 µl and about 4600 µl, between about 4600 µl and about 9000 µl, between about 100 µl and about 2300 µl, between about 2300 µl and about 4600 µl, between about 4600 µl and about 6800 µl, between about 6800 µl and about 9000 µl, between about 100 µl and about 1200 µl, between about 1200 µl and about 2300 µl, between about 2300 µl and about 3400 µl, between about 3400 µl and about 4600 µl, between about 4600 µl and about 5700 µl, between about 5700 µl and about 6800 µl, between about 6800 µl and about 7900 µl, or between about 7900 µl and about 9000 µl.

In some such implementations, cathode flow fields with parallel channels may also have structural characteristics relating to the thickness of the walls that are interposed between adjacent parallel channels. For example, the wall thickness in between adjacent parallel channels (and thus the distance between surfaces of those channels that are closest to one another) may be selected to be between about 0.0002 and about 0.0067, between about 0.0002 and about 0.0034, between about 0.0034 and about 0.0067, between about 0.0002 and about 0.0018, between about 0.0018 and about 0.0034, between about 0.0034 and about 0.005, between about 0.005 and about 0.0067, between about 0.0002 and about 0.001, between about 0.001 and about 0.0018, between about 0.0018 and about 0.0026, between about 0.0026 and about 0.0034, between about 0.0034 and about 0.0042, between about 0.0042 and about 0.005, between about 0.005 and about 0.0059, between about 0.0059 and about 0.0067 times the average overall length of the two adjacent parallel channels.

In some such parallel channel implementations having dimensional characteristics like those discussed above, the wall thickness between adjacent channels may be, for example, between about 0.15 mm and 5 mm, between about 0.15 mm and about 2.6 mm, between about 2.6 mm and about 5 mm, between about 0.15 mm and about 1.4 mm, between about 1.4 mm and about 2.6 mm, between about 2.6 mm and about 3.8 mm, between about 3.8 mm and about 5 mm, between about 0.15 mm and about 0.76 mm, between about 0.76 mm and about 1.4 mm, between about 1.4 mm and about 2 mm, between about 2 mm and about 2.6 mm, between about 2.6 mm and about 3.2 mm, between about 3.2 mm and about 3.8 mm, between about 3.8 mm and about 4.4 mm, or between about 4.4 mm and about 5 mm.

Branching Parallel Channel Flow Fields

In some parallel channel implementations having dimensional characteristics like those discussed above, the parallel channels may be divided into separate clusters of adjacent channels that are each provided gas by a corresponding common inlet flow path (and that have similar exit flow path arrangements). Such parallel channel implementations may help ensure a more even distribution of gas within a cathode flow field. In effect, each cluster of parallel channels may represent a separate fluid flow "branch" that originates from the same starting point, such as a plenum or manifold that feeds the fluidic inlet ports that supply gas to each cluster of parallel channels).

Figure 30:
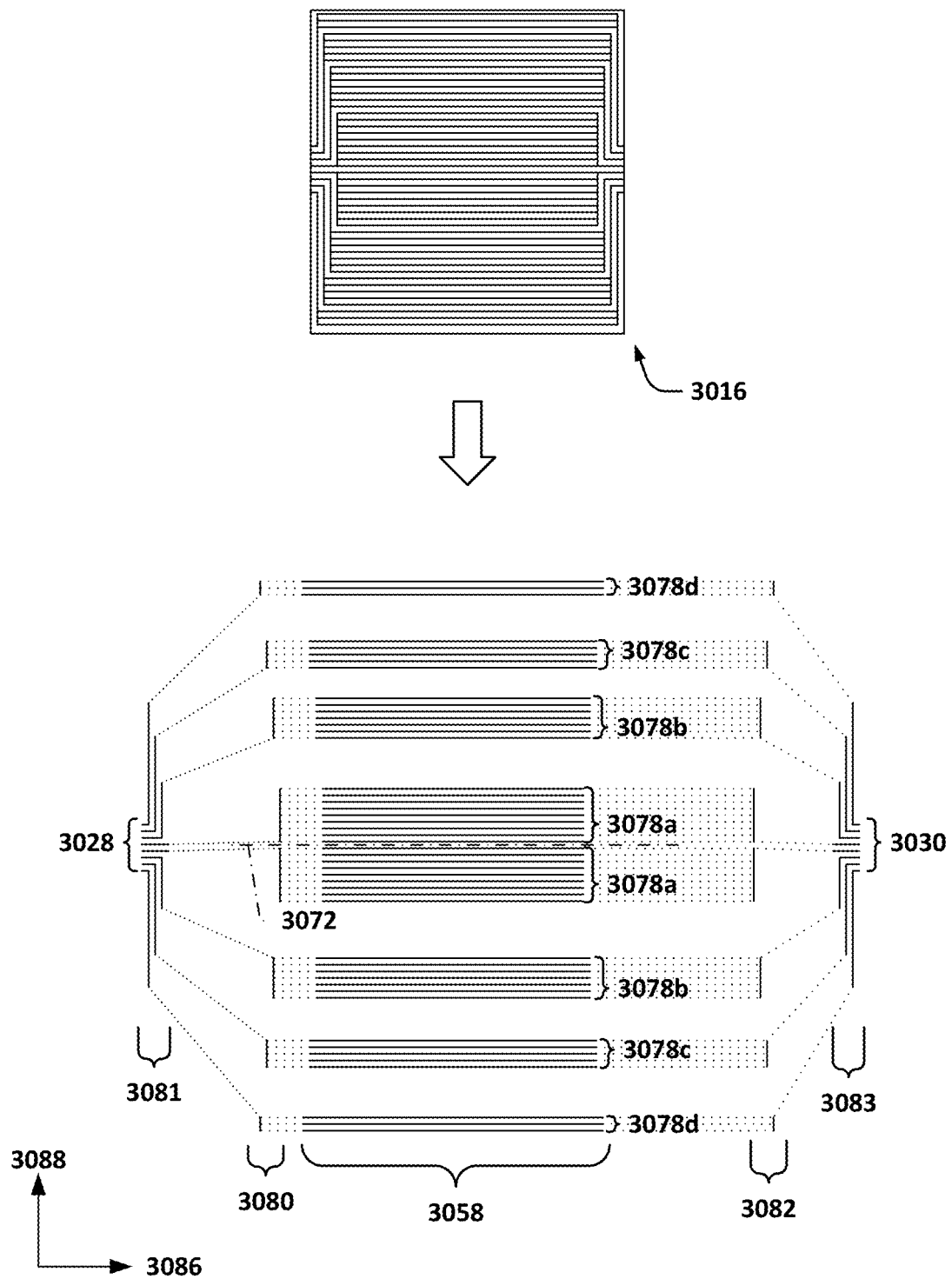
FIG. 30 depicts a schematic of an example parallel channel flow field.

FIG. 30 depicts a schematic of an example such parallel channel flow field. In FIG. 30, a schematic of a cathode flow field 3016 is shown. In the top half of FIG. 30, the cathode flow field 3016 is shown in a single piece, while in the bottom half, the flow paths through the cathode flow field 3016 are shown deconstructed into various sub-portions (dotted lines show the fluidic connections between these sub-portions). As can be seen, there are clusters 3078a/b/c/d of parallel channels 3058 that extend along a first direction 3086 in a parallel manner, similar to the parallel channels discussed earlier. In the depicted arrangement, the clusters 3078a/b/c/d are arranged in a bilaterally symmetric manner, e.g., with two clusters 3078a located at equidistant locations from, and on either side of, a symmetry axis 3072. The other clusters 3078b/c/d are also provided in pairs in which the clusters in each pair are each similarly equally spaced apart from the symmetry axis 3072.

The parallel channels 3058 in each cluster 3078a/b/c/d are each fluidically connected at one end with a corresponding inlet branch passage 3080 that extends in a second direction 3088 that is nominally orthogonal to the first direction 3086 and at the other end with a corresponding outlet branch passage 3082 that also extends in the second direction 3088. Each of the inlet branch passages 3080 connects with a corresponding inlet passage 3081 that leads to a corresponding fluidic inlet port 3028, while each of the outlet branch passages 3082 on the other side connects with an outlet passage 3083 that leads to a corresponding fluidic outlet port 3030. The inlet passages 3081 and outlet passages 3083 may generally extend along directions parallel to the second direction 3088 but may also include segments that extend in the first direction 3086 in order to connect with the fluidic inlet ports 3028 or the fluidic outlet ports 3030 (as appropriate), and the fluidic inlet ports 3028 and the fluidic outlet ports 3030 may each be located at locations near, and centered on (as a group), the symmetry axis 3072. While not depicted here, the fluidic inlet ports 3028 and the fluidic outlet ports 3030 may each connect with a corresponding common inlet or common outlet, as appropriate and as shown in other example flow fields herein.

When gas is flowed into the fluidic inlet ports 3028, the gas flows into the cathode flow field 3016 as separate gas flows to each of the inlet branch passages 3080 via a corresponding inlet passage 3081, at which point each gas flow may subdivide into the separate parallel channels 3058 that are in the respective cluster 3078a/b/c/d of parallel channels 3058 that fluidically connect with the inlet branch passage 3080 that those parallel channels 3058 connect with. Similarly, when the gas that flows down the parallel channels 3058 in a particular cluster 3078a/b/c/d, it exits those parallel channels 3058, where such gas flows will recombine in the outlet branch passage 3082 that connects with those parallel channels 3058 before exiting the cathode flow field 3016 via the corresponding outlet passages 3083 and fluidic outlet ports 3030.

It will be noted that the number of parallel channels 3058 that are in each cluster 3078a/b/c/d decreases the further the cluster 3078a/b/c/d is from the symmetry axis 3072. Put another way, the number of parallel channels 3058 that are in each cluster 3078a/b/c/d may generally decrease as a function of increasing flow path length from the corresponding fluidic inlet port 3028 to the corresponding inlet branch passage 3080 (although, in some instances, the number of parallel channels 3058 that are in some adjacent clusters may remain the same). Thus, a cluster 3078 of the clusters 3078a/b/c/d where gas travels along a longer inlet passage 3081 path length before reaching that cluster may have fewer parallel channels 3058 in it than a cluster 3078 of the clusters 3078a/b/c/d where gas travels along a shorter inlet passage 3081 path length before reaching it. Such a configuration allows for more even distribution of the gas that is flowed through the cathode flow field 3016. For example, due to the longer distance that gas must flow when flowing through the parallel channels 3058 that are in the clusters 3078d (due to the longer flow paths between the fluidic inlet ports 3028 and the inlet branch passages 3080 that connect with the parallel channels 3058 in the clusters 3078d), the overall flow resistance experienced by gas flowing through such parallel channels 3058 may be higher than with gas that flows through the parallel channels 3058 that are, for example, in the clusters 3078a/b/c (which flows along shorter flow path lengths and thus encounters lower flow resistance).

Figure 31:
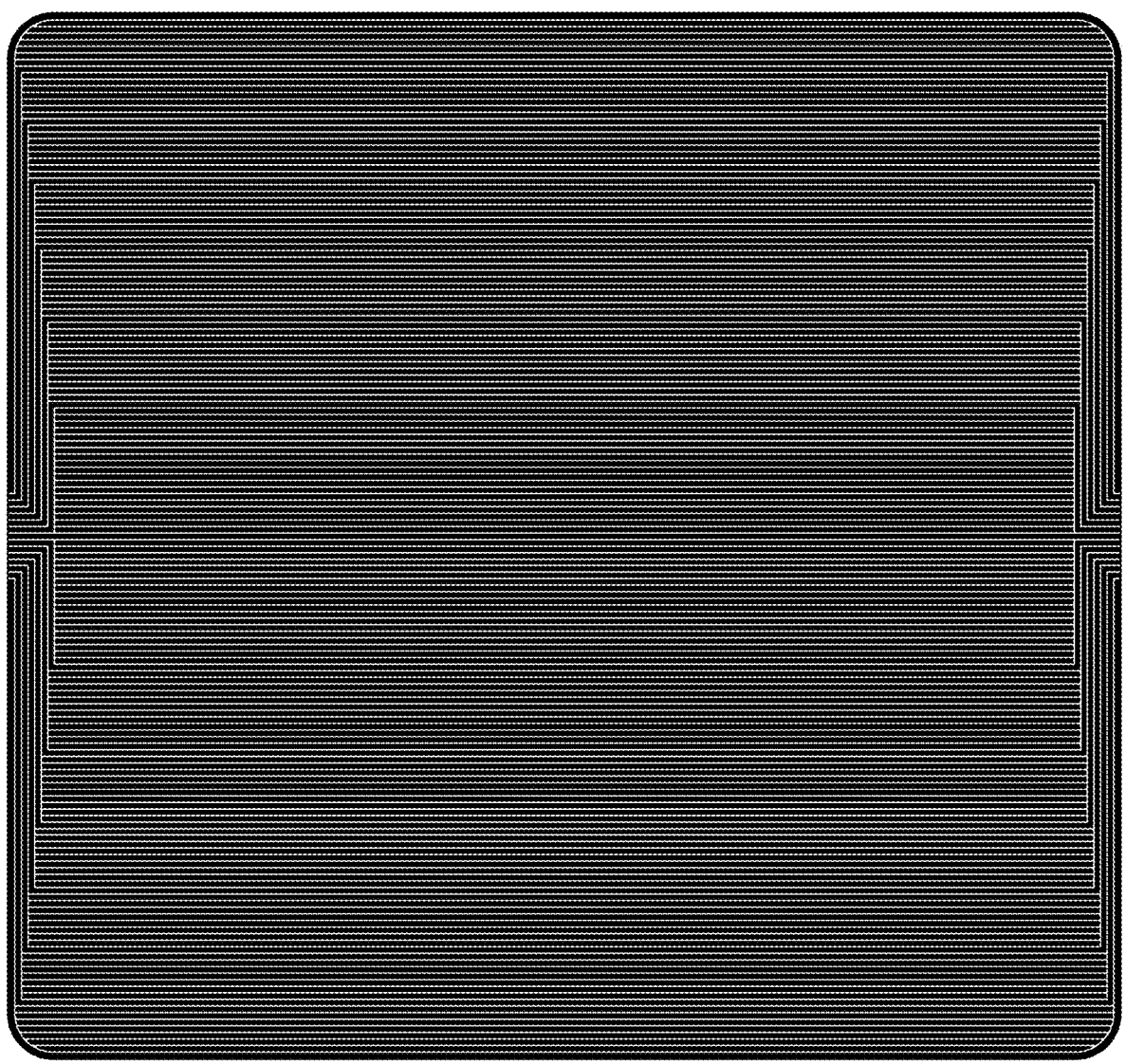
FIG. 31 depicts an example of a branching parallel channel flow field.
Figure 32:
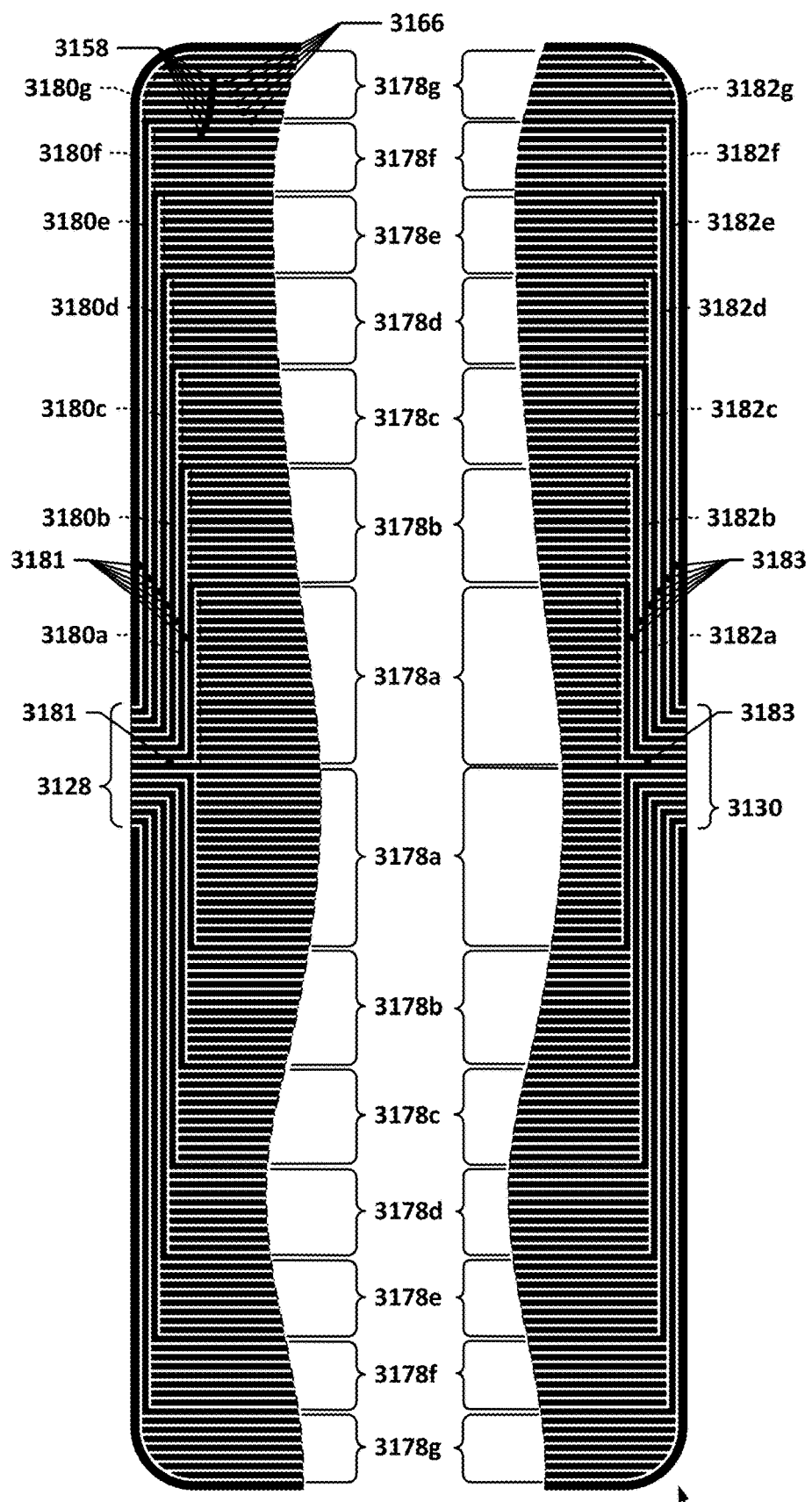
FIG. 32 depicts the same branching channel flow field as in FIG. 31 but in enlarged form and with the middles of the parallel channels omitted by way of a break section.

FIG. 31 depicts an example of a branching parallel channel flow field; FIG. 32 depicts the same branching channel flow field as in FIG. 31 but in enlarged form and with the middles of the parallel channels omitted by way of a break section.

In FIGS. 31 and 32, a cathode flow field 3116 with a parallel channel arrangement is shown. The cathode flow field 3116 includes 7 clusters 3178a/b/c/d/e/f/g of parallel channels 3158 on either side of a symmetry axis (not shown, but bisecting the cathode flow field 3116 horizontally with respect to the page orientation). The parallel channels 3158 are separated by partition walls 3166; further partition walls 3166 may define other channels of the cathode flow field 3116.

The parallel channels 3158 of each cluster 3178a/b/c/d/e/f/g are each connected at one end to corresponding inlet branch passages 3180a/b/c/d/e/f/g and at the other end to corresponding outlet branch passages 3182a/b/c/d/e/f/g, which generally extend along directions that are perpendicular to the parallel channels 3158 (only the inlet branch passages 3180 in the upper left quadrant and the outlet branch passages 3182 in the upper right quadrant of the depicted cathode flow field 3116 are called out, but it will be understood that additional inlet branch passages 3180 and outlet branch passages 3182 of similar design are visible in FIGS. 31 and 32). Each inlet branch passage 3180 may be connected via a corresponding inlet passage 3181 to one of the fluidic inlet ports 3128. Similarly, each outlet branch passage 3182 may be connected via a corresponding outlet passage 3183 to one of the fluidic outlet ports 3130.

The cathode flow field of FIGS. 31 and 32 may, for example, have an active area (generally corresponding to the area within the bounds of the depicted component in FIG. 31) on the order of 750-800 $cm^2$, e.g., 760-790 $cm^2$ or 770-780 $cm^2$, while the parallel channels 3158 themselves may, for example, each have a length of approximately 250 to 300 mm, e.g., 260 to 290 mm, 260 to 280 mm, 270 to 280 mm, 270 to 290 mm, or 270 to 280 mm. The parallel channels may each be generally rectangular or square in cross-section, e.g., having a transverse width (generally perpendicular to the direction of gas flow within the parallel channels) and/or depth that ranges from 0.5 mm to 2 mm, e.g., 0.5 mm, 0.6 mm, 0.7 mm, 0.8 mm, 0.9 mm, 1 mm, 1.1 mm, 1.2 mm, etc. In the depicted example, the parallel channels 3158 are each separated from adjacent parallel channels by partition walls 3166 that are, for example, 0.5 mm to 2 mm in transverse width, e.g., 0.5 mm to 2 mm, e.g., 0.5 mm, 0.6 mm, 0.7 mm, 0.8 mm, 0.9 mm, 1 mm, 1.1 mm, 1.2 mm, etc. For example, the parallel channels 2558 may be approximately 0.8 mm in width and 0.5 mm deep, separated from each other by partition walls of approximately 0.9 mm width, and each be approximately 270 mm in length.

Figure 33:
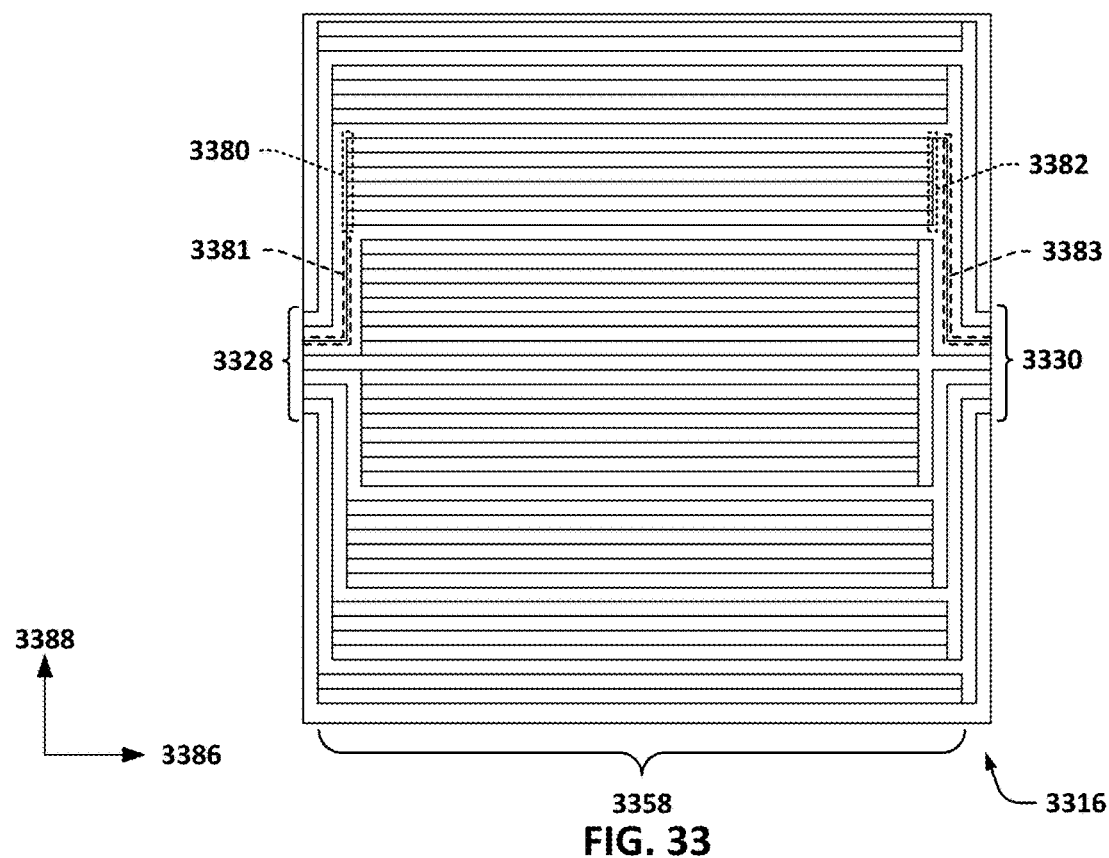
FIG. 33 depicts a schematic of another example of a branching parallel channel flow field.

FIG. 33 depicts a schematic of another example of a branching parallel channel flow field. In FIG. 33, a cathode flow field 3316 is shown in which there are multiple clusters of parallel channels 3358 (similar, for example, to the clusters 3078 depicted in FIG. 30). The parallel channels 3358 in each cluster of parallel channels 3358 may be connected at one end to an inlet branch passage 3380 and at the other end to an outlet branch passage 3382. Each inlet branch passage 3380 may be connected with a corresponding fluidic inlet port 3328 via a corresponding inlet passage 3381, and each outlet branch passage 3382 may be connected with a corresponding fluidic outlet port 3330 via a corresponding outlet passage 3383. In FIG. 33, only one inlet branch passage 3380, outlet branch passage 3382, inlet passage 3381, and outlet passage 3383 are indicated with callouts, but it will be understood that other pairs of inlet/outlet branch passages 3380/3382 and inlet/outlet passages 3381/3383 are present as well in association with each cluster of parallel channels 3358.

The arrangement of parallel channels 3358 and inlet/outlet branch passages 3380/3382 shown in FIG. 33 is very similar to that shown in FIG. 30. However, there is one significant difference—the inlet branch passages 3380 and the outlet branch passages 3382 for each cluster of parallel channels 3358 in FIG. 33 are each connected with a respective inlet passage 3381 or outlet passage 3383 at, in effect, opposite ends. For example, the inlet branch passage 3380 is connected to an inlet passage 3381 that leads to one of the fluidic inlet ports 3328, and the outlet branch passage 3382 is connected to an outlet passage 3383 that leads to one of the fluidic outlet ports 3330. However, the inlet passage 3381 leading to the fluidic inlet port 3328 connects to the inlet branch passage 3380 at a location along the inlet branch passage 3380 that is closest to that fluidic inlet port 3328, while the outlet passage 3383 leading to the fluidic outlet port 3330 connects to the outlet branch passage 3382 at a location along the outlet branch passage 3382 that is furthest from that fluidic outlet port 3330. It will be appreciated that the reverse arrangement may be used as well (essentially flipping the depicted arrangement left-to-right).

Another way of looking at this arrangement is that the inlet passage 3381 that leads from the fluidic inlet port 3328 connects with the inlet branch passage 3380 at a location that is proximate to one of the two outermost parallel channels 3358 in the cluster of parallel channels 3358 that the inlet branch passage 3380 provides gas to, while the outlet passage 3383 that leads to the fluidic outlet port 3330 connects with the outlet branch passage 3382 at a location that is proximate to the other of the two outermost parallel channels 3358 in the cluster of parallel channels 3358 that the outlet branch passage 3382 receives gas from. For clarity, the "outermost" parallel channels in a cluster of parallel channels are the two channels between which all of the other parallel channels in the cluster (if any) are located.

Such an arrangement may ensure that gas that flows into a given cluster of parallel channels 3358 will need to not only traverse along one of the parallel channels 3358 in that cluster in order to reach the fluidic outlet ports 3330, but will also need to traverse along, in aggregate, one of the inlet branch passages 3380. In effect, such an arrangement generally equalizes the flow path length from fluidic inlet port 3328 to fluidic outlet port 3330 for all of the parallel channels 3358 in a given cluster of parallel channels 3358. This serves to help equalize the flow resistance between the parallel channels 3358 within each cluster of parallel channels 3358, thereby enhancing flow uniformity within each cluster of parallel channels 3358.

Figure 34:
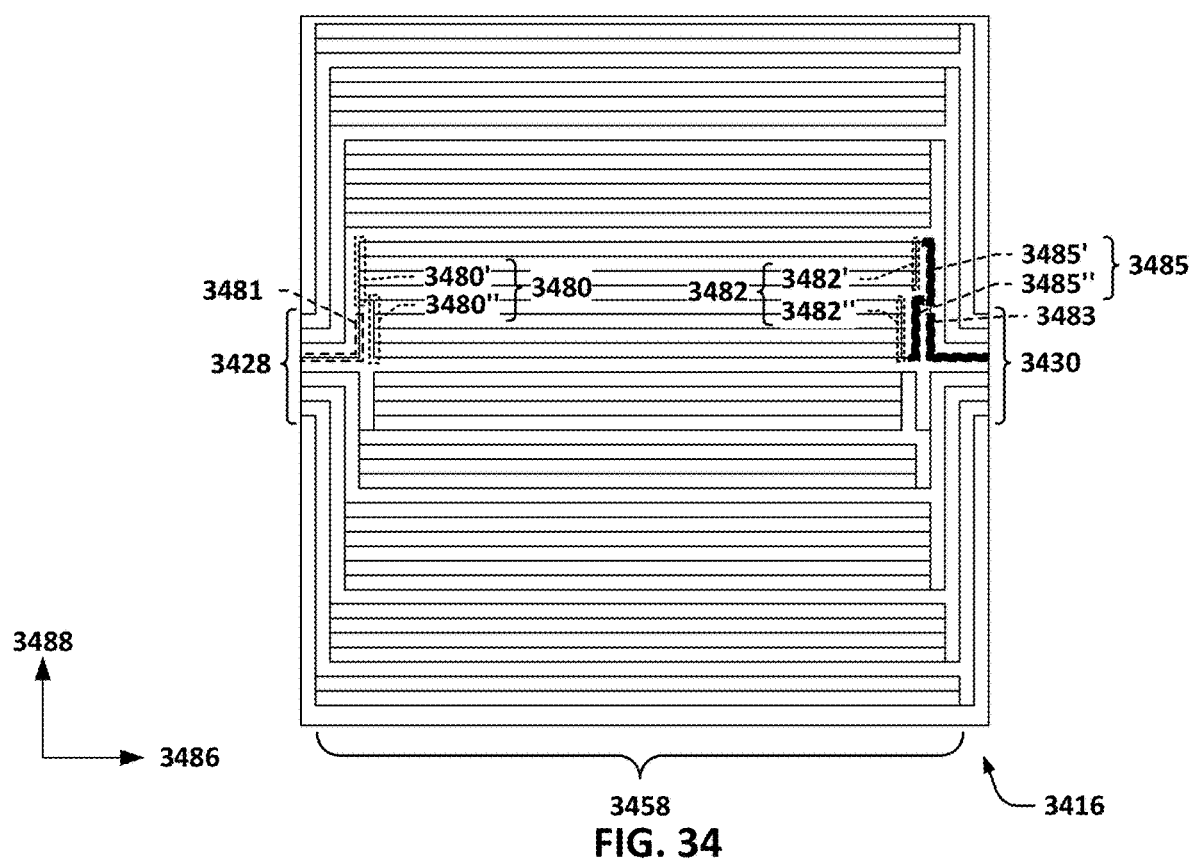
FIG. 34 depicts a schematic of yet another example of a branching parallel channel flow field.

FIG. 34 depicts a schematic of yet another example of a branching parallel channel flow field. In FIG. 34, a cathode flow field 3416 is shown in which there are multiple clusters of parallel channels 3458 (similar, for example, to the clusters depicted in FIG. 30). The parallel channels 3458 in each cluster of parallel channels 3458 may be connected at one end with inlet branch passages 3480 (3480' and 3480") and at the other end with outlet branch passages 3482 (3482' and 3482"). Each inlet branch passage 3480 may connect with a corresponding fluidic inlet port 3428 via a corresponding inlet passage 3481, and each outlet branch passage 3482 may connect with a corresponding outlet port 3428 via a corresponding outlet passage 3483. As shown, the outlet branch passage 3482 that is called out is actually split into two sub-portions 3482' and 3482", each of which is connected with the same outlet passage 3483 by a corresponding outlet branch passage extensions 3485 (3485' or 3485"). The lengths of these outlet branch passage extensions 3485' and 3485" may generally be equivalent. As in FIG. 33, only one inlet branch passage 3480, outlet branch passage 3482, inlet passage 3481, and outlet passage 3482 are indicated, but it will be understood that other instances of such passages may be associated with each cluster of parallel channels 3458.

The arrangement shown in FIG. 34 is similar to that shown in FIG. 33, although the inlet passages 3481 and outlet passages 3483 that connect the inlet branch passages 3480 and outlet branch passages 3482 with their respective fluidic inlet ports 3428 and fluidic outlet ports 3430 do not necessarily connect to either end of the inlet branch passages 3480 or the outlet branch passages 3482. For example, the inlet passage 3481 that connects the fluidic inlet port 3428 to the inlet branch passage 3480 connects with the inlet branch passage 3480 at a location approximately midway along its length, with some of the parallel channels 3458 in the associated cluster of parallel channels 3458 connecting with a first sub-portion 3480' of the inlet branch passage 3480 on one side of that connection point, and the other parallel channels 3458 in the associated cluster of parallel channels 3458 connecting with a second sub-portion 3480" of the inlet branch passage 3480 on the other side of that connection point. It will be noted that the outlet branch passage 3482 also follows this convention, although with the outlet branch passage 3482 sub-portions having outlet branch passage extensions 3485' and 3485" that allow the flow paths to take U-turns in between where the parallel channels 3458 connect therewith and where the outlet passage 3483 leading to the fluidic outlet port 3430 connects therewith. The outlet branch passage extensions 3485' and 3485" may, as may be seen, have lengths that are each generally equivalent to the corresponding lengths of the sub-portions 3482' and 3482" of the outlet branch passage 3482.

The inlet branch passages 3480 and the outlet branch passages 3482 of FIG. 34 may be generally characterized as having corresponding sub-portions, with the sub-portions in each pair of corresponding sub-portions being connected with opposing ends of a sub-group of parallel channels 3458 in the cluster of parallel channels 3458 associated with each of the inlet branch passages 3480 and each of the outlet branch channels 3482. Each pair of sub-portions may connect with the parallel channels 3458 that span between those sub-portions in a manner that is similar to how the parallel channels 3358 in each cluster of parallel channels connect with the corresponding inlet branch passage 3380 and outlet branch passage 3382 for that cluster of parallel channels 3358 in the implementation of FIG. 33.

For example, each inlet branch passage 3480 sub-portion and each outlet branch passage 3482 sub-portion may have a first end and a second end, with the first end of each such sub-portion being closest to the location where the corresponding inlet passage 3481 or outlet passage 3483 leading to the relevant fluidic inlet or outlet port 3428 or 3430 connects with the inlet branch passage 3480 or outlet branch passage 3482 having that sub-portion and the second end of that sub-portion being furthest along the path followed by that sub-portion from that location. The parallel channels 3458 that span between each pair of sub-portions may connect with each sub-portion at locations that are spaced-apart from one another. The sequence in which each sub-group of parallel channels 3458 connects with the two sub-portions that those parallel channels 3458 span between may be reversed between those two sub-portions. For example, the parallel channel 3458 that connects with one sub-portion at a location that is, of the various connection locations, closest to the first end of that sub-portion would connect with the other sub-portion at a location that is, of the various connection locations, furthest from the first end of the other sub-portion, and vice versa.

Such an arrangement of increased tortuosity is a refinement of the configuration discussed above with respect to FIG. 33 and allows for the gas flow across the cathode flow field 3416 to be even more evenly distributed as compared with the configuration of FIG. 33. It will be understood that while the sub-portion arrangement discussed above is only shown in FIG. 34 for the two innermost clusters of parallel channels, such a configuration may be implemented for any or all of the clusters in a branching parallel channel flow field. It will also be understood that the arrangement of FIG. 34 may be reversed from left-to-right, with the inlet branch passages having inlet branch passage extensions and the outlet branch passages having no outlet branch passage extensions.

Figure 35:
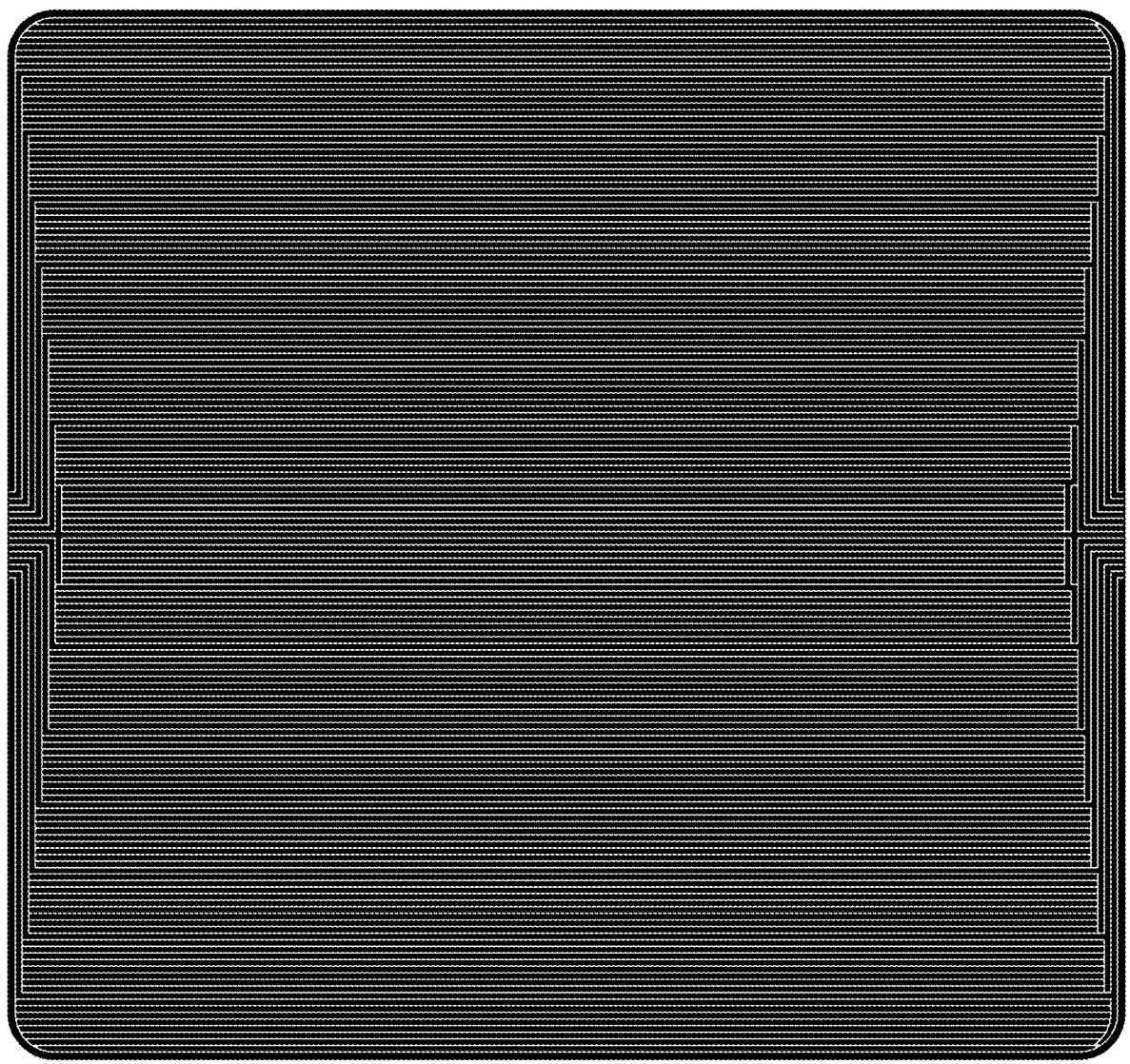
FIG. 35 depicts an example of a cathode flow field that features branching parallel channels.
Figure 36:
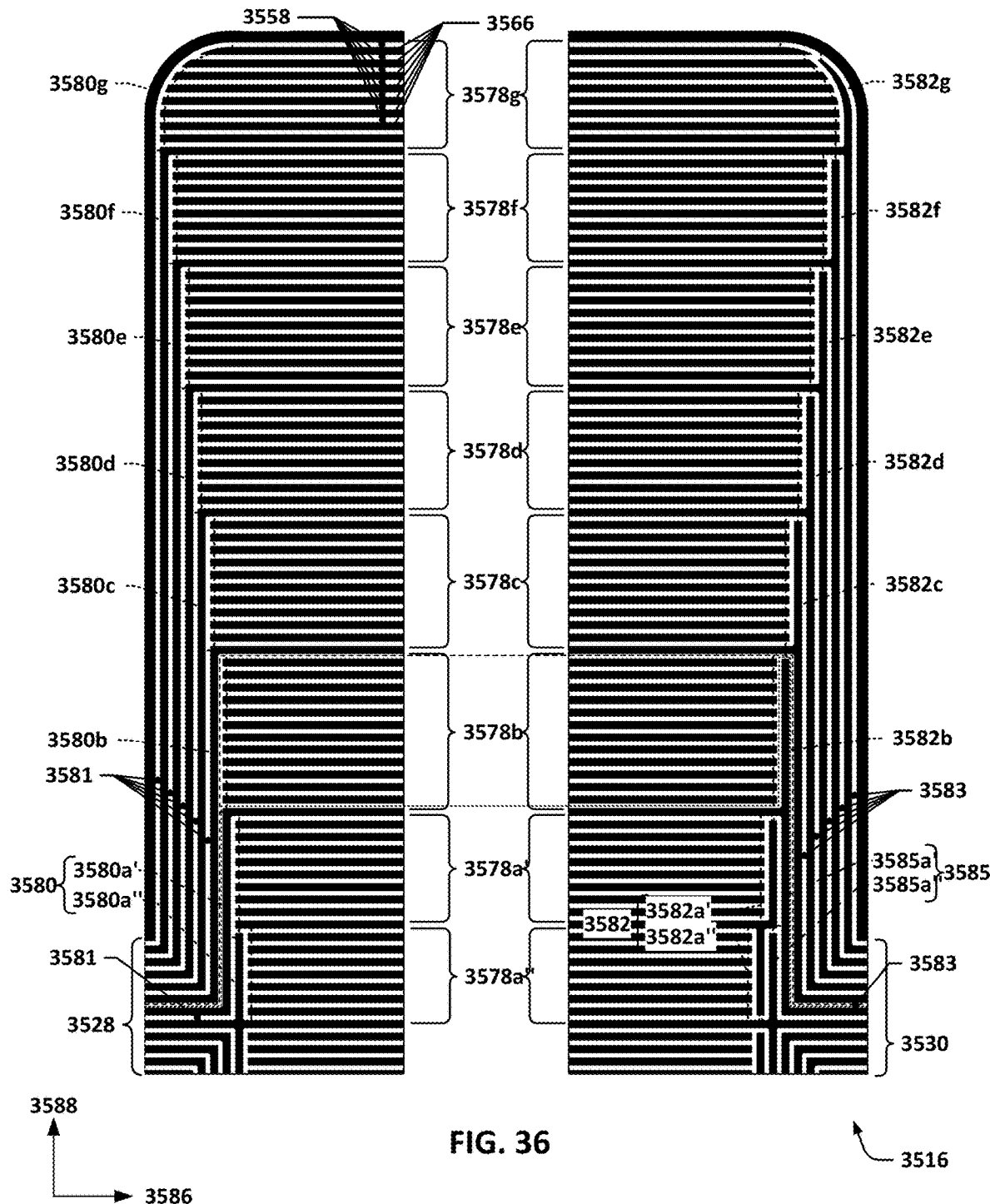
FIG. 36 depicts a detail view of the left and right sides of the upper half of the cathode flow field of FIG. 35, with the remainder of the flow field omitted from view.

FIG. 35 depicts an example of a cathode flow field that features branching parallel channels. FIG. 36 depicts a detail view of the left and right sides of the upper half of the cathode flow field of FIG. 35, with the remainder of the flow field omitted from view.

As can be seen in FIGS. 35 and 36, the cathode flow field 3516 features a plurality of clusters 3578a/b/c/d/e/f/g of parallel channels 3558. The cluster 3578a is actually formed of two sub-groups 3578a' and 3578a" of parallel channels 3558. The parallel channels 3558 in each cluster 3578 are each provided gas from one of the fluidic inlet ports 3528 by way of a corresponding inlet branch passage 3580a/b/c/d/e/f/g that is connected to one of the fluidic inlet ports 3528 by way of corresponding inlet passage 3581. The gas that is provided to each cluster of parallel channels 3558 then exits the corresponding cluster 3578a/b/c/d/e/f/g by way of the corresponding outlet branch passage 3580a/b/c/d/e/f/g that is connected to one of the fluidic outlet ports 3530 by way of a corresponding outlet passage 3583. The inlet branch passages 3580a outlet branch passages 3580a each have two sub-portions 3580a' and 3580a", each of which is associated with a different one of the sub-groups of parallel channels 3558 in the sub-groups 3578a' and 3578a", respectively, and the outlet branch passages 3582a similarly each have two sub-portions 3582a' and 3582a" (connected to outlet passage 3583 by corresponding outlet branch passage extensions 3585, e.g., 3585' and 3585"), each of which is associated with a different one of the sub-groups of parallel channels 3558 in the sub-groups 3578a' and 3578a", respectively. This arrangement is generally similar to that shown in FIG. 34 and exhibits similar uniformity behavior. Dimensional values of the various depicted features that are within the ranges indicated for the cathode flow field 3116 may, for example, provide gas flow with high uniformity and sufficient water ejection capability for use in $CO_x$ electrolyzers.

Interdigitated Channel Flow Fields

Figure 37:
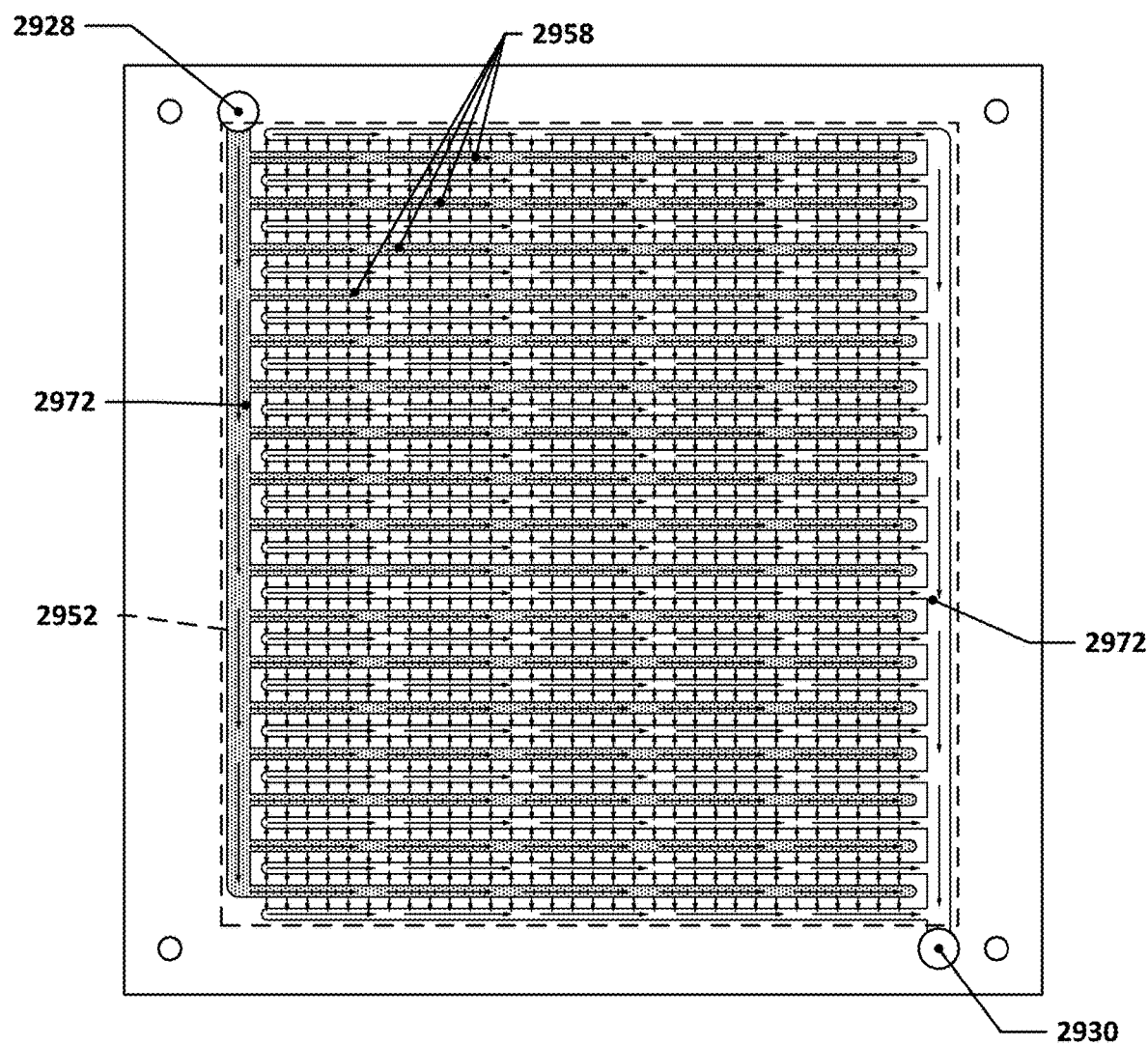
FIG. 37 depicts an example of a cathode flow field with an interdigitated channel arrangement.

Another type of channel arrangement that may be used in some cathode flow fields is an interdigitated channel arrangement. FIG. 37 depicts an example interdigitated channel cathode flow field. As can be seen, a cathode flow field 3716 is depicted that has a fluidic inlet port 3728 and a fluidic outlet port 3730. The fluidic inlet port 3728 and the fluidic outlet port 3730 may each be fluidically connected with a corresponding plenum passage 3772 or 3772', respectively. The plenum passages 3772 and 3772' may generally extend along directions that are parallel to one another and may have a plurality of channels 3758 or 3758' extending away from the corresponding plenum passage 3772 or 3772' and towards the other plenum passage 3772' or 3772, respectively (for more easy reference, the plenum passage 3772 and the channels 3758 are shaded differently than the plenum passage 3772' and the channels 3758'). Each pair of adjacent channels 3758 may have a channel 3758' interposed therebetween, and each pair of adjacent channels 3758' may have a channel 3758 interposed therebetween (thus providing two sets of interdigitated channels). In such an arrangement, each channel 3758 may be a dead-end channel that does not fluidically connect with the channels 3758' within the cathode flow field 3716. Similarly, each channel 3758' may also be a dead-end channel that does not fluidically connect with the channels 3758 within the cathode flow field 3716. However, $CO_x$ gas is still able to pass between the two sets of channels 3758 and 3758' during use by passing underneath the walls 3748 by migrating through the cathode GDL (not shown) that is compressed between the cathode flow field 3716 and the MEA of the $CO_x$ electrolyzer in which the cathode flow field 3716 is to be used. This under-wall flow of $CO_x$ gas is indicated in FIG. 37 through the use of short arrows that lead from the channels 3758 to the channels 3758'. Gas flow from the fluidic inlet port 3728 and through the channels 3758, as well as gas flow from the channels 3758' to the fluidic outlet port 3730 is also indicated using arrows.

Cathode flow fields with interdigitated channel arrangements may, similarly to parallel channel arrangements, offer more direct fluid flow paths than serpentine channel arrangements may provide for coverage areas that are similar to coverage area 3752, and the average distances that accumulated liquid water must be moved through in order to evacuate it from a channel in such arrangements are significantly shorter in an interdigitated channel than in a serpentine channel for a similarly sized $CO_x$ electrolyzer. While this is advantageous in that less energy is needed in order to evacuate liquid water from the channels, parallel channel arrangements will typically also include a larger number of potential alternate flow paths, e.g., tens or hundreds of flow paths, as compared with serpentine channel arrangements, which tend to include fewer numbers of flow paths, e.g., 2, 3, 4, or other relatively low numbers of flow paths. As discussed earlier, as the number of flow paths through a cathode flow field increases, it is increasingly likely that fluid flow that would normally flow through a blocked parallel channel will simply re-route itself and travel through one or more other unobstructed parallel channels within the cathode flow field rather than act to eject the liquid water that is obstructing fluid flow. By forcing gas flow under the walls 3748, interdigitated cathode flow fields may, in essence, force $CO_x$ gas to come into contact with portions of the cathode GDL and the MEA that are underneath the walls 3748, thereby ensuring that $CO_x$ gas reaches such regions—in parallel and serpentine channel arrangements, $CO_x$ gas may still come into contact with such portions of the MEA and the cathode GDL, but it is not necessarily forced to do so.

Interdigitated cathode flow fields $CO_x$ electrolyzers may have channels with various dimensional characteristics that may make them particularly well-suited to use in the $CO_x$ electrolyzer context, e.g., with respect to facilitating water removal from the cathode flow field.

By way of example, some interdigitated channel cathode flow fields may have interdigitated channels that have individual lengths on the order of between about 0.1 m and about 1.5 m, between about 0.1 m and about 0.8 m, between about 0.8 m and about 1.5 m, between about 0.1 m and about 0.45 m, between about 0.45 m and about 0.8 m, between about 0.8 m and about 1.15 m, between about 1.15 m and about 1.5 m, between about 0.1 m and about 0.275 m, between about 0.275 m and about 0.45 m, between about 0.45 m and about 0.625 m, between about 0.625 m and about 0.8 m, between about 0.8 m and about 0.975 m, between about 0.975 m and about 1.15 m, between about 1.15 m and about 1.32 m, or between about 1.32 m and about 1.5 m.

For example, such interdigitated channels may have widths that are between about 0.5 mm and about 2 mm, between about 0.5 mm and about 1.2 mm, between about 1.2 mm and about 2 mm, between about 0.5 mm and about 0.88 mm, between about 0.88 mm and about 1.2 mm, between about 1.2 mm and about 1.6 mm, between about 1.6 mm and about 2 mm, between about 0.5 mm and about 0.69 mm, between about 0.69 mm and about 0.88 mm, between about 0.88 mm and about 1.1 mm, between about 1.1 mm and about 1.2 mm, between about 1.2 mm and about 1.4 mm, between about 1.4 mm and about 1.6 mm, between about 1.6 mm and about 1.8 mm, or between about 1.8 mm and about 2 mm.

Such interdigitated channels may also have depths that are between about 0.3 mm and about 3 mm, between about 0.3 mm and about 1.6 mm, between about 1.6 mm and about 3 mm, between about 0.3 mm and about 0.98 mm, between about 0.98 mm and about 1.6 mm, between about 1.6 mm and about 2.3 mm, between about 2.3 mm and about 3 mm, between about 0.3 mm and about 0.64 mm, between about 0.64 mm and about 0.98 mm, between about 0.98 mm and about 1.3 mm, between about 1.3 mm and about 1.6 mm, between about 1.6 mm and about 2 mm, between about 2 mm and about 2.3 mm, between about 2.3 mm and about 2.7 mm, or between about 2.7 mm and about 3 mm.

Interdigitated channels with widths and depths such as those discussed above may result in each such interdigitated channel having an open surface area per channel of between about 150 $mm^2$ and about 3000 $mm^2$, between about 150 $mm^2$ and about 1600 $mm^2$, between about 1600 $mm^2$ and about 3000 $mm^2$, between about 150 $mm^2$ and about 860 $mm^2$, between about 860 $mm^2$ and about 1600 $mm^2$, between about 1600 $mm^2$ and about 2300 $mm^2$, between about 2300 $mm^2$ and about 3000 $mm^2$, between about 150 $mm^2$ and about 510 $mm^2$, between about 510 $mm^2$ and about 860 $mm^2$, between about 860 $mm^2$ and about 1200 $mm^2$, between about 1200 $mm^2$ and about 1600 $mm^2$, between about 1600 $mm^2$ and about 1900 $mm^2$, between about 1900 $mm^2$ and about 2300 $mm^2$, between about 2300 $mm^2$ and about 2600 $mm^2$, or between about 2600 $mm^2$ and about 3000 $mm^2$.

Such interdigitated channels may also have per-channel cross-sectional areas of between about 0.15 $mm^2$ and about 6 $mm^2$, between about 0.15 $mm^2$ and about 3.1 $mm^2$, between about 3.1 $mm^2$ and about 6 $mm^2$, between about 0.15 $mm^2$ and about 1.6 $mm^2$, between about 1.6 $mm^2$ and about 3.1 $mm^2$, between about 3.1 $mm^2$ and about 4.5 $mm^2$, between about 4.5 $mm^2$ and about 6 $mm^2$, between about 0.15 $mm^2$ and about 0.88 $mm^2$, between about 0.88 $mm^2$ and about 1.6 $mm^2$, between about 1.6 $mm^2$ and about 2.3 $mm^2$, between about 2.3 $mm^2$ and about 3.1 $mm^2$, between about 3.1 $mm^2$ and about 3.8 $mm^2$, between about 3.8 $mm^2$ and about 4.5 $mm^2$, between about 4.5 $mm^2$ and about 5.3 $mm^2$, or between about 5.3 $mm^2$ and about 6 $mm^2$ Such interdigitated channels may also have total channel volumes (per channel) of between about 100 μl and about 9000 μl, between about 100 μl and about 4600 μl, between about 4600 μl and about 9000 μl, between about 100 μl and about 2300 μl, between about 2300 μl and about 4600 μl, between about 4600 μl and about 6800 μl, between about 6800 μl and about 9000 μl, between about 100 μl and about 1200 μl, between about 1200 μl and about 2300 μl, between about 2300 μl and about 3400 μl, between about 3400 μl and about 4600 μl, between about 4600 μl and about 5700 μl, between about 5700 μl and about 6800 μl, between about 6800 μl and about 7900 μl, or between about 7900 μl and about 9000 μl.

In some such implementations, cathode flow fields with interdigitated channels may also have structural characteristics relating to the thickness of the walls that are interposed between adjacent interdigitated channels. For example, the wall thickness in between adjacent interdigitated channels (and thus the distance between surfaces of those channels that are closest to one another) may be selected to be between about 0.0002 and about 0.0067, between about 0.0002 and about 0.0034, between about 0.0034 and about 0.0067, between about 0.0002 and about 0.0018, between about 0.0018 and about 0.0034, between about 0.0034 and about 0.005, between about 0.005 and about 0.0067, between about 0.0002 and about 0.001, between about 0.001 and about 0.0018, between about 0.0018 and about 0.0026, between about 0.0026 and about 0.0034, between about 0.0034 and about 0.0042, between about 0.0042 and about 0.005, between about 0.005 and about 0.0059, between about 0.0059 and about 0.0067 times the average overall length of the two adjacent interdigitated channels.

In some such interdigitated channel implementations having dimensional characteristics like those discussed above, the wall thickness between adjacent channels may be, for example, between about 0.15 mm and 5 mm, between about 0.15 mm and about 2.6 mm, between about 2.6 mm and about 5 mm, between about 0.15 mm and about 1.4 mm, between about 1.4 mm and about 2.6 mm, between about 2.6 mm and about 3.8 mm, between about 3.8 mm and about 5 mm, between about 0.15 mm and about 0.76 mm, between about 0.76 mm and about 1.4 mm, between about 1.4 mm and about 2 mm, between about 2 mm and about 2.6 mm, between about 2.6 mm and about 3.2 mm, between about 3.2 mm and about 3.8 mm, between about 3.8 mm and about 4.4 mm, or between about 4.4 mm and about 5 mm.

In addition to the above characteristics, some implementations of the flow field channels discussed herein for use in cathode flow fields of $CO_x$ electrolyzers may also have certain relative dimensional constraints. For example, the ratio of the channel width to wall width of the walls in between each pair of adjacent channels or channel portions may be between about 0.08 and about 10, between about 0.08 and about 5, between about 5 and about 10, between about 0.08 and about 2.6, between about 2.6 and about 5, between about 5 and about 7.5, between about 7.5 and about 10, between about 0.08 and about 1.3, between about 1.3 and about 2.6, between about 2.6 and about 3.8, between about 3.8 and about 5, between about 5 and about 6.3, between about 6.3 and about 7.5, between about 7.5 and about 8.8, or between about 8.8 and about 10.

Similarly, the total open surface area for all channels in a flow field, or the channel if a single channel is used in the flow field, for some implementations may be between about 25% and about 80%, between about 25% and about 52%, between about 52% and about 80%, between about 25% and about 39%, between about 39% and about 52%, between about 52% and about 66%, between about 66% and about 80%, between about 25% and about 32%, between about 32% and about 39%, between about 39% and about 46%, between about 46% and about 52%, between about 52% and about 59%, between about 59% and about 66%, between about 66% and about 73%, or between about 73% and about 80%.

It will be noted that while the examples discussed herein and shown in the Figures have focused on generally square cell geometries, e.g., channels that extend across a square region, other implementations may feature non-square cell geometries, e.g., rectangular geometries.

It will also be noted that while the channels discussed thus far have generally had constant cross-sectional profiles (except perhaps at sharp corners, in which the profiles may grow and shrink when entering and exiting the corners), some implementations may feature channels that have variable widths and/or depths at various locations along their length. For example, in some implementations, a channel width and/or depth may be increased in a reduced flow speed region extending from the fluidic inlet port to a point in between the fluidic inlet port and the fluidic outlet port as compared with the channel width and/or depth in an increased flow speed region fluidically interposed in between the reduced flow speed region and the fluidic outlet port. The increased channel depth and/or width in the reduced flow speed region may act to expand the cross-sectional area of the channel(s) in the reduced flow speed region, thereby causing the gas flow velocity in the reduced flow speed region to decrease compared to what it is in the increased flow speed region. Similarly, the reduced channel depth and/or width in the increased flow speed region may act to reduce the cross-sectional area of the channel(s) in the increased flow speed region, thereby causing the gas flow velocity in the increased flow speed region to increase compared to what it is in the decreased flow speed region. The increased residence time of the gas in the decreased flow speed region that results from such lower flow speed may provide additional time for water that is present in the cathode GDL to evaporate and/or diffuse into the gas flowing through the channel(s) in the decreased flow speed region, thereby humidifying the gas before it flows downstream into the increased flow speed region. Such implementations may assist with reducing the likelihood that portions of the cathode GDL may dry out, thereby potentially compromising the performance of the GDL.

Pressure Considerations

More generally, cathode flow fields for $CO_x$ electrolyzers may benefit, e.g., in terms of providing a sufficiently high enough pressure drop that the liquid water that accumulates in the cathode flow fields at an increased rate in $CO_x$ reduction as compared with, for example, fuel cell operation, is able to be reliably ejected from the cathode flow fields by the pressure drop, from being designed to have physical structures that result in certain physical characteristics of the cathode field. For example, the cathode channels for a $CO_x$ electrolyzer cathode flow field may have channel dimensions, e.g., length, width, and depth, that, under the typical operating conditions of the $CO_x$ electrolyzer, result in a pressure drop between the fluidic inlet port(s) and fluidic outlet port(s) of the cathode flow field that is between about 0.001 psi and about 4 psi, between about 0.001 psi and about 2 psi, between about 2 psi and about 4 psi, between about 0.001 psi and about 1 psi, between about 1 psi and about 2 psi, between about 2 psi and about 3 psi, between about 3 psi and about 4 psi, between about 0.001 psi and about 0.5 psi, between about 0.5 psi and about 1 psi, between about 1 psi and about 1.5 psi, between about 1.5 psi and about 2 psi, between about 2 psi and about 2.5 psi, between about 2.5 psi and about 3 psi, between about 3 psi and about 3.5 psi, between about 3.5 psi and about 4 psi, between about 0.001 psi and about 0.25 psi, between about 0.25 psi and about 0.5 psi, between about 0.5 psi and about 0.75 psi, between about 0.75 psi and about 1 psi, between about 1 psi and about 1.3 psi, between about 1.3 psi and about 1.5 psi, between about 1.5 psi and about 1.8 psi, between about 1.8 psi and about 2 psi, between about 2 psi and about 2.3 psi, between about 2.3 psi and about 2.5 psi, between about 2.5 psi and about 2.8 psi, between about 2.8 psi and about 3 psi, between about 3 psi and about 3.3 psi, between about 3.3 psi and about 3.5 psi, between about 3.5 psi and about 3.8 psi, between about 3.8 psi and about 4 psi, between about 0.001 psi and about 0.13 psi, between about 0.13 psi and about 0.25 psi, between about 0.25 psi and about 0.38 psi, between about 0.38 psi and about 0.5 psi, between about 0.5 psi and about 0.63 psi, between about 0.63 psi and about 0.75 psi, between about 0.75 psi and about 0.88 psi, between about 0.88 psi and about 1 psi, between about 1 psi and about 1.1 psi, between about 1.1 psi and about 1.3 psi, between about 1.3 psi and about 1.4 psi, between about 1.4 psi and about 1.5 psi, between about 1.5 psi and about 1.6 psi, between about 1.6 psi and about 1.8 psi, between about 1.8 psi and about 1.9 psi, between about 1.9 psi and about 2 psi, between about 2 psi and about 2.1 psi, between about 2.1 psi and about 2.3 psi, between about 2.3 psi and about 2.4 psi, between about 2.4 psi and about 2.5 psi, between about 2.5 psi and about 2.6 psi, between about 2.6 psi and about 2.8 psi, between about 2.8 psi and about 2.9 psi, between about 2.9 psi and about 3 psi, between about 3 psi and about 3.1 psi, between about 3.1 psi and about 3.3 psi, between about 3.3 psi and about 3.4 psi, between about 3.4 psi and about 3.5 psi, between about 3.5 psi and about 3.6 psi, between about 3.6 psi and about 3.8 psi, between about 3.8 psi and about 3.9 psi, or between about 3.9 psi and about 4 psi. In some other implementations, such channels for $CO_x$ electrolyzers may have dimensions and operational conditions, e.g., fluidic inlet port pressures, that are selected so as to produce, during normal operational flow conditions for a $CO_x$ electrolyzer, a pressure drop of between about 4 psi and about 50 psi, between about 4 psi and about 27 psi, between about 27 psi and about 50 psi, between about 4 psi and about 16 psi, between about 16 psi and about 27 psi, between about 27 psi and about 38 psi, between about 38 psi and about 50 psi, between about 4 psi and about 9.8 psi, between about 9.8 psi and about 16 psi, between about 16 psi and about 21 psi, between about 21 psi and about 27 psi, between about 27 psi and about 33 psi, between about 33 psi and about 38 psi, between about 38 psi and about 44 psi, between about 44 psi and about 50 psi, between about 4 psi and about 6.9 psi, between about 6.9 psi and about 9.8 psi, between about 9.8 psi and about 13 psi, between about 13 psi and about 16 psi, between about 16 psi and about 18 psi, between about 18 psi and about 21 psi, between about 21 psi and about 24 psi, between about 24 psi and about 27 psi, between about 27 psi and about 30 psi, between about 30 psi and about 33 psi, between about 33 psi and about 36 psi, between about 36 psi and about 38 psi, between about 38 psi and about 41 psi, between about 41 psi and about 44 psi, between about 44 psi and about 47 psi, or between about 47 psi and about 50 psi. It will be understood that the pressure drop may exceed the above ranges under certain circumstances, e.g., if the exit stream from the fluidic outlet port(s) goes to an inlet port of another electrolyzer cell, if water accumulates within a channel and obstructs flow through the channel, if the cathode GDL bulges up into the flow field channels when compressed, etc. Pressure drops lower than 0.5 psi may also work but may also increase the risk of the $CO_x$ gas flows through the cathode flow field simply re-routing in instances where liquid water blocks a particular cathode channel (assuming multiple cathode channels are present) rather than acting to eject the liquid water from the blocked channel. Pressure drops higher than one or more of the ranges listed above may also work, but may not provide any additional performance benefit, i.e., may simply result in excess energy consumption by the $CO_x$ electrolyzer while providing gas distribution uniformity and water ejection capability that may be provided by lower pressure drops as well. Such pressure drops are, it is to be understood, to be evaluated in the context of typical operating conditions of a $CO_x$ electrolyzer, e.g., with a $CO_x$ gas pressure in the 50 or 75 to 400 psig range and a gas flow velocity of 0.019 to 30 m/s within at least some portions of the channels. For example, cathode flow fields such as those discussed above, or ones similar thereto, may be used in a $CO_x$ electrolyzer cell in which $CO_x$ containing gas is flowed into the fluidic inlet ports of the cathode flow fields at a flow rate of between 2 to 21 sccm per square centimeter of active cathode flow field area, inlet pressures of between 50 and 400 psi, and temperatures of between 30° C. and 80° C. Under such conditions, such cathode flow fields may develop a pressure drop between the fluidic inlet ports and the fluidic outlet ports thereof that is sufficient to reliably eject any liquid water that may accumulate within the cathode serpentine channels while still providing sufficiently uniform gas flow across the cathode flow field, e.g., such as the pressure drops discussed herein.

Figure 38:
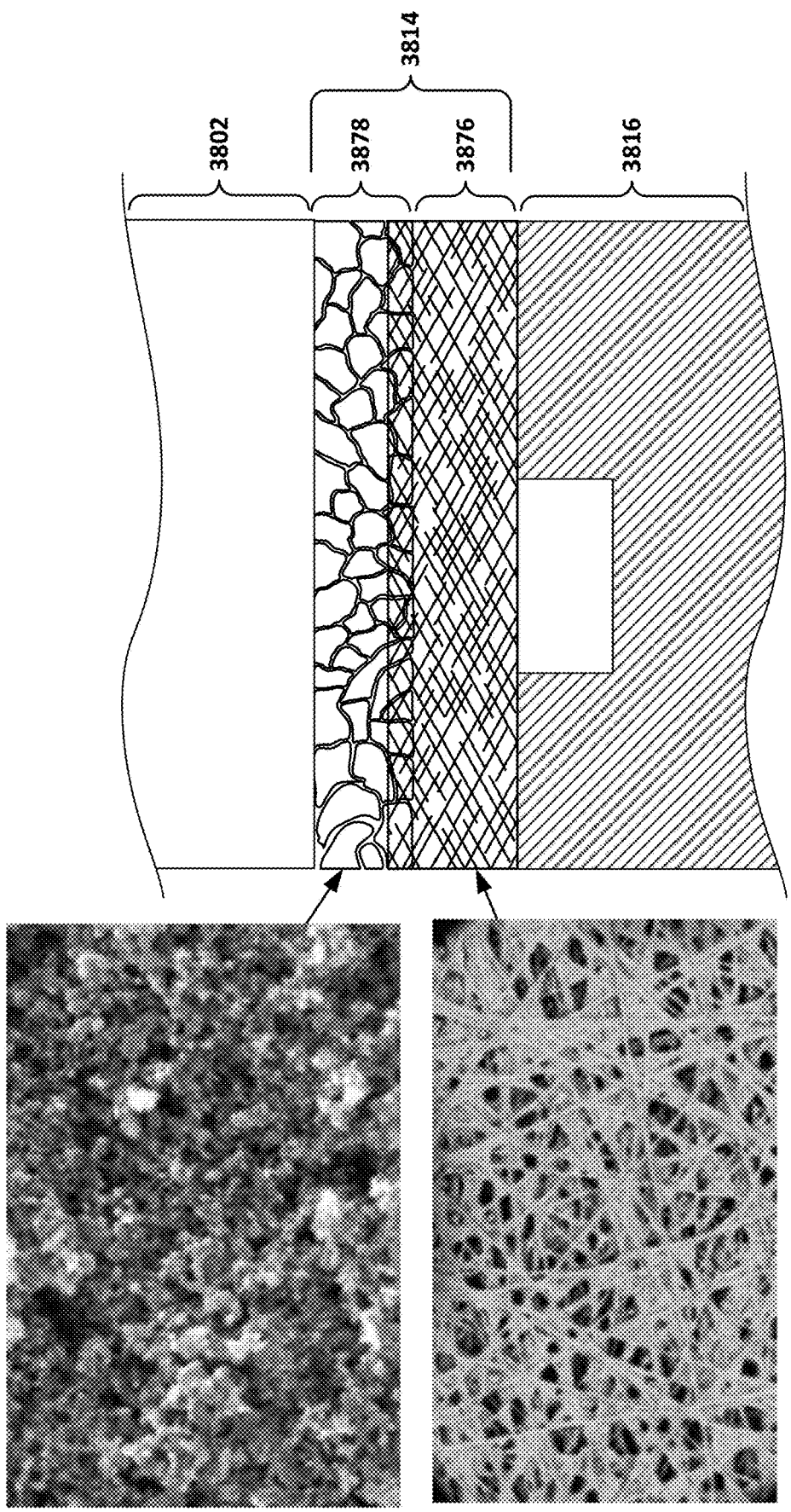
FIG. 38 depicts a side view of a gas diffusion layer.

GDL Design $CO_x$ electrolyzers may also benefit from use of cathode GDLs having particular characteristics and features that may assist with the transport of species between the MEA and flow field, including $CO_x$, bicarbonate/carbonate salts, water, and generated products. As noted earlier, a cathode GDL suitable for use in a $CO_x$ electrolyzer may include, for example, a fibrous substrate that provides structural support, e.g., to the catalyst layer in the MEA 502. In some implementations, the cathode GDL may include a fibrous substrate, e.g., backing paper, cloth, or felt, that is made of an electrically conductive material, e.g., carbon fiber, which provides structural support to a microporous layer (MPL). The fibrous substrate may, for example, be woven (cloth) or non-woven (paper or felt). The MPL may be a porous carbon layer that ensures intimate contact between the cathode GDL and the adjacent MEA (the MPL may be on a side of the cathode GDL that faces and contacts the MEA). Example MPL materials may include polymer-integrated or polymer-supported granular carbon layers, e.g., fluoropolymer-integrated or fluoropolymer-supported carbon particle layers FIG. 38 depicts a partial cross-section view of an example cathode GDL and portions of an MEA and cathode flow field. The MEA 3802 is shown without any internal or structural details, and the portion of the cathode flow field 3816 that is shown includes a representative channel cross-section. Sandwiched in between the cathode flow field 3816 and the MEA 3802 is the cathode GDL 3814, which includes a fibrous layer 3876 and a microporous layer 3878. The photographs at left are magnified views of representative examples of the fibrous layer 3876 and the microporous layer 3878.

During $CO_x$ electrolyzer operation, liquid water that is transported through the MEA from the anode side of the electrolyzer cell to the cathode side of the cell, as well as liquid water that is generated in the cathode side during $CO_x$ reduction, may pass through the cathode GDL and into the cathode flow field channels. The cathode GDL may be selected to have particular properties in order to facilitate and encourage such liquid water ejection from the cathode GDL. For example, the cathode GDL may have polytetrafluoroethylene (PTFE) or other hydrophobic component added to both the MPL and the fibrous substrate to make the MPL and the fibrous substrate more hydrophobic, which may promote liquid water ejection from the cathode GDL and prevent water in the flow field from diffusing back to the cathode layer.

The discussion below relates to GDLs used for the cathode GDL in a $CO_x$ electrolyzer, and, in some cases other electrolysis systems. In various of the embodiments described below the GDL includes one or more carbon components such as fibrous carbon, carbon powders at submicron scale, acetylene black, fullerene, Ketjen Black, polyacrylonitrile, and/or porous carbon. In certain embodiments, the carbon in a GDL has a density of about 75-1300 $m^2/g$.

As discussed above, GDLs may include a fibrous layer, also referred to as a backing layer, and a microporous layer (MPL). In some embodiments, the microporous layer may overlap with or extend into the backing layer to at least some extent. In some embodiments, the microporous layer and the backing layer are affixed to one another such they resist delamination during handling, fabrication of an electrode, and/or electrolysis. In some $CO_x$ electrolyzers, the cathode GDL is arranged such that the MPL is in contact with or proximate to the MEA while the other side of the GDL is in contact with the cathode flow field.

There are commercial GDLs available that omit an MPL, but testing showed that in some $CO_x$ electrolyzers, such GDLs yielded poor performance. For example, in a test that was conducted using two similar GDLs, with one GDL having an MPL and the other not, the Faradaic yield of carbon monoxide (FY_CO) in the $CO_x$ electrolyzer dropped from ~90-100% to <75% in four hours and <25% at around 9 hours when using the GDL without the MPL, whereas the $CO_x$ electrolyzer using the GDL with the MPL produced ~90%+FY_CO for 16 hours straight. At the same time, the electrolyzer cell voltage remained steady in the $CO_x$ cell when using the GDL with the MPL over 16 hours, while the voltage climbed steadily in the $CO_x$ electrolyzer when using the GDL without the MPL over same duration.

The GDL in a $CO_x$ electrolyzer, in combination with the cathode flow field, plays a significant role in the removal of water from the $CO_x$ electrolyzer cathode. GDLs that are selected or constructed so as to have particular characteristics may enhance the water ejection rates and/or capabilities of a $CO_x$ electrolyzer. As noted earlier, the ability of the MEA in a $CO_x$ electrolyzer to react $CO_x$ is hampered by the presence of liquid water, which is present in significant amounts during normal operation. If not adequately removed from the cathode, water degrades $CO_x$ electrolyzer performance by influencing the mass transport of gaseous species and facilitating the production of side products such as H2 through the electrolysis of water.

GDLs are often designed for use in fuel cells, flow batteries, and/or water electrolyzers. While such GDLs are not optimized for use in $CO_x$ electrolyzers they can nonetheless sometimes be used in such contexts. The present inventors identified certain characteristics of GDLs that may be selected so as to provide a GDL that offers particularly effective performance in the $CO_x$ electrolyzer context. The performance of different GDLs in the $CO_x$ electrolyzer context often differs significantly from the performance of those same GDLs in other contexts, e.g., in fuel cells, flow batteries, and/or water electrolyzers. What works well in those other contexts may not work well in the $CO_x$ context, and vice-versa.

For example, in the fuel cell context, it is preferable to avoid the use of thick GDLs. Fuel cells, due to the conditions under which they operate, experience reduced diffusion of reactants through the GDL to the catalyst surface with increasing thickness of the GDL. As such, many GDLs that are commercially available are in the ~300 μm, e.g., 315 μm, or less thickness range, with some suppliers possibly offering GDLs up to ~400 μm, e.g., 410 μm. Higher-thickness GDLs are generally perceived to negatively impact the performance of fuel cells and manufacturers thus generally avoid making GDLs that are thicker than 300 μm, or at most 400 μm. It will be understood that references below to specific thicknesses or thickness ranges of cathode GDLs, unless indicated otherwise, refer to the uncompressed thicknesses of such GDLs. For commercially available GDLs, the uncompressed thicknesses thereof are the typical thickness parameters used to specify such GDLs.

In contrast, $CO_x$ electrolyzers employing thicker GDLs may not suffer from such performance degradation. $CO_x$ electrolyzers tend to operate at higher pressures and lower temperatures than fuel cells and, as such, may increase the production and/or retention of liquid water generation within the $CO_x$ electrolyzer cathode. However, somewhat unexpectedly, it was found that higher-thickness GDLs actually offer enhanced performance in the context of $CO_x$ electrolyzers.

For example, the present inventors tested and modeled the performance of several different types of GDLs in the context of $CO_x$ electrolyzers and found that increasing the thickness of the GDL, e.g., to thicknesses thicker than those typically used in fuel cell GDLs, directly impacted the performance of $CO_x$ electrolyzers in a significant and beneficial way.

For example, when the thickness of a GDL was tripled from 252 μm to 756 μm (the GDL thickness in the model was representative of the compressed thickness of the GDLs, i.e., the thickness of the GDLs when preloaded/clamped within an electrolyzer stack) in the model and all other inputs were held constant (there were at least 11 parameters that could be changed or adjusted within the model), it was found that the model predicted a 12% increase in water vapor flux through the GDL and out the flow field. Water vapor can easily be evacuated from the $CO_x$ electrolyzer as part of the gaseous exhaust stream. While not wishing to be bound by theory, the increased water vapor flux was tied to the temperature gradient that the model indicated across the GDL. For example, the temperature at the interface between the cathode flow field and the GDL was 44° C. for both GDLs, but the temperature at the GDL/catalyst interface was 46.5° C. for the thinner GDL and 51.5° for the thicker GDL. The increased temperature differential may increase the water vapor flux.

Testing also showed that thicker GDLs, e.g., 350 μm or thicker (uncompressed and inclusive of MPL and backing layer) yielded more repeatable and higher performance than thinner, e.g., 200 μm (inclusive of MPL and backing layer) GDLs. For example, the Faradaic yield in a test $CO_x$ electrolyzer remained at 95%+ for three 45-hour performance runs for the thicker (350+μm) GDL combinations while the thinner GDL (200 μm) saw an immediate reduction in performance from the beginning of the test, e.g., dropping below 90% within ~6 hours and below 85% within ~13 hours (and never recovering above 85% for the remainder of the test). All GDLs from this set of data had 25% by weight PTFE content in the backing layer and MPL. The thicker GDLs used in the tests included GDLs having uncompressed thicknesses in the 350 to 550 μm range, 950 to 1250 μm range, and 1350 to 1750 μm range (such GDLs were composed of multiple discrete GDLs that were arranged in a stacked configuration in order to obtain the desired thicknesses, as commercially available GDLs in such thicknesses were not available-presumably due to their detrimental performance in the context of fuel cells).

Testing also showed that thicker GDLs, e.g., 600 μm or thicker (uncompressed and inclusive of MPL and backing layer) yielded more repeatable and higher performance than thinner, e.g., 315 μm (inclusive of MPL and backing layer) GDLs. For example, the FY_CO in a test $CO_x$ electrolyzer remained at 95%+ for two 28-hour performance runs for the thicker (600 μm) GDL while the thinner GDL (315 μm) saw comparable performance over a 15-hour period but then saw a significant and immediately apparent decrease in FY_CO performance when a second performance run was performed-dropping to 95% within ~6 hours, 90% within 11 hours, and ~85% within 21 hours. Both GDLs had 5% by weight PTFE content in the backing layer.

In this example, the thicker GDL was assembled by stacking two thinner, commercially available GDLs—one with an MPL and one without—so as to create a thicker GDL having MPL on one side (the side facing the MEA) and an expanse of backing layer on the other side (facing the cathode flow field). The backing layer portion of the stacked GDL had 5% by weight PTFE treatment throughout. The resulting 600 μm GDL was, to the inventors' knowledge and due to its thickness, a new type of GDL that was not previously available. The inventors created their own thick GDLs. The experiment revealed that such thicker GDLs, somewhat surprisingly, not only functioned when used in $CO_x$ electrolyzers, but also offered significant and unexpected performance benefits.

The increased thickness of the GDL, e.g., 400 μm or more uncompressed, results in a longer heat conduction path through the GDL, which may, in turn, lead to a higher temperature differential across the GDL due to heat generated in the MEA that travels through the GDL and into the cathode flow field. This increased temperature differential causes more heat to be transferred into liquid water that may be present within the GDL and causes an increased fraction of such liquid water to transition to (or remain in) the vapor phase, thereby facilitating its removal from the GDL and improving the Faradaic yield performance of the $CO_x$ electrolyzer.

A further test was performed with the 600 μm stacked GDL and another stacked GDL similar in construction to the 600 μm GDL but 880 μm thick (both uncompressed). In this further test, both GDLs were used in $CO_x$ electrolyzers for periods of nearly 70 consecutive hours. While both GDLs experienced performance drops of FY_CO over that timeframe, the thicker (880 μm thick) GDL dropped from ~97% to 90% FY_CO within ~20 hours compared to the ~45 hours that it took the somewhat thinner (but still comparatively thick) GDL to reach the same FY_CO. However, the 880 μm thick GDL then stabilized and consistently operated at between ~88% and ~90% FY_CO for 50+ hours, while the 600 μm thick GDL's FY_CO performance never stabilized and, in fact, exhibited gradually accelerating degradation as time progressed. By 60 hours, the FY_CO of the 600 μm thick GDL had dropped below 88%, and by 68 hours it had dropped below 86%. Thus, 880 μm thick provided lower, although much more consistent, performance over the 70-hour test period as compared to the somewhat thinner 600 μm GDL, which offered increasingly lower FY_CO performance over time.

In accordance with various embodiments, a GDL on the cathode side of a $CO_x$ electrolyzer has an uncompressed thickness of at least about 300 μm, or at least about 400 μm, or at least about 500 μm. In some embodiments, a GDL on the cathode side of a $CO_x$ electrolyzer has a thickness of about 200 μm to 1000 μm, about 300 μm to 1000 μm, about 400 am to 1000 μm, about 500 μm to 1000 μm, about 600 μm to 1000 μm, about 200 μm to 1600 μm, about 300 μm to 1600 μm, about 400 μm to 1600 μm, about 500 μm to 1600 μm, about 600 μm to 1600 μm, about 200 μm to 2000 μm, about 300 μm to 2000 μm, about 400 μm to 2000 μm, about 500 μm to 2000 μm, about 600 μm to 2000 μm, about 200 μm to 3000 μm, about 300 μm to 3000 μm, about 400 μm to 3000 μm, about 500 μm to 3000 μm, or about 600 am to 3000 μm. In some alternative implementations, a GDL on the cathode side of a $CO_x$ electrolyzer may have an uncompressed thickness of about 350 to about 3000 μm, about 350 am to about 1680 μm, about 1680 μm to about 3000 μm, about 350 μm to about 1010 μm, about 1010 μm to about 1680 μm, about 1680 μm to about 2340 μm, about 2340 μm to about 3000 μm, about 350 μm to about 681 μm, about 681 μm to about 1010 μm, about 1010 μm to about 1340 μm, about 1340 μm to about 1680 μm, about 1680 μm to about 2010 μm, about 2010 μm to about 2340 μm, about 2340 μm to about 2670 μm, or about 2670 μm to about 3000 μm. In some further alternative implementations, a GDL on the cathode side of a $CO_x$ electrolyzer may have an uncompressed thickness of about 400 to about 3000 μm, about 400 μm to about 1700 μm, about 1700 μm to about 3000 μm, about 400 μm to about 1050 μm, about 1050 μm to about 1700 μm, about 1700 μm to about 2350 μm, about 2350 μm to about 3000 μm, about 400 μm to about 725 μm, about 725 μm to about 1050 μm, about 1050 μm to about 1380 μm, about 1380 μm to about 1700 μm, about 1700 μm to about 2020 μm, about 2020 μm to about 2350 μm, about 2350 μm to about 2680 μm, or about 2680 μm to about 3000 μm. In some further alternative implementations, a GDL on the cathode side of a $CO_x$ electrolyzer may have a thickness of about 450 to about 3000 μm, about 450 μm to about 1720 μm, about 1720 μm to about 3000 μm, about 450 μm to about 1090 μm, about 1090 μm to about 1720 μm, about 1720 μm to about 2360 μm, about 2360 μm to about 3000 μm, about 450 μm to about 769 μm, about 769 μm to about 1090 μm, about 1090 μm to about 1410 μm, about 1410 μm to about 1720 μm, about 1720 μm to about 2040 μm, about 2040 μm to about 2360 μm, about 2360 μm to about 2680 μm, or about 2680 μm to about 3000 μm. In some implementations, GDLs having thicknesses as presented here include one or more MPLs and one or more backing layers.

Formation and Pre-compression of GDL Stacks

Although the benefits of thicker GDLs are apparent, the use of multiple discrete GDLs arranged in a stacked configuration to produce such thicker GDLs presents challenges with consistently assembling and testing cells, whether in a single-cell structure or a multi-cell or cell stack configuration. For instance, due, at least in part, to the intentionally heterogenous nature of both the MPL layer and the fibrous substrate to ensure adequate porosity and permeability, commercially available GDLs typically exhibit thickness variations, which may range between about 0.0017 cm and about 0.04 cm with a porosity between about 70% and about 80% by volume. Such variance may be compounded when multiple discrete GDLs are stacked to form thicker GDLs. Not only do such thickness variations create obstacles in forming accurate stochastic microstructure models to computationally determine the efficacy of one GDL configuration over another, but the variations also thwart attempts to obtain consistent test results between similarly configured prototypes.

Moreover, the variability in thickness in commercially available GDLs can lead to undesirable dimensional changes when a stack of multiple discrete GDLs is compressed during cell assembly. For example, although an amount of dimensional change is to be expected when a porous or otherwise pliable medium is compressed, the variability in thickness of a GDL (or a stack of GDLs) can not only lead to eccentric axial loading, and thereby, uneven compression, but also lead to differences in localized breakage and displacement of fibers that exacerbate the issues discussed above. In addition, the eccentric axial loading and/or differences in localized breakage and displacement of fibers can lead to translational and/or rotational displacement of one or more GDLs relative to the active area of a cell during assembly. This can cause misalignments with or impingement of an adjacent flow field, adverse interaction with a gasket (e.g., reduction in fluidic seal), etc., that can degrade performance of a $CO_x$ electrolyzer cell. In the context of multi-cell stacks (such as described in association with FIG. 6), unevenly compressed GDLs may cause compounding thickness inconsistencies that may result in assembly lean or flop, as well as the potential for over-compression to reduce such adverse conditions. It is also recognized that cell assembly may be accomplished more quickly and consistently when one thicker, pre-compressed GDL is utilized versus multiple discrete, uncompressed GDLs.

Figure 40:
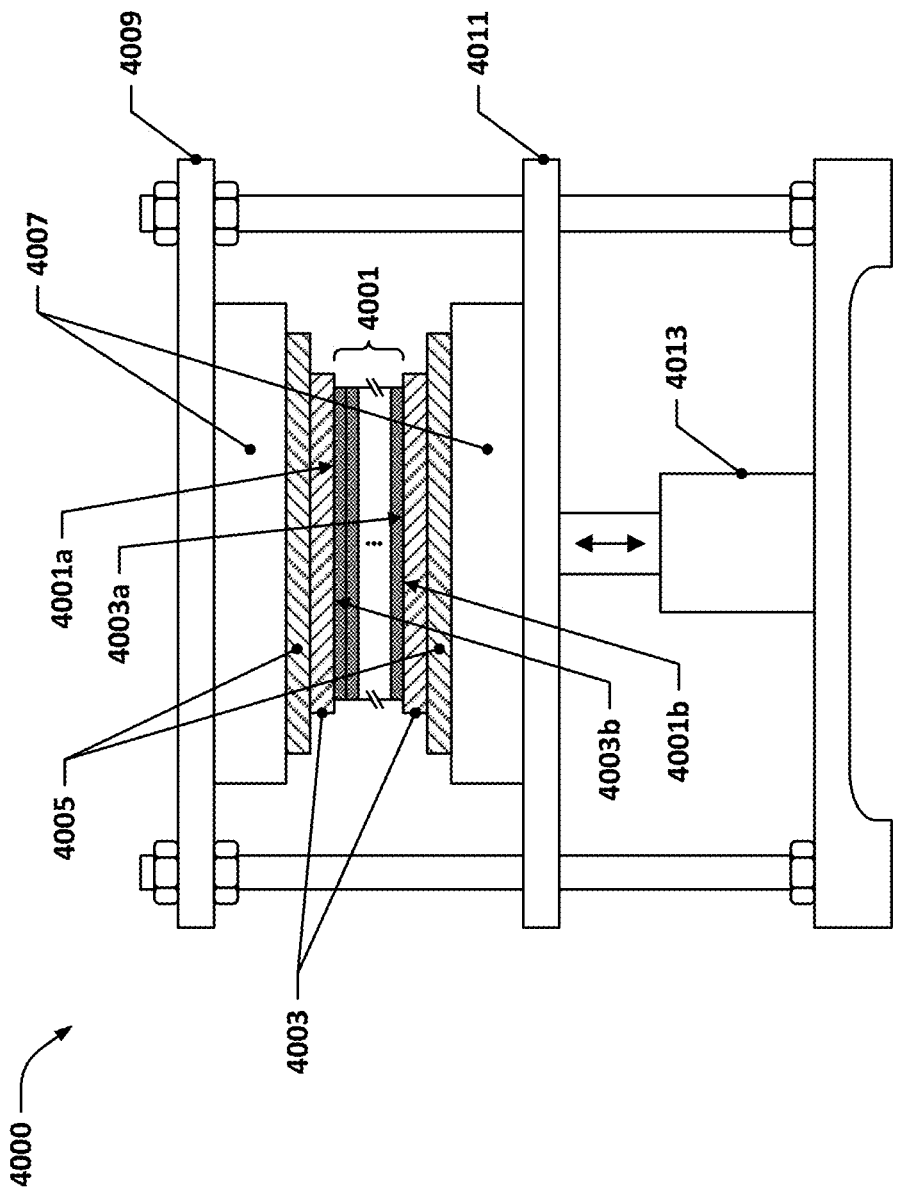
FIG. 40 depicts a partial cross-sectional view of an example apparatus to form a pre-compressed stack of gas diffusion layers.
Figure 41:
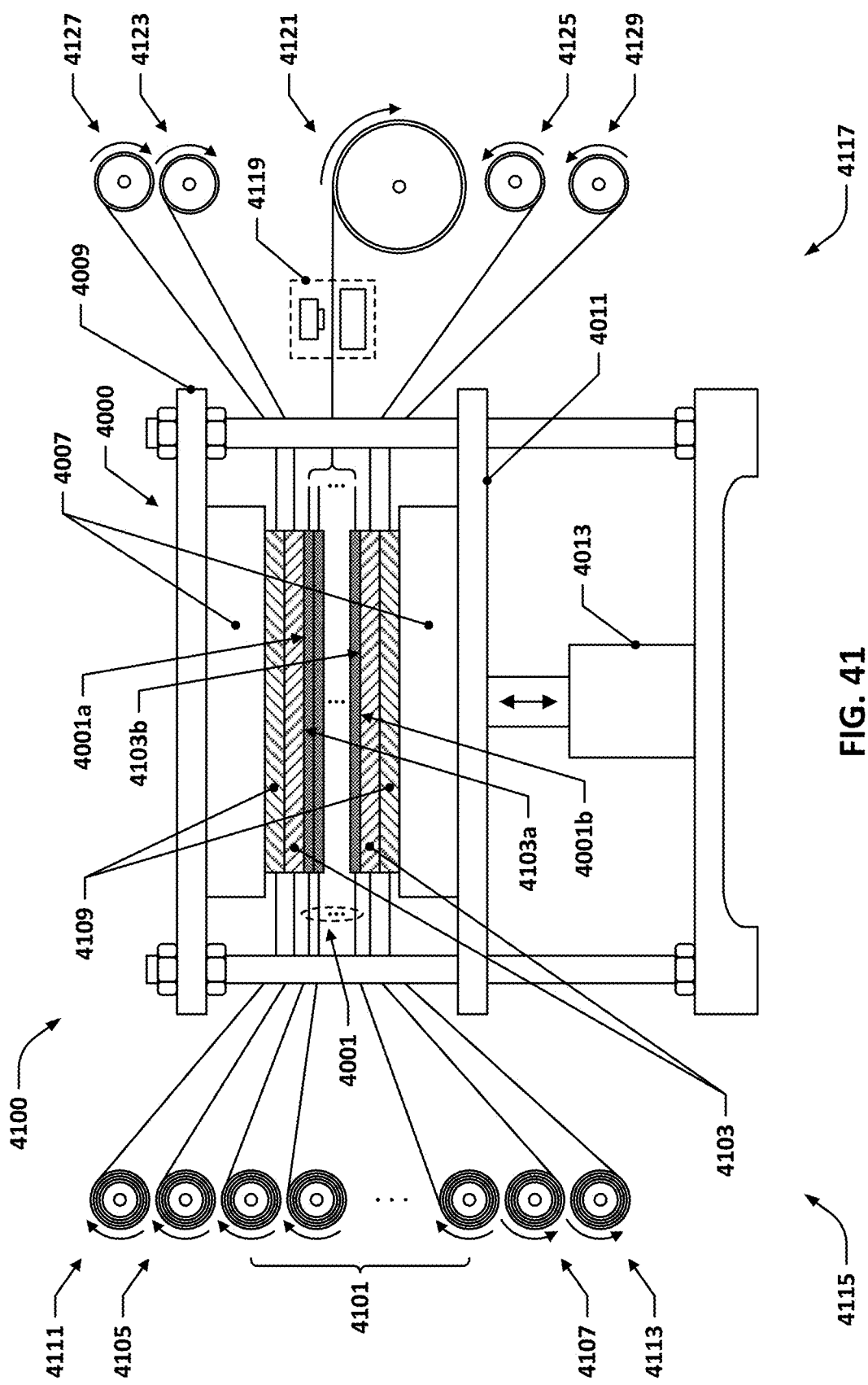
FIG. 41 depicts a partial cross-sectional view of an example roll-to-roll system to form a pre-compressed stack of gas diffusion layers.

In accordance with various embodiments, one or more compression operations may be performed on a stack of multiple discrete GDLs to adhere and pre-compress the GDLs before inclusion within a cell assembly. Adherence of the GDLs to one another prior to cell compression may mitigate the potential for translational and/or rotational displacement of one or more of the GDLs relative to another GDL or other GDLs in the stack. To that end, thickness variations can be reduced, and less dimensional change may occur as a cell is fully compressed as part of a stack assembly. In some implementations, compression operation(s) may be performed at ambient temperature. Testing, however, has demonstrated that about 3, such as 2 to 6, e.g., 4 to 5, cycles of about 3 minutes to about 7 minutes, e.g., about 4 minutes to about 6 minutes, such as about 5 minutes, of compression typically yields a sufficient level of GDL adhesion, stack pre-compression, and thickness uniformity to address issues such as the above-noted issues. In some embodiments, one or more hot press operations may be utilized to reflow (or at least soften), if present, the polyacrylonitrile, PTFE, and/or other hydrophobic (or hydrophilic) component(s) of the MPL and/or the fibrous substrate to enable more rapid pre-compression and adherence of the GDLs to one another. It is also contemplated that, if multiple compression cycles are performed, the stack of multiple discrete GDLs may be rotated between cycles to reduce the effects of non-parallelism between pressing platens and non-uniformity of heat application. In some cases, the application of a heated load to the stack of GDLs may be accomplished under similar conditions (e.g., orientation, pressure, temperature, etc.) as would exist when a cell is assembled or operated apart from the presence of other cell components. One or more example processes to form a pre-compressed stack of GDLs will be described in association with FIGS. 39, 40, and 41.

Figure 39:
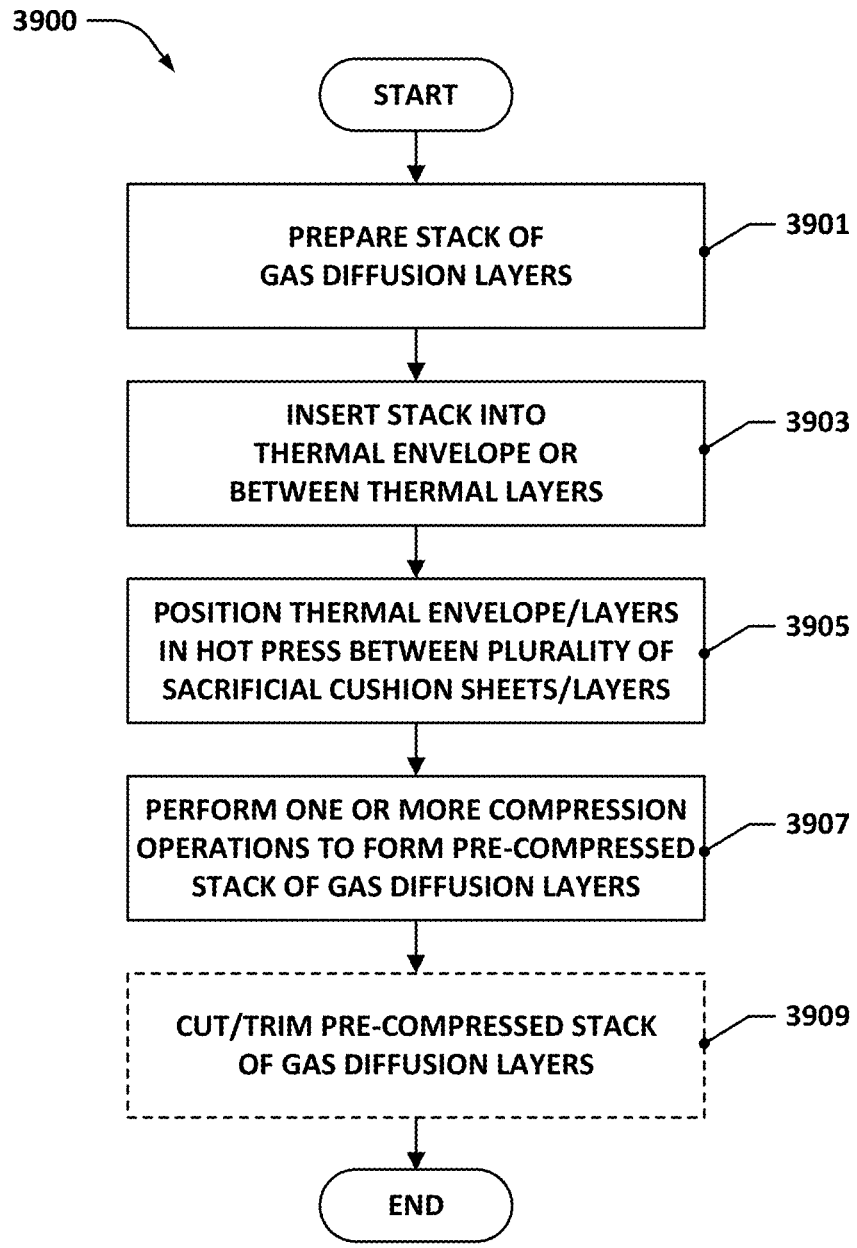
FIG. 39 depicts a flowchart of an example process to form a pre-compressed stack of gas diffusion layers.

FIG. 39 depicts a flowchart of an example process to form a pre-compressed stack of GDLs. Process 3900 of FIG. 39 will be described in association with FIGS. 40 and 41, which depict partial cross-sectional views of an example apparatus (e.g., apparatus 4000) and example system (e.g., roll-to-roll (R2R) system 4100) to form a pre-compressed stack of GDLs.

At step 3901, a stack of GDLs is prepared, such as stack 4001. For example, multiple discrete GDLs may be cut (e.g., die cut, laser cut, etc.) from a commercially available GDL source (such as a roll, sheet, etc.), and layered on one another in an orientation that would otherwise exist when the GDLs are assembled as part of a cell. For example, if the GDLs in question are directional, they may be stacked such that each GDL has a directionality that is orthogonal to the directionality of the GDL(s) immediately adjacent thereto. It is also contemplated that one or more discrete GDLs may be prepared as part of a stack with at least one pre-compressed GDL stack, or multiple pre-compressed GDL stacks may be utilized to prepare a thicker GDL stack. For descriptive convenience, it will be assumed that multiple discrete GDLs are prepared into stack 4001. In some embodiments, stack 4001 may be prepared from a plurality of input GDL rolls, such as input GDL rolls 4101, of R2R system 4100. This may not only increase manufacturing output but may also increase throughput via reductions in processing time. Depending on the type of commercially available GDL utilized and a desired thickness to be obtained, stack 4001 may include 2 to 10 discrete GDLs; however, any suitable number of GDLs may be utilized, such as 11 or more GDLs. In some embodiments, edges of the discrete GDLs may be aligned (or substantially aligned) with one another to form stack 4001. For example, as will be discussed further herein with reference to FIGS. 42-47, an alignment assembly 4200 may be employed to align (or substantially align) edges of the discrete GDLs with one another to aid in the formation of stack 4001.

Stack 4001 may be inserted, per step 3903, into thermal envelope 4003, such as an isothermal envelope, formed of a thermally reflective material(s). In some cases, thermal envelope 4003 may include opposing foil film covers formed of at least one of aluminum, copper, gold, silver, or the like. The foil film may have a thickness between about 0.006 mm and about 0.2 mm, between about 0.006 mm and about 0.1 mm, between about 0.1 mm and about 0.2 mm, between about 0.006 mm and about 0.054 mm, between about 0.054 mm and about 0.1 mm, between about 0.1 mm and about 0.15 mm, between about 0.15 mm and about 0.2 mm, between about 0.006 mm and about 0.03 mm, between about 0.03 mm and about 0.054 mm, between about 0.054 mm and about 0.079 mm, between about 0.079 mm and about 0.1 mm, between about 0.1 mm and about 0.13 mm, between about 0.13 mm and about 0.15 mm, between about 0.15 mm and about 0.18 mm, or between about 0.18 mm and about 0.2 mm. When inserted into thermal envelope 4003, exterior surfaces 4001a and 4001b of stack 4001 may be completely covered by corresponding interior surfaces 4003a and 4003b of thermal envelope 4003. In some embodiments, stack 4001 may be prepared between thermal layers 4103 provided via input rolls 4105 and 4107 of R2R system 4100. In this manner, exterior surfaces 4001a and 4001b of stack 4001 may be completely covered by surfaces 4103a and 4103b of thermal layers 4103. Thermal envelope 4003 and thermal layers 4103 may not only redirect and/or transfer heat uniformly (or substantially uniformly) during compression but may also prevent exterior surfaces 4001a and 4001b from adhering to surfaces 4003a, 4003b, 4103a, and 4103b. Further, it is not necessary that the layers of thermal envelope 4003 be attached to one another.

According to step 3905, thermal envelope 4003 including stack 4001 (or thermal layers 4103 with stack 4001 therebetween) may be positioned in apparatus 4000 between sacrificial cushion sheets 4005 (or sacrificial cushion layers 4109), which may be between compressing surfaces of apparatus 4000. In some embodiments, the compressing surfaces may be provided by platens (e.g., platens 4007), rollers, and/or any other suitable component. For descriptive convenience, it will be assumed that the compressing surfaces are provided by platens 4007. Sacrificial cushion layers 4109 may be provided via input rolls 4111 and 4113 of R2R system 4100. Sacrificial cushion sheets 4005 or layers 4109 may be formed of any suitably pliable material, such as PTFE, chlorotrifluoroethylene (E-CTFE), MIPELON™, perfluoroalkoxy (PFA), ethylene tetrafluoroethylene (ETFE), etc. A thickness of sacrificial cushion sheets 4005 or layers 4109 may be between about 0.254 mm and about 0.508 mm, between about 0.254 mm and about 0.38 mm, between about 0.38 mm and about 0.508 mm, between about 0.254 mm and about 0.32 mm, between about 0.32 mm and about 0.38 mm, between about 0.38 mm and about 0.44 mm, between about 0.44 mm and about 0.508 mm, between about 0.254 mm and about 0.29 mm, between about 0.29 mm and about 0.32 mm, or between about 0.32 mm and about 0.35 mm. In some implementations, the thickness of sacrificial cushion sheets 4005 or layers 4109 may be between about 0.35 mm and about 0.38 mm, between about 0.38 mm and about 0.41 mm, between about 0.41 mm and about 0.44 mm, between about 0.44 mm and about 0.48 mm, between about 0.48 mm and about 0.508 mm, between about 0.254 mm and about 0.27 mm, between about 0.27 mm and about 0.29 mm, between about 0.29 mm and about 0.3 mm, between about 0.3 mm and about 0.32 mm, between about 0.32 mm and about 0.33 mm, or between about 0.33 mm and about 0.35 mm. According to some embodiments, the thickness of sacrificial cushion sheets 4005 or layers 4109 may be between about 0.35 mm and about 0.37 mm, between about 0.37 mm and about 0.38 mm, between about 0.38 mm and about 0.4 mm, between about 0.4 mm and about 0.41 mm, between about 0.41 mm and about 0.43 mm, between about 0.43 mm and about 0.44 mm, between about 0.44 mm and about 0.46 mm, between about 0.46 mm and about 0.48 mm, between about 0.48 mm and about 0.49 mm, or between about 0.49 mm and about 0.508 mm. As such, sacrificial cushion sheets 4005 or layers 4109 may enable pressure applied to thermal envelope 4003 or layers 4103 (and, thereby, to stack 4001) via platens 4007 to be more uniformly (or substantially uniformly) distributed. This may mitigate issues associated with the variability in thickness of the multiple discrete GDLs of stack 4001 and/or some non-parallelism between platens 4007.

It is also noted that sacrificial cushion layers 4109 may reduce friction between platens 4007 and thermal layers 4103 in R2R system 4100. To this end, infeed portion 4115 of R2R system 4100, apparatus 4000, and/or outfeed portion 4117 of R2R system 4100 may include one or more mechanisms (e.g., brakes, motors, rollers, sensors, tensioners, etc.) to control web speed and tension in R2R system 4100, and, thereby, to control supply of source GDL, thermal layer, and sacrificial cushion layer materials to apparatus 4000.

In some embodiments, apparatus 4000 may be a hot press, such as a Carver™ hot press, a laminator, and/or any other suitable thermocompression device. As such, platens 4007 may be pre-heated to a setpoint between about 20° C. and about 80° C., between about 20° C. and about 50° C., between about 50° C. and about 80° C., between about 20° C. and about 35° C., between about 35° C. and about 50° C., between about 50° C. and about 65° C., between about 65° C. and about 80° C., between about 20° C. and about 28° C., between about 28° C. and about 35° C., between about 35° C. and about 42° C., between about 42° C. and about 50° C., between about 50° C. and about 57° C., between about 57° C. and about 65° C., between about 65° C. and about 72° C., between about 72° C. and about 80° C., between about 20° C. and about 24° C., between about 24° C. and about 28° C., between about 28° C. and about 31° C., between about 31° C. and about 35° C., between about 35° C. and about 39° C., between about 39° C. and about 42° C., between about 42° C. and about 46° C., between about 46° C. and about 50° C., between about 50° C. and about 54° C., between about 54° C. and about 57° C., between about 57° C. and about 61° C., between about 61° C. and about 65° C., between about 65° C. and about 69° C., between about 69° C. and about 72° C., between about 72° C. and about 76° C., or between about 76° C. and about 80° C.

According to step 3907, one or more compression operations may be performed to form a pre-compressed stack of GDLs. For example, apparatus 4000 may apply compressive force to stack 4001 by, for example, causing relative motion between press frames 4009 and 4011 via press 4013, which may be a hydraulically actuated cylinder. In some embodiments, one compression cycle is performed. In some implementations, multiple compression cycles are performed, such as 2 cycles to 10 cycles, e.g., 3 cycles to 7 cycles, for instance, 6 cycles to 8 cycles, such as 4 cycles, 5 cycles, or 9 cycles. To this end, compressive force of each cycle may be applied (e.g., progressively applied) to stack 4001 in any suitable fashion, e.g., linearly, stepwise, exponentially, or according to any other suitable pressure gradient. For example, pressure may be progressively applied from 0 psi to between about 100 psi and about 400 psi, between about 100 psi and about 250 psi, between about 250 psi and about 400 psi, between about 100 psi and about 180 psi, between about 180 psi and about 250 psi, between about 250 psi and about 320 psi, between about 320 psi and about 400 psi, between about 100 psi and about 140 psi, between about 140 psi and about 180 psi, between about 180 psi and about 210 psi, between about 210 psi and about 250 psi, between about 250 psi and about 290 psi, between about 290 psi and about 320 psi, between about 320 psi and about 360 psi, between about 360 psi and about 400 psi, between about 100 psi and about 120 psi, between about 120 psi and about 140 psi, between about 140 psi and about 160 psi, between about 160 psi and about 180 psi, between about 180 psi and about 190 psi, between about 190 psi and about 210 psi, between about 210 psi and about 230 psi, between about 230 psi and about 250 psi, between about 250 psi and about 270 psi, between about 270 psi and about 290 psi, between about 290 psi and about 310 psi, between about 310 psi and about 320 psi, between about 320 psi and about 340 psi, between about 340 psi and about 360 psi, between about 360 psi and about 380 psi, or between about 380 psi and about 400 psi. In some implementations, pressure may be progressively applied from 0 psi to between about 180 psi and about 220 psi, between about 180 psi and about 200 psi, between about 200 psi and about 220 psi, between about 180 psi and about 190 psi, between about 190 psi and about 200 psi, between about 200 psi and about 210 psi, between about 210 psi and about 220 psi, between about 180 psi and about 180 psi, between about 180 psi and about 190 psi, between about 190 psi and about 200 psi, between about 200 psi and about 200 psi, between about 200 psi and about 200 psi, between about 200 psi and about 210 psi, between about 210 psi and about 220 psi, between about 220 psi and about 220 psi, between about 180 psi and about 180 psi, between about 180 psi and about 180 psi, between about 180 psi and about 190 psi, between about 190 psi and about 190 psi, between about 190 psi and about 190 psi, between about 190 psi and about 200 psi, between about 200 psi and about 200 psi, between about 200 psi and about 200 psi, between about 200 psi and about 200 psi, between about 200 psi and about 200 psi, between about 200 psi and about 210 psi, between about 210 psi and about 210 psi, between about 210 psi and about 210 psi, between about 210 psi and about 220 psi, between about 220 psi and about 220 psi, or between about 220 psi and about 220 psi. For instance, pressure may be progressively applied from 0 psi to about 200 psi.

According to various embodiments, the maximum load of each cycle may be applied to stack 4001 for a total of between about 2 minutes and about 11 minutes, between about 2 minutes and about 6.5 minutes, between about 6.5 minutes and about 11 minutes, between about 2 minutes and about 4.2 minutes, between about 4.2 minutes and about 6.5 minutes, between about 6.5 minutes and about 8.8 minutes, between about 8.8 minutes and about 11 minutes, between about 2 minutes and about 3.1 minutes, between about 3.1 minutes and about 4.2 minutes, between about 4.2 minutes and about 5.4 minutes, between about 5.4 minutes and about 6.5 minutes, between about 6.5 minutes and about 7.6 minutes, between about 7.6 minutes and about 8.8 minutes, between about 8.8 minutes and about 9.9 minutes, between about 9.9 minutes and about 11 minutes, between about 2 minutes and about 2.6 minutes, between about 2.6 minutes and about 3.1 minutes, between about 3.1 minutes and about 3.7 minutes, between about 3.7 minutes and about 4.2 minutes, between about 4.2 minutes and about 4.8 minutes, between about 4.8 minutes and about 5.4 minutes, between about 5.4 minutes and about 5.9 minutes, between about 5.9 minutes and about 6.5 minutes, between about 6.5 minutes and about 7.1 minutes, between about 7.1 minutes and about 7.6 minutes, between about 7.6 minutes and about 8.2 minutes, between about 8.2 minutes and about 8.8 minutes, between about 8.8 minutes and about 9.3 minutes, between about 9.3 minutes and about 9.9 minutes, between about 9.9 minutes and about 10 minutes, or between about 10 minutes and about 11 minutes. For instance, the maximum load may be applied to stack 4001 for a total of about 5 minutes.

After stack 4001 is compressed for a set amount of time, a pre-compressed stack of GDLs is formed. The thickness and thickness variation of the pre-compressed stack of GDLs may be reduced relative to its uncompressed state by between about 1% and about 30%, between about 1% and about 16%, between about 16% and about 30%, between about 1% and about 8.2%, between about 8.2% and about 16%, between about 16% and about 23%, between about 23% and about 30%, between about 1% and about 4.6%, between about 4.6% and about 8.2%, between about 8.2% and about 12%, between about 12% and about 16%, between about 16% and about 19%, between about 19% and about 23%, between about 23% and about 26%, between about 26% and about 30%, between about 1% and about 2.8%, between about 2.8% and about 4.6%, between about 4.6% and about 6.4%, between about 6.4% and about 8.2%, between about 8.2% and about 10%, between about 10% and about 12%, between about 12% and about 14%, between about 14% and about 16%, between about 16% and about 17%, between about 17% and about 19%, between about 19% and about 21%, between about 21% and about 23%, between about 23% and about 25%, between about 25% and about 26%, between about 26% and about 28%, or between about 28% and about 30%. In some embodiments, the thickness and thickness variation of the pre-compressed stack of GDLs may be reduced relative to its uncompressed state by between about 15% and about 18%, between about 15% and about 16%, between about 16% and about 18%, between about 15% and about 16%, between about 16% and about 17%, between about 17% and about 18%, between about 15% and about 16%, between about 16% and about 17%, or between about 17% and about 18%. In some implementations, the thickness and thickness variation of the pre-compressed stack of GDLs may be reduced relative to its uncompressed state by between about 5.25% and about 9.5%, between about 5.25% and about 7.4%, between about 7.4% and about 9.5%, between about 5.25% and about 6.3%, between about 6.3% and about 7.4%, between about 7.4% and about 8.4%, between about 8.4% and about 9.5%, between about 5.25% and about 5.8%, between about 5.8% and about 6.3%, between about 6.3% and about 6.8%, between about 6.8% and about 7.4%, between about 7.4% and about 7.9%, between about 7.9% and about 8.4%, between about 8.4% and about 9%, or between about 9% and about 9.5%.

In some embodiments, the pre-compressed stack of GDLs may be optionally cut or trimmed to a predetermined size, per step 3909. For instance, a die cutter, laser cutter, wheel cutter, and/or the like may be utilized to cut or trim the pre-compressed stack of GDLs to a size appropriate for inclusion in a single or multi-cell stack assembly. In R2R system 4100, cutting mechanism 4119 may be positioned downstream from apparatus 4000 to cut appropriately sized pre-compressed stacks of GDLs from the output of apparatus 4000. Cutting mechanism 4119 may completely cut the appropriately sized pre-compressed stacks of GDLs from the output of apparatus 4000 or may form perforated cuts to enable the appropriately sized pre-compressed stacks of GDLs to be later removed from the output of apparatus 4000. Further, the output of apparatus 4000 and/or excess GDL material may be collected via output roller 4121. In a similar fashion, output rollers 4123 and 4125 may collect thermal layer material from the output of apparatus 4000. Output rollers 4127 and 4129 may collect sacrificial cushion material output from apparatus 4000.

As mentioned above, in various examples, an alignment assembly 4200 may be employed to align (or substantially align) edges of the discrete GDLs with one another to aid in the formation of stack 4001. With reference to FIGS. 42-47, the alignment assembly 4200 may include a base plate 4201, a plurality of rods 4202, and a top plate 4203. The plurality of rods 4202 may each extend from the base plate 4201. For example, the plurality of rods 4202 may each extend from a top surface 4204 of the base plate 4201. The top plate 4203 may define or otherwise include a plurality of receptacles (or apertures) 4205. Each of the receptacles 4205 may be configured to receive at least a portion of a corresponding one of the rods 4202 therein. Said another way, the rods 4202 and the receptacles 4205 may be sized, shaped, and positioned to correspond with one another such that each of the receptacles 4205 is capable of receiving one of the rods 4202 (see, e.g., FIGS. 43, 44, 46, and 47). Each of the receptacles 4205 may receive a first end 4206 of a corresponding one of the rods 4202. In some embodiments, each of the receptacles 4205 may respectively extend through an entirety (or a substantial entirety) of a thickness 4207 of the top plate 4203.

With continued reference to FIGS. 42-47, the base plate 4201 may define or otherwise include a plurality of apertures 4208. A second end 4209 of each of the rods 4202 may engage with a corresponding one of the apertures 4208. For example, and without limitation, the engagement between the second ends 4209 of the rods 4202 and the corresponding one of the apertures 4208 may be a threaded engagement or an interference fit, but embodiments are not limited thereto. For instance, in some cases, the engagement may be a transition fit. It is contemplated that, in some examples, the rods 4202 may be respectively retained in the apertures 4208 by gravity such that the engagement between the second ends 4209 of each of the rods 4202 and the corresponding one of the apertures 4208 is a less active engagement when compared to either a threaded engagement or an interference fit. In examples where the engagement between the second ends 4209 of the rods 4202 and the corresponding one of the apertures 4208 is a threaded engagement, each of the apertures 4208 may define or include threads 4210 therein. Similarly, in such examples, each of the rods 4202 may define threads 4211 thereon that are configured to engage with the threads 4210 of the apertures 4208.

Figure 42:
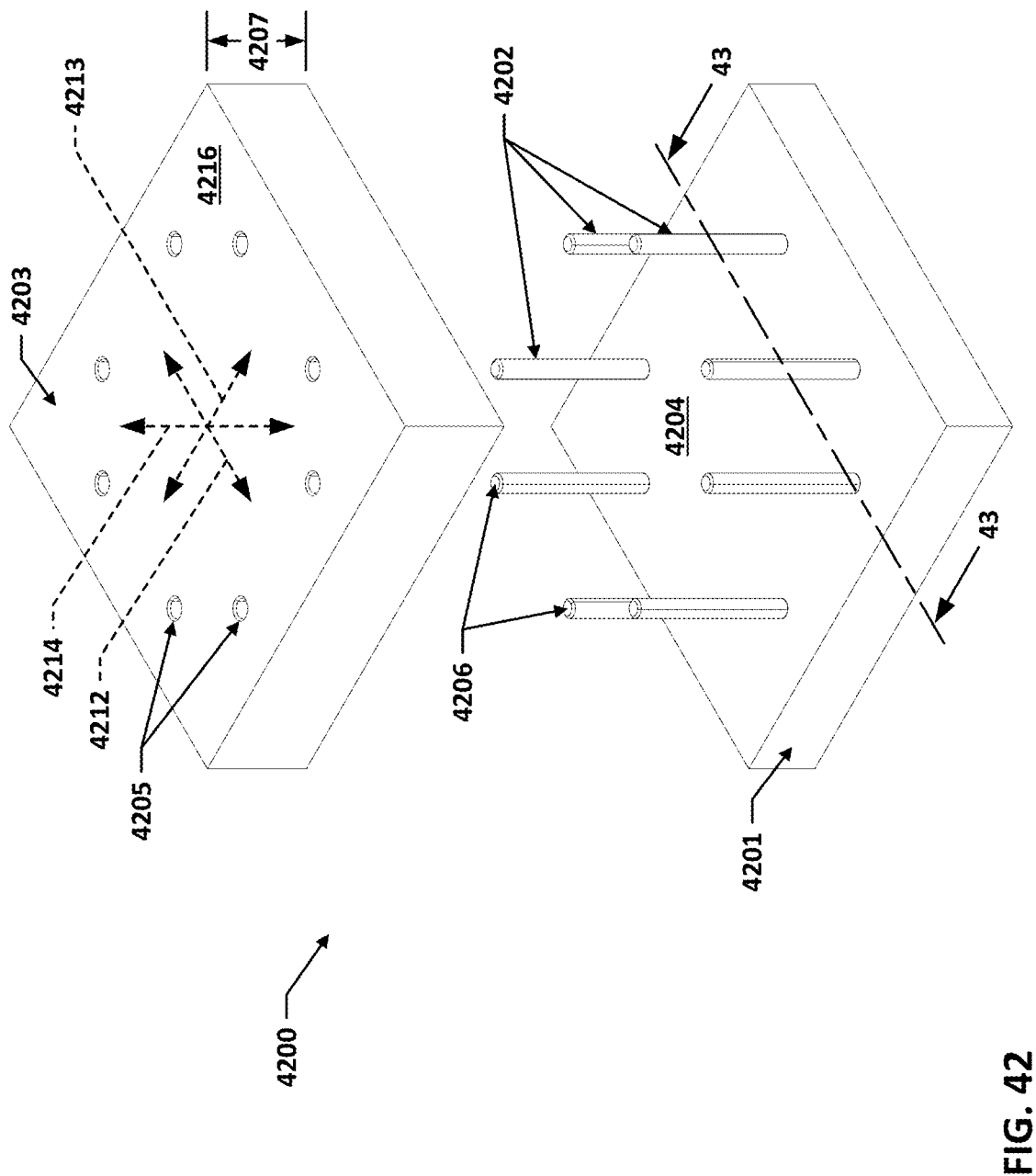
FIG. 42 depicts a partial exploded view of an example alignment assembly employed to align discrete gas diffusion layers.

Referring further to FIGS. 42-47, the rods 4202, the receptacles 4205, and the apertures 4208 may each be arranged in a complementary, or corresponding, pattern to ensure a mating engagement between the rods 4202 and the top plate 4203 when the alignment assembly 4200 is assembled. In some examples, the rods 4202, the receptacles 4205, and the apertures 4208 may be arranged in a pattern that is symmetrical about a lateral axis 4212 of the alignment assembly 4200, symmetrical about a longitudinal axis 4213 of the alignment assembly 4200, and/or symmetrical about a diagonal axis 4214 of the alignment assembly 4200. For example, as depicted in FIG. 42, the rods 4202, the receptacles 4205, and the apertures 4208 are arranged in a pattern that is symmetrical about the lateral axis 4212 of the alignment assembly 4200, symmetrical about the longitudinal axis 4213 of the alignment assembly 4200, and symmetrical about the diagonal axis 4214 of the alignment assembly 4200. The lateral axis 4212 may be defined as an axis that extends between opposing sides of the alignment assembly 4200 (e.g., diametrically opposed sides). The longitudinal axis 4213 may be defined as an axis that extends between opposing sides of the alignment assembly 4200 (e.g., diametrically opposed sides) such that the longitudinal axis 4213 is orthogonal to the lateral axis 4212. The diagonal axis 4214 may be defined as an axis that extends between diagonally opposing quadrants of a grid pattern defined by the lateral axis 4212 and the longitudinal axis 4213. In some cases, the lateral axis 4212, the longitudinal axis 4213, and the diagonal axis 4214 may lie within a same reference plane including, parallel, or substantially parallel to the upper surface 4216 of top plate 420. Although the alignment assembly 4200 is depicted as being rectangular in shape, alternative geometries are contemplated and within the scope of the present disclosure. For example, the base plate 4201 and the top plate 4203 may take the shape of any suitable polygon or free-form shape that provides sufficient surface area for the positioning of the GDLs.

Figure 43:
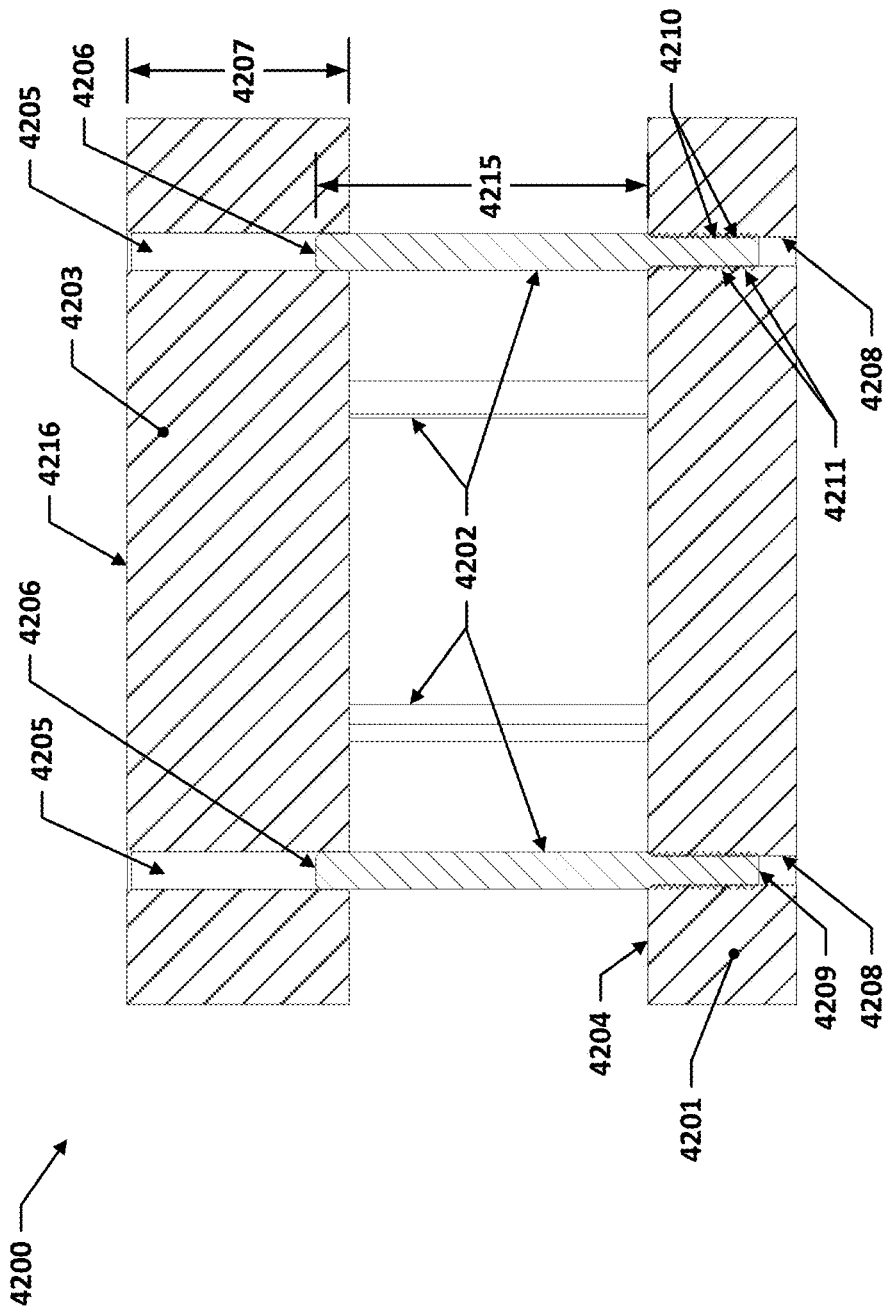
FIG. 43 depicts a cross-sectional view of the alignment assembly, taken along line 43-43 of FIG. 42, illustrating engagement between a plurality of rods and a plurality of receptacles of a top plate, with the top plate at a first height above a base plate.
Figure 44:
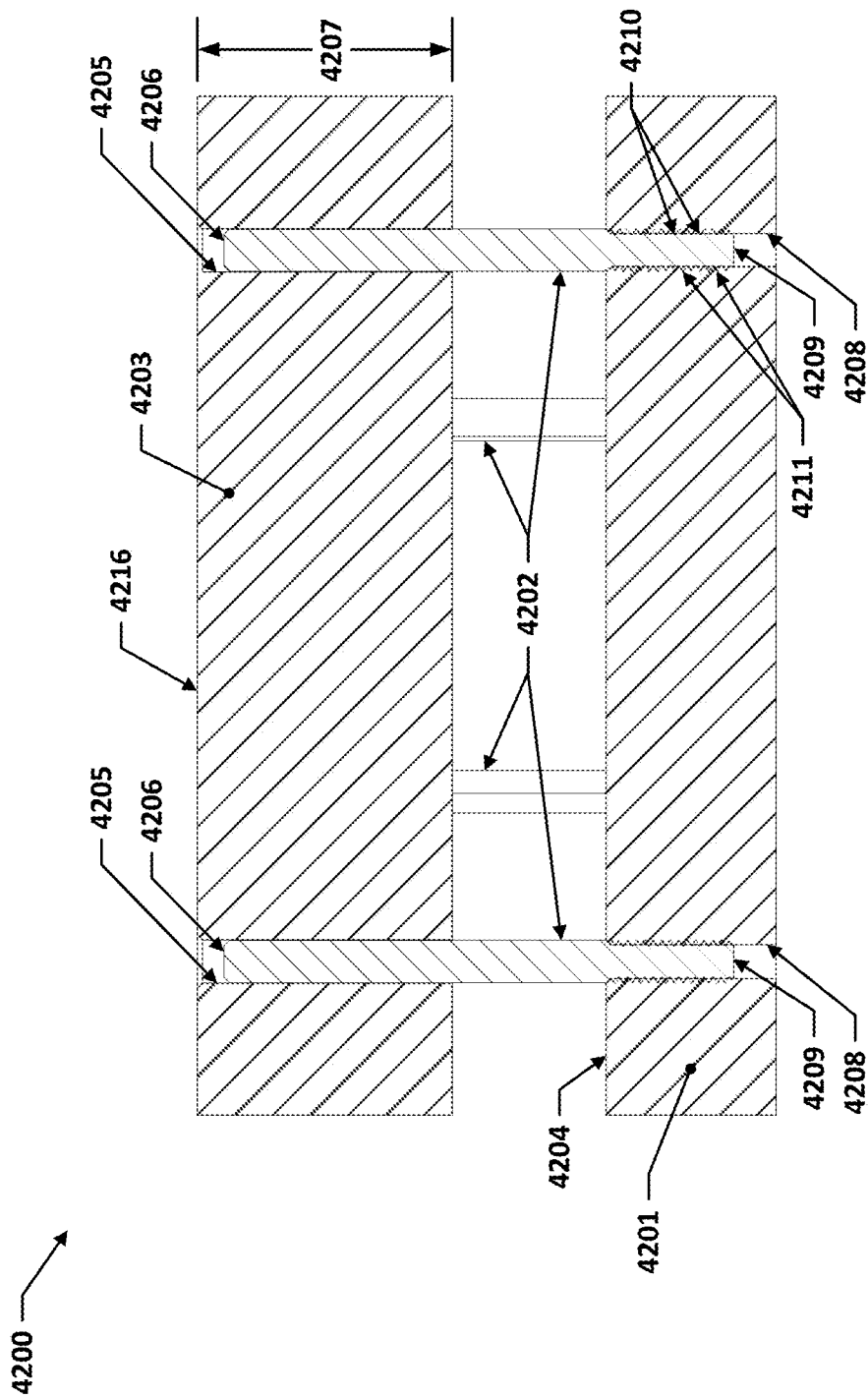
FIG. 44 depicts the alignment assembly of FIG. 43, illustrating engagement between the plurality of rods and the plurality of receptacles of the top plate, with the top plate at a second height above the base plate.
Figure 45:
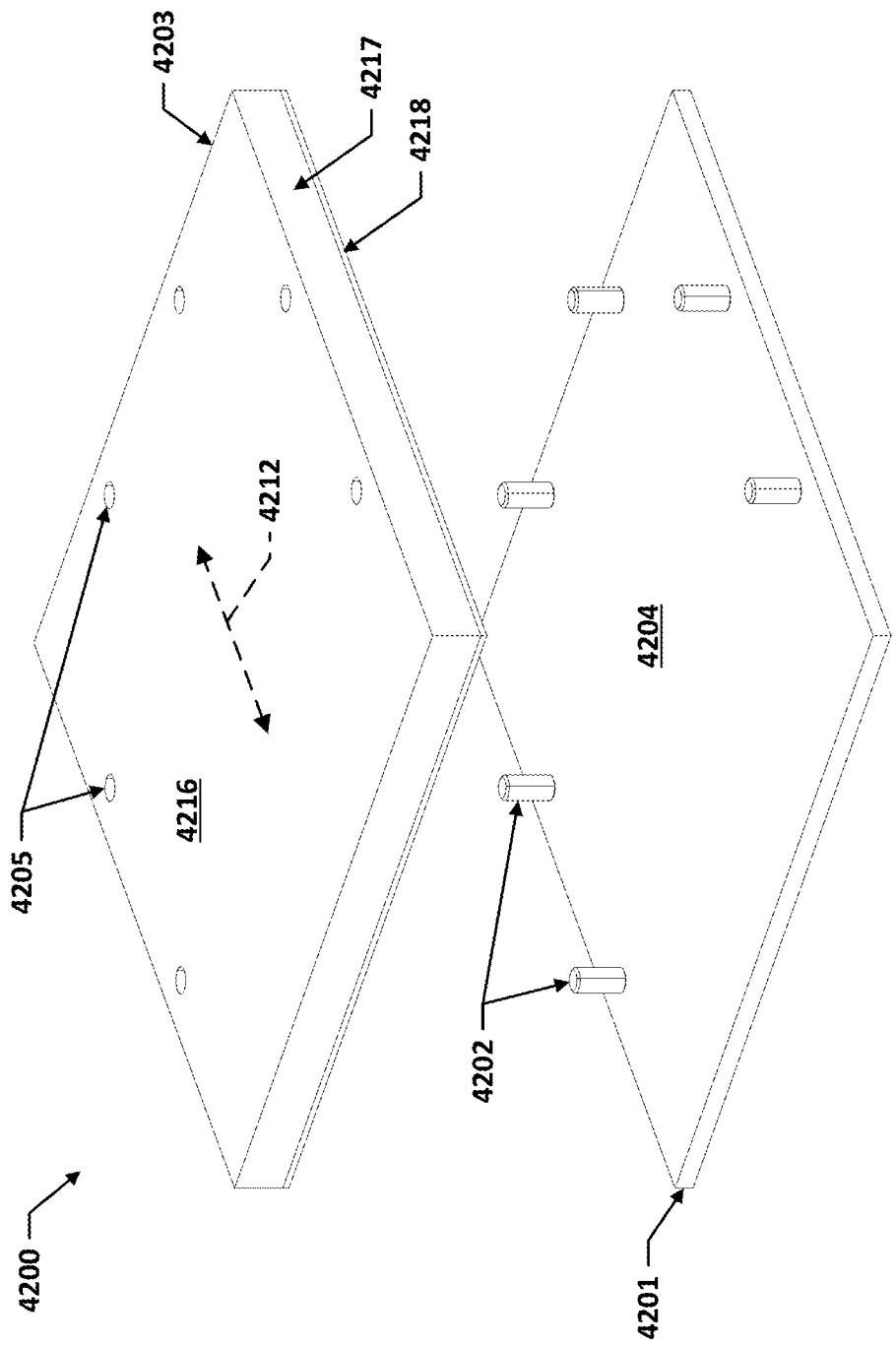
FIG. 45 depicts a partial exploded view of another example alignment assembly employed to align discrete gas diffusion layers.
Figure 46:
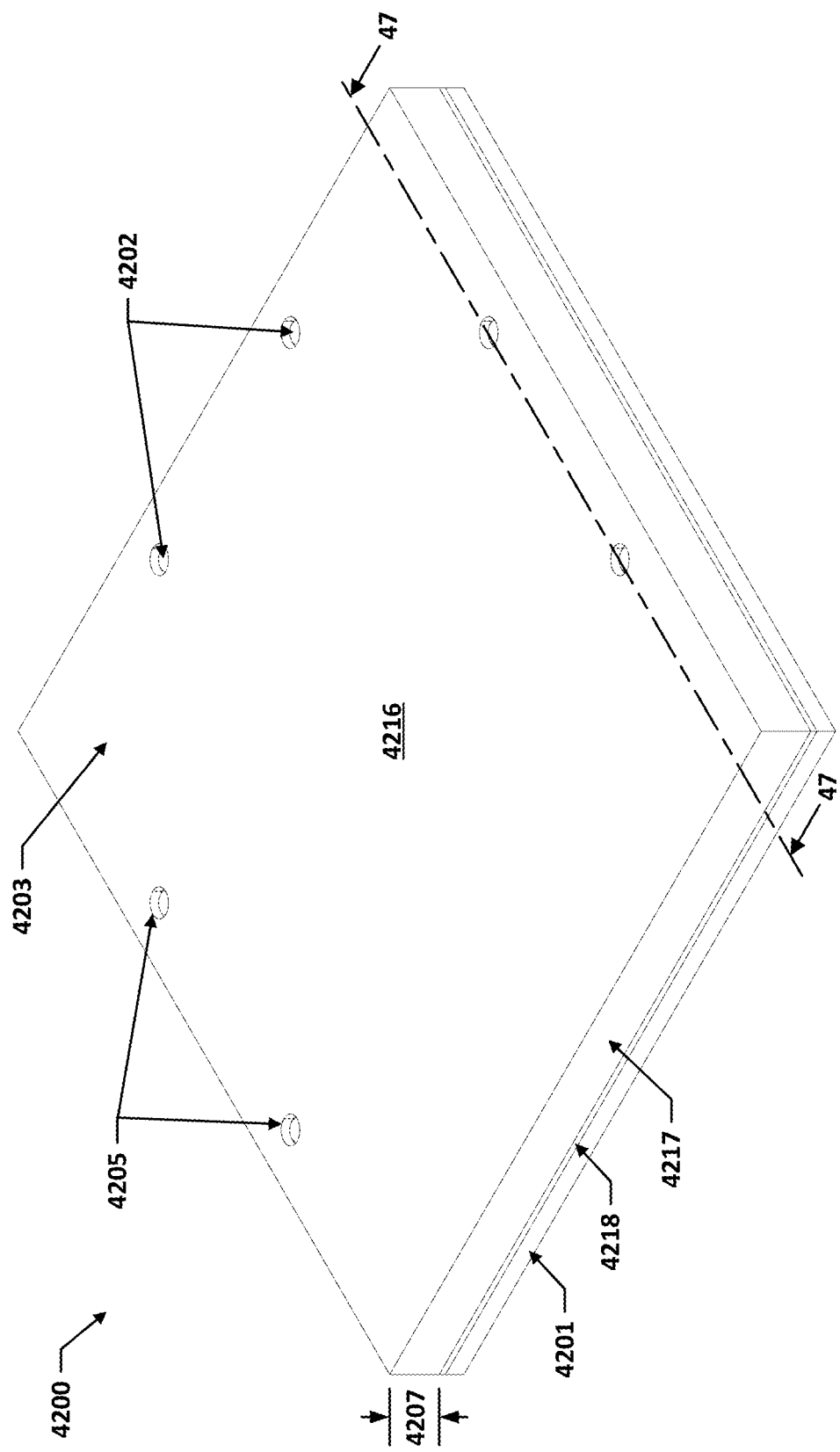
FIG. 46 depicts the alignment assembly of FIG. 45 in a closed position with the top plate and the bottom plate in direct contact with one another.
Figure 47:
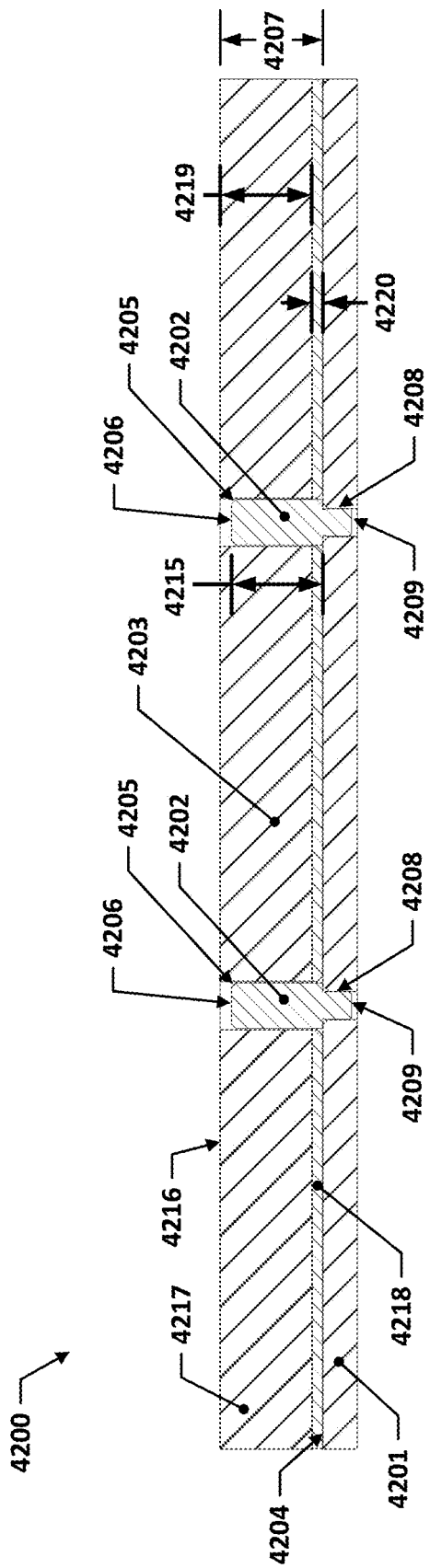
FIG. 47 depicts a cross-sectional view of the alignment assembly, taken along line 47-47 of FIG. 46, illustrating relative positions and features of various components thereof.

In some examples, the pattern in which the rods 4202, the receptacles 4205, and the apertures 4208 may be arranged may be less symmetrical than the examples depicted in FIGS. 42-44. For example, as depicted in FIGS. 45-47, the pattern in which the rods 4202, the receptacles 4205, and the apertures 4208 are arranged may be symmetrical about a single axis chosen from the lateral axis 4212, the longitudinal axis 4213, or the diagonal axis 4214. In the example depicted in FIGS. 45-47, the rods 4202, the receptacles 4205, and the apertures 4208 are arranged in a pattern that is symmetrical about the lateral axis 4212.

Referring again to FIGS. 42-47, in various examples, a length of each of the rods 4202 may be less than the thickness 4207 of the top plate 4203. For instance, an exposed length 4215 of each of the rods 4202 may be less than the thickness of the top plate 4203 (see, e.g., FIG. 47). The exposed length 4215 of the rods 4202 may be defined as a portion of the rod 4202 that extends beyond the top surface 4204 of the base plate 4201 when the rod 4202 is engaged with the base plate 4201. By providing the exposed length 4215 of the rods 4202 as being less than, or equal to, the thickness 4207 of the top plate 4203, the first ends 4206 of the rods 4202 may be prevented from extending beyond an upper surface 4216 of the top plate 4203 when the top plate 4203 is in direct physical contact with the top surface 4204 of the base plate 4201. By so arranging and configuring the exposed length 4215 of the rods 4202 and the thickness 4207 of the top plate 4203, a situation can be avoided where the first ends 4206 of the rods 4202 contact the apparatus 4000 during compression operations.

Although it may be beneficial to design the alignment assembly 4200 such that the exposed length 4215 of the rods 4202 does not exceed the thickness 4207 of the top plate 4203, the present disclosure is not so limited. Rather, it is contemplated that the exposed length 4215 of the rods 4202 may exceed the thickness 4207 of the top plate 4203 in instances where a thickness of the pre-compressed stack of GDLs is considered. For example, the exposed length 4215 of the rods 4202 may exceed the thickness 4207 of the top plate 4203 such that the first ends 4206 of the rods 4202 protrude beyond the upper surface 4216 of the top plate 4203 when the top plate 4203 is in direct physical contact with the top surface 4204 of the base plate 4201. However, in such an example, the extent to which the first ends 4206 of the rods 4202 extend beyond the upper surface 4216 of the top plate 4203 may correspond to a thickness of the pre-compressed stack of GDLs. Therefore, when the stack of GDLs have been pre-compressed and are between the base plate 4201 and the top plate 4203, the first ends 4206 of the rods 4202 may be prevented from extending beyond the upper surface 4216 of the top plate 4203.

With further reference to FIGS. 42-47, the rods 4202 enable a user to quickly align the discrete GDLs in preparation for compression into a pre-compressed stack of GDLs. The rods 4202 may also maintain such alignment of the discrete GDLs as the alignment assembly 4200 is placed into the apparatus 4000. The rods 4202 may further maintain the alignment of the discrete GDLs during compression by the apparatus 4000. In examples where the receptacles 4205, the rods 4206, and the apertures 4208 are arranged in a pattern that has a lesser degree of symmetry (e.g., a single line of symmetry), a user may be aided in a more rapid orientation of the top plate 4203 when assembling the alignment assembly 4200. For example, when the receptacles 4205, the rods 4206, and the apertures 4208 are arranged in a pattern that has a single line of symmetry, a user may rapidly ascertain a proper orientation of the top plate 4203 when assembling the alignment assembly 4200 and thereby prevent misalignment. However, when the receptacles 4205, the rods 4206, and the apertures 4208 are arranged in a pattern that has two or more lines of symmetry, a user may unintentionally misalign the top plate 4203 by positioning the top plate 4203 in an apparently-correct orientation. For example, the pattern of the receptacles 4205, the rods 4206, and the apertures 4208 may appear to be identically symmetrical about the lateral axis 4212 and the longitudinal axis 4213 to a user (see, e.g., FIG. 42). However, slight differences introduced during manufacture may result in sufficient variation in the symmetry about the lateral axis 4212 and/or the longitudinal axis 4213 that may cause binding between the top plate 4203 and the rods 4202 in the event of misalignment. One such example of misalignment can occur if a user aligns the lateral axis 4212 of the top plate 4203 with the longitudinal axis 4213 of the base plate 4201 during assembly. Although such a misalignment may appear correct at first glance (e.g., may be in an apparently-correct orientation), the top plate 4203 may be prevented from fully engaging with one or more of the rods 4202 and/or the top plate 4203 may be prevented from sliding along the rods 4202 as freely (e.g., binding may occur) as when proper alignment is achieved.

It may be beneficial to construct the base plate 4201 and/or the top plate 4203 from one or more metallic materials (e.g., aluminum, copper, magnesium, steel, tungsten, etc.). Since these components contact a large surface area of the GDLs, by constructing the base plate 4201 and/or the top plate 4203 from at least one metallic material, it may be possible to provide smooth contact surfaces that can prevent damage to the GDLs that may otherwise occur from surface imperfections. However, as the size of the alignment assembly 4200 increases, the weight of the alignment assembly 4200 also increases and can negatively impact maneuverability. Accordingly, particularly for larger implementations of the alignment assembly 4200, it is contemplated that the base plate 4201 and/or the top plate 4203 may be constructed from metallic and non-metallic materials, such as one or more polymers. In such an example, the surfaces of the base plate 4201 and/or the top plate 4203 that directly contact the GDLs during compression may be constructed from metallic material(s) (e.g., aluminum, copper, magnesium, steel, tungsten, etc.) and/or any other material that provides a sufficient degree of surface smoothness. However, the portions of the base plate 4201 and/or the top plate 4203 that are not in direct contact with the GDLs during compression may be constructed from non-metallic material(s) that can enable a decrease in the overall weight of the alignment assembly 4200.

With reference to FIGS. 45-47, the top plate 4203 may include an upper portion 4217 and a lower portion 4218. In the depicted example, a thickness 4219 of the upper portion 4217 is greater than a thickness 4220 of the lower portion 4218. However, it is contemplated that the thickness 4219 of the upper portion 4217 and the thickness 4220 of the lower portion 4218 may be equal, or substantially equal. Alternatively, it is also contemplated that the thickness 4219 of the upper portion 4217 may be less than the thickness 4220 of the lower portion 4218. The sum of the thickness 4219 of the upper portion 4217 and the thickness 4220 of the lower portion 4218 is equal to the thickness 4207 of the top plate 4203. The upper portion 4217 may be constructed from a foam that is capable of withstanding the forces exerted by the apparatus 4000 (e.g., a high-density foam). The lower portion 4218 may be constructed from a metallic material(s) (e.g., aluminum, etc.). Accordingly, as mentioned above, the portion of the top plate 4203 that is not in direct contact with the GDLs during pre-compression (e.g., the upper portion 4217) may be constructed from non-metallic material(s) and the portion of the top plate 4203 that is in direct contact with the GDLs during pre-compression (e.g., the lower portion 4218) may be constructed from a metallic material(s) (e.g., aluminum, etc.). Although not depicted, the base plate 4201 may be constructed in a manner that is similar, or identical, to what is described above with regard to the upper portion 4217, the lower portion 4218, the thickness 4219, and/or the thickness 4220.

Additional GDL Design Considerations

Another characteristic of GDLs that may be selected to as to enhance GDL performance in the $CO_x$ electrolyzer context is the thermal conductivity of the GDL. For example, the above-mentioned model was used to compare the predicted performance of two equal-thickness GDLs that only differed in their respective thermal conductivities, which was 0.2 W/mK in one GDL and doubled to 0.4 W/mK in the other. Halving the thermal conductivity resulted in a ~1.25× increase in temperature differential across the GDL, but also resulted in approximately a 105% increase in water vapor flux as well.

In accordance with various embodiments, a GDL on the cathode side of a $CO_x$ electrolyzer has an average thermal conductivity of at least about of at most about 0.5 W/mK or at most about 0.1 W/mK. In some embodiments, a GDL on the cathode side of a $CO_x$ electrolyzer has an average thermal conductivity of about 0.05 to 0.5 W/mK. In some implementations, GDLs having thermal conductivities as presented here include one or more MPLs and one or more backing layers.

In what may be at least somewhat related to the above observation regarding thermal conductivity, additional testing revealed that the presence of PTFE throughout the entire thickness of the backing layer of GDLs used in $CO_x$ electrolyzers provided a significant performance benefit. The inclusion of PTFE in the backing layer may have any of a number of beneficial effects, including, for example, altering the hydrophobicity of the backing layer. However, the inclusion of PTFE may also decrease the thermal conductivity of the backing layer since the PTFE has a significantly lower thermal conductivity than, for example, carbon fibers that may be used in the backing layer. The PTFE may, in effect, help insulate the carbon fibers, thus lowering the thermal conductivity of the GDL as a whole.

In tests of two thicker (both ~600 μm) GDLs-one of which had 5% by weight of PTFE throughout the backing layer material and one of which had ~280 μm of backing layer with no PTFE at all—and a thinner GDL (315 μm) with 5% by weight of PTFE in the backing layer, it was found that while both GDLs with 5% by weight PTFE throughout their entire backing layer thickness maintained relatively stable and high FY_CO performance over an 18 hour test interval (>85% for the 315 μm GDL, but decreasing slowly over time; >95% for the 600 μm GDL over the same period and decreasing at a much slower rate) as compared with the ~600 μm GDL having PTFE only within part of the backing layer thickness. The GDL that had a portion of the backing layer thickness PTFE-free saw its FY_CO level decrease to below 85% within less than 5 hours and below 60% before 7 hours had passed. The FY_CO using this GDL dropped to less than 20% by 12 hours.

Testing also suggested that increasing the weight percent/amount of PTFE that was present within the backing layer of a GDL provided a beneficial effect in $CO_x$ electrolyzers. In tests that were done with several GDLs, it was found that using GDLs with elevated levels of PTFE in the backing layer (e.g., 25% by weight as compared with 5% by weight) but comparable thicknesses resulted in a lower decay rate in Faradaic yield.

In accordance with various embodiments, a cathode side GDL of a $CO_x$ electrolyzer contains a hydrophobic additive. In some such cases, the GDL or a layer thereof includes a carbonaceous material and a hydrophobic additive. In some cases, the hydrophobic additive is a hydrophobic polymer such as a fluorinated or perfluorinated polymer (e.g., PTFE). In certain embodiments, a hydrophobic additive such as a perfluorinated polymer is present in both a GDL backing layer and an MPL (both contained in the GDL). In some configurations, the hydrophobic additive is present through the entire thickness of the GDL, including an MPL, a backing layer, and any other layer. In some embodiments, a hydrophobic additive such as a perfluorinated polymer is present in a GDL at concentration of at least about 5% by weight, or about 5% to 55% by weight.

In some instances, it may be beneficial to use layered GDLs that have different layers, each with a different morphology and/or a different composition. As an example, each of two or more layers may comprise a backing layer and a MPL. In some embodiments, two different layers have different hydrophobic additive contents, e.g., a GDL with an MPL and three different backing layers, each with a different hydrophobic additive content, e.g., MPL/layer A/layer B/layer C, with layer A having about 5%, layer B having about 10%, and layer C having about 20% (by weight) PTFE in them.

Based on the above results and various other observations, certain potentially desirable characteristics of GDLs for use in $CO_x$ electrolyzers were identified; these characteristics, summarized below, may be individually applicable but many or all of them may also be combinable to provide performance increases in excess of what any particular characteristic alone may be able to provide.

GDLs for use in $CO_x$ electrolyzers may, for example, provide enhanced performance when having characteristics such as any one or more of the following:

About 200 μm-2000 μm overall thickness, with thicknesses in the 400 μm to 2000 am range, 500 μm to 2000 μm range, or 600 μm to 900 μm range being demonstrated to provide improved performance over thinner GDLs.

About 0%-55% by weight PTFE content in the backing layer, with PTFE content of at least about 25% by weight in the backing layer being shown to provide good performance.

An external water contact angle having a value of about 1200 to 170°, and in some implementations greater than or equal to about 140°, measured within 60 seconds of application of water for the backing layer. While this characteristic may be governed by the PTFE content of the GDL backing layer, GDLs with backing layers containing a hydrophobic material other than PTFE (e.g., other fluorinated polymers) may offer performance similar to that obtained using GDLs having PTFE content as noted above if those non-PTFE GDLs have external water contact angles within the indicated range(s).

Backing layer or overall GDL porosity of about 35% to 90% or about 60% to 90%.

Backing layer fiber diameter of about 1 to 25μ, e.g., about 5 to 15 μm.

GDL bulk density of about 0.1 g/cm$^3$ to 0.8 g/cm$^3$, with bulk densities of about 0.2 g/cm$^3$ to 0.4 g/cm$^3$, which showed increased performance over lower bulk densities.

GDL basic weight of about 50 g/cm$^2$ to 1000 g/cm$^2$, with basic weights of about 150 g/cm$^2$ to 300 g/cm$^2$ showing increased performance over lower basic weights.

GDL area-specific resistance of about 0.05 mΩ·cm$^2$ to 20 mΩ·cm$^2$ or about 0.05 mΩ·cm$^2$ to 5 mΩ·cm$^2$.

GDL in-plane resistivity of about 0.05 mΩ·m$^2$ to 7 mΩ·m$^2$ or about 0.05 mΩ·m$^2$ to 2 mΩ·m$^2$.

GDL air permeability of about 1 Gurley-second to 1000 Gurley-seconds.

GDL compressibility of about 0% to 40%, e.g., 10% to 20%.

GDL thermal conductivity of about 0.05 W/mK to 0.5 W/mK or about 0.15 W/mK to 0.35 W/mK.

GDL break strength of about 1,000 N/m to 10,000 N/m, e.g. about 2,000 N/m to 4,500 N/m.

GDL stiffness of about 20 Taber stiffness units to 40 Taber stiffness units, e.g., 25-30 Taber stiffness units.

GDL tortuosity of about 1.5 to 5 (tortuosity being the ratio of actual path length taken by molecules through GDL between two points compared to straight-line distance between those two points).

Any of the above properties may apply separately to the MPL or backing layer. Or any of the above properties may apply to both the MPL and backing layer.

As noted above, $CO_x$ electrolyzers that use GDLs without MPLs may exhibit significantly degraded performance. Therefore, in some embodiments, at least one MPL is present in a GDL for use in a $CO_x$ electrolyzer. In some implementations, a GDL includes at least MPLs.

In some implementations, MPLs for GDLs for $CO_x$ electrolyzer usage may have between about 15% and 55%, e.g., about 25%, by weight PTFE content. MPLs for GDLs for $CO_x$ electrolyzer usage may also have a thickness that is in the range of about 1% to 30% of the overall thickness of the GDL.

In some implementations, a GDL comprises a stack of GDL units, each stack comprising at least one MPL affixed to at least one backing layer. In some cases, a GDL comprises a stack of two GDL units, each containing at least one backing layer and one or both of the GDL units containing an MPL. In some cases, a GDL comprises a stack of three GDL units, each GDL unit containing at least one backing layer and at least one of the GDL units containing an MPL.

It will be understood that the GDLs discussed above, e.g., in the context of cathode GDLs, may be combined with the flow fields discussed above, e.g., in the context of cathode flow fields, in a $CO_x$ electrolyzer stack assembly. For example, the use of thicker GDLs (and/or GDLs with other characteristics discussed above) may result in higher water ejection rates from the MEAs of such an electrolyzer due to the higher water vapor flux that may occur in the context of $CO_x$ electrolyzer use. By coupling such GDLs with flow fields such as those discussed above, which may provide superior water removal capabilities, $CO_x$ electrolyzers may be made to operate more efficiently and with greater consistency and lower potential performance degradation due to decreased residual water retention.

Additional Implementations

According to some implementations, an alignment assembly may include a base plate, a plurality of rods, and a top plate. The plurality of rods may extend from the base plate. The top plate may include a plurality of receptacles. Each of the plurality of receptacles may be configured to receive corresponding one of the plurality of rods. Each of the plurality of receptacles may extend through an entirety of a thickness of the top plate.

In some such implementations, the base plate may include a plurality of apertures.

In some such implementations, each of the plurality of rods may engage with a corresponding one of the plurality of apertures.

In some such implementations, each of the plurality of apertures may include a threaded portion, and each of the rods may include a threaded portion configured to respectively engage with a corresponding one of the threaded portions of the apertures.

In some such implementations, an exposed length of each of the plurality of rods may be less than, or equal to, the thickness of the top plate.

In some such implementations, the top plate may include an upper portion and a lower portion.

In some such implementations, the upper portion may include a high-density foam material.

In some such implementations, the lower portion may include a metallic material.

In some such implementations, the metallic material may be aluminum.

In some such implementations, a thickness of the upper portion may be greater than a thickness of the lower portion.

In some such implementations, the base plate may include a metallic material.

In some such implementations, the metallic material may be aluminum.

It is to be understood that the phrases "for each <item> of the one or more <items>," "each <item> of the one or more <items>," or the like, if used herein, are inclusive of both a single-item group and multiple-item groups, i.e., the phrase "for . . . each" is used in the sense that it is used in programming languages to refer to each item of whatever population of items is referenced-whether it be a population of one item or a population of more than one item. For example, if the population of one or more items referenced is a single item, then "each" would refer to only that single item (despite the fact that dictionary definitions of "each" frequently define the term to refer to "every one of two or more things") and would not imply that there must be at least two of those items. Similarly, the term "set" or "subset" should not be viewed, in itself, as necessarily encompassing a plurality of items—it will be understood that a set or a subset can encompass only one member or multiple members (unless the context indicates otherwise).

It is also to be understood that the various dimensional parameter ranges provided herein may be combined with any other dimensional parameter ranges provided herein. For example, if a channel is described as potentially having a length in ranges A, B, or C, a width in ranges D, E, or F, and a depth in ranges G, H, or I, this is to be understood to explicitly contemplate channels having a length, width, and depth representing any combination of such ranges. For example, in the above scenario, such a channel may have a length, width, and height of AEI, AEJ, AEK, AEL, AFI, AFJ, AFK, AFL, AGI, AGJ, AGK, AGL, AHI, AHJ, AHK, AHL, BEI, BEJ, BEK, BEL, BFI, BFJ, BFK, BFL, BGI, BGJ, BGK, BGL, BHI, BHJ, BHK, BHL, CEI, CEJ, CEK, CEL, CFI, CFJ, CFK, CFL, CGI, CGJ, CGK, CGL, CHI, CHJ, CHK, CHL, DEl, DEJ, DEK, DEL, DFI, DFJ, DFK, DFL, DGI, DGJ, DGK, DGL, DHI, DHJ, DHK, or DHL, with the first letter of each letter triplet representing the length range of the channel, the second letter of each letter triplet representing the width range of the channel, and the third letter of each letter triplet representing the depth range of the channel.

One combination of the above GDL specifications that yields a high performing device has an uncompressed overall thickness of about 470-570 μm, with one microporous layer that is about 20-70 μm thick, with 25% PTFE dispersed within the microporous layer as well as the carbon fiber backing layer. This GDL may have a basis weight of about 85-90 g/m², bulk density of about 0.32-0.35 g/cm³, break strength in the machine direction of about 2100-4200 N/m, stiffness in the machine direction of about 12-52 Taber, through-plane and in-plane air permeability of about 25-50 Gurley seconds, compressibility of about 11-17%, area-specific resistivity of about 11 mOhm*cm², or any combination thereof. Note that combinations of these properties can describe various types of GDL arrangements including GDLs that comprise an MPL alone, a backing layer alone, and any stack including one or more backing layers and one or more MPLs. In some cases, the GDL having such combinations of properties comprises a stack of two more structures, each having at least one MPL and at least one backing layer.

It should be appreciated that all combinations of the foregoing concepts (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

It is to be further understood that the above disclosure, while focusing on a particular example implementation or implementations, is not limited to only the discussed example, but may also apply to similar variants and mechanisms as well, and such similar variants and mechanisms are also considered to be within the scope of this disclosure.

What is claimed is:

1. A method comprising:
    causing, at least in part, a stack of layers to be arranged between compressing surfaces of a press, the stack of layers comprising a plurality of gas diffusion layers stacked directly upon one another; and
    causing, at least in part, the press to apply one or more compression cycles to the stack of layers to reduce a combined, uncompressed thickness of the plurality of gas diffusion layers by about 2% to about 30%.

2. The method of claim 1, wherein the combined, uncompressed thickness of the plurality of gas diffusion layers is reduced by about 6% to about 17%.

3. The method of claim 1, further comprising:
    positioning the plurality of gas diffusion layers within an alignment assembly.

4. The method of claim 1, wherein:
    the press is a hot press or a laminator; and
    a setpoint temperature of the compressing surfaces is between about 20° C. and about 80° C. during the one or more compression cycles.

5. The method of claim 4, wherein the stack of layers comprises the plurality of gas diffusion layers arranged between thermally reflective layers.

6. The method of claim 5, wherein:
    each thermally reflective layer among the thermally reflective layers is formed of aluminum, copper, gold, silver, or any combination thereof; and
    each thermally reflective layer among the thermally reflective layers has a thickness between about 0.006 mm and about 0.2 mm.

7. The method of claim 5, wherein the thermally reflective layers form a thermal envelop encasing the gas diffusion layers.

8. The method of claim 1, wherein the stack of layers comprises the plurality of gas diffusion layers arranged between sacrificial cushion layers.

9. The method of claim 8, wherein:
    the sacrificial cushion layers are formed of polytetrafluoroethylene, chlorotrifluoroethylene (E-CTFE), polyethylene, perfluoroalkoxy (PFA), ethylene tetrafluoroethylene (ETFE), or any combination thereof, and
    each sacrificial cushion layer among the sacrificial cushion layers has a thickness of about 0.254 mm to about 0.508 mm.

10. The method of claim 1, wherein each compression cycle among the compression cycles comprises pressure being progressively applied up to a maximum pressure between about 100 psi and about 400 psi.

11. The method of claim 10, wherein the maximum pressure is between about 180 psi and about 220 psi.

12. The method of claim 10, wherein each compression cycle among the compression cycles comprises the maximum pressure being applied for about 2 minutes to about 11 minutes.

13. The method of claim 10, wherein each compression cycle among the compression cycles comprises the maximum pressure being applied for about 4 minutes to about 6 minutes.

14. The method of claim 1, wherein the one or more compression cycles causes, at least in part, the plurality of gas diffusion layers to be connected to one another to form a combined gas diffusion layer.

15. The method of claim 1, wherein the one or more compression cycles causes, at least in part, the plurality of gas diffusion layers to be adhered to one another to form a combined gas diffusion layer.

16. The method of claim 14, further comprising:
    causing, at least in part, the combined gas diffusion layer to be cut or trimmed to a predetermined size.

17. The method of claim 1, wherein each gas diffusion layer among the gas diffusion layers is a pre-manufactured gas diffusion layer having been previously compressed at least once prior to application of the one or more compression cycles.

18. The method of claim 1, wherein each gas diffusion layer among the gas diffusion layers comprises a fibrous substrate and a microporous layer.

19. The method of claim 18, wherein the fibrous substrate is formed of woven carbon cloth, non-woven carbon fiber layers, or carbon fiber papers.

20. The method of claim 18, wherein the fibrous substrate and/or the microporous layer is treated or coated with a hydrophobic material.

* * * * *